United States Patent
Fauteux et al.

(10) Patent No.: US 12,510,892 B2
(45) Date of Patent: Dec. 30, 2025

(54) CREATION OF A VIRTUAL BOUNDARY FOR A ROBOTIC GARDEN TOOL

(71) Applicant: TECHTRONIC CORDLESS GP, Anderson, SC (US)

(72) Inventors: Denis Gaston Fauteux, Hong Kong (CN); Hei Man Lee, Hong Kong (CN); Hok Sum Sam Lai, Hong Kong (CN); Man Ho Choi, Hong Kong (CN); Ho Lam Ng, Hong Kong (CN); Shing Hin Li, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 227 days.

(21) Appl. No.: 18/308,078

(22) Filed: Apr. 27, 2023

(65) Prior Publication Data

US 2024/0061433 A1 Feb. 22, 2024

Related U.S. Application Data

(60) Provisional application No. 63/370,628, filed on Aug. 5, 2022, provisional application No. 63/335,944, filed on Apr. 28, 2022.

(51) Int. Cl.
*G05D 1/02* (2020.01)
*A01D 34/00* (2006.01)
(Continued)

(52) U.S. Cl.
CPC ......... *G05D 1/0214* (2013.01); *A01D 34/008* (2013.01); *G05D 1/0246* (2013.01);
(Continued)

(58) Field of Classification Search
None
See application file for complete search history.

(56) References Cited

U.S. PATENT DOCUMENTS

| 923,312 | A | 6/1909 | Alexanderson |
| 2,511,124 | A | 6/1950 | Phelps |

(Continued)

FOREIGN PATENT DOCUMENTS

| AU | 2006100911 A4 | 11/2006 |
| AU | 2011239326 A1 | 11/2011 |

(Continued)

OTHER PUBLICATIONS

US 8,272,092 B2, 09/2012, Schnittman et al. (withdrawn)
(Continued)

*Primary Examiner* — Anne Marie Antonucci
*Assistant Examiner* — Kyle S Park
(74) *Attorney, Agent, or Firm* — Michael Best & Friedrich LLP

(57) ABSTRACT

A communication system may include a robotic garden tool with an electronic processor that may be configured to determine (i) a plurality of relative distances between the robotic garden tool and an object as the object moves in the operating area, and (ii) one or more locations of the robotic garden tool as the object moves in the operating area. The electronic processor may be further configured to determine a respective location of the one or more locations of the robotic garden tool at a respective time at which data was captured that allowed for the determination of each relative distance of the plurality of relative distances. A virtual boundary may be generated using each relative distance in combination with the respective location of the robotic garden tool at the respective time at which the data was captured that allowed for the determination of each relative distance.

20 Claims, 15 Drawing Sheets

(51) Int. Cl.
    *G05D 1/00*         (2006.01)
    *A01D 101/00*     (2006.01)

(52) U.S. Cl.
    CPC ......... *G05D 1/0257* (2013.01); *G05D 1/0278* (2013.01); *G05D 1/028* (2013.01); *A01D 2101/00* (2013.01)

(56) References Cited

U.S. PATENT DOCUMENTS

| | | | |
|---|---|---|---|
| 2,539,779 | A | 1/1951 | Grosso |
| 2,701,942 | A | 2/1955 | Caldwell, Jr. et al. |
| 2,751,030 | A | 6/1956 | Null |
| 2,914,902 | A | 12/1959 | Beymer |
| 3,057,140 | A | 10/1962 | Amos et al. |
| 3,147,662 | A | 9/1964 | Snook |
| 3,311,738 | A | 3/1967 | Makow |
| 3,393,598 | A | 7/1968 | Bettinger |
| 3,500,622 | A | 3/1970 | Bowen |
| 3,570,227 | A | 3/1971 | Bellinger |
| 3,612,574 | A | 10/1971 | Klopfer et al. |
| 3,680,295 | A | 8/1972 | Rutherford |
| 3,776,327 | A | 12/1973 | Klopfer et al. |
| 4,065,913 | A | 1/1978 | Fisher et al. |
| 4,126,990 | A | 11/1978 | Fisher et al. |
| 4,126,991 | A | 11/1978 | Gobin et al. |
| 4,165,597 | A | 8/1979 | Scanland et al. |
| 4,205,510 | A | 6/1980 | Raniero |
| 4,268,964 | A | 5/1981 | Moore |
| 4,306,375 | A | 12/1981 | Goldfarb et al. |
| 4,333,202 | A | 6/1982 | Block |
| 4,351,132 | A | 9/1982 | Molin |
| 4,468,884 | A | 9/1984 | Goldfarb et al. |
| 4,492,058 | A | 1/1985 | Goldfarb et al. |
| 4,511,343 | A | 4/1985 | Goldfarb et al. |
| 4,522,606 | A | 6/1985 | Goldfarb et al. |
| 4,547,166 | A | 10/1985 | Goldfarb et al. |
| 4,591,347 | A | 5/1986 | Goldfarb et al. |
| 4,596,412 | A | 6/1986 | Everett et al. |
| 4,627,563 | A | 12/1986 | Meyer |
| 4,652,247 | A | 3/1987 | Goldfarb et al. |
| 4,673,370 | A | 6/1987 | Goldfarb et al. |
| 4,693,656 | A | 9/1987 | Guthrie |
| 4,787,794 | A | 11/1988 | Guthrie |
| 4,826,066 | A | 5/1989 | Koester et al. |
| 4,902,260 | A | 2/1990 | Im |
| 4,916,813 | A | 4/1990 | Elia |
| 4,951,985 | A | 8/1990 | Pong et al. |
| 4,958,068 | A | 9/1990 | Pong et al. |
| 4,962,453 | A | 10/1990 | Pong, Jr. et al. |
| 4,964,265 | A | 10/1990 | Young |
| 4,968,878 | A | 11/1990 | Pong et al. |
| 5,024,728 | A | 6/1991 | Morita et al. |
| 5,025,969 | A | 6/1991 | Koester et al. |
| 5,323,593 | A | 6/1994 | Cline et al. |
| 5,363,633 | A | 11/1994 | Masaru |
| 5,402,110 | A | 3/1995 | Oliver et al. |
| 5,406,778 | A | 4/1995 | Lamb et al. |
| 5,507,137 | A | 4/1996 | Norris |
| 5,540,037 | A | 7/1996 | Lamb et al. |
| 5,548,278 | A | 8/1996 | Oliver et al. |
| 5,553,445 | A | 9/1996 | Lamb et al. |
| 5,561,972 | A | 10/1996 | Rolfe |
| 5,572,856 | A | 11/1996 | Ku |
| 5,577,868 | A | 11/1996 | Chen |
| 5,703,569 | A | 12/1997 | Oliver et al. |
| 5,785,480 | A | 7/1998 | Difeo |
| 5,821,731 | A | 10/1998 | Kuki et al. |
| 5,850,135 | A | 12/1998 | Kuki et al. |
| 5,916,111 | A | 6/1999 | Colens |
| 5,942,869 | A | 8/1999 | Katou et al. |
| 6,076,025 | A | 6/2000 | Ueno et al. |
| 6,101,795 | A | 8/2000 | Diekhans |
| 6,212,917 | B1 | 4/2001 | Rathbun |
| 6,255,793 | B1 | 7/2001 | Peless et al. |
| 6,300,737 | B1 | 10/2001 | Bergvall et al. |
| 6,321,515 | B1 | 11/2001 | Colens |
| D451,931 | S | 12/2001 | Abramson et al. |
| 6,338,013 | B1 | 1/2002 | Ruffner |
| 6,339,735 | B1 | 1/2002 | Peless et al. |
| 6,417,641 | B2 | 7/2002 | Peless et al. |
| 6,442,845 | B2 | 9/2002 | Wheeler et al. |
| 6,443,509 | B1 | 9/2002 | Levin et al. |
| 6,460,253 | B1 | 10/2002 | Wheeler et al. |
| 6,465,982 | B1 | 10/2002 | Bergvall et al. |
| 6,480,768 | B1 | 11/2002 | Torii |
| 6,481,515 | B1 | 11/2002 | Kirkpatrick et al. |
| 6,493,613 | B2 | 12/2002 | Peless et al. |
| 6,502,017 | B2 | 12/2002 | Ruffner |
| 6,525,509 | B1 | 2/2003 | Petersson et al. |
| 6,586,908 | B2 | 7/2003 | Petersson et al. |
| 6,594,844 | B2 | 7/2003 | Jones |
| 6,600,981 | B2 | 7/2003 | Ruffner |
| 6,604,348 | B2 | 8/2003 | Hunt |
| 6,611,738 | B2 | 8/2003 | Ruffner |
| 6,615,108 | B1 | 9/2003 | Peless et al. |
| 6,636,847 | B1 | 10/2003 | Spires |
| 6,650,975 | B2 | 11/2003 | Ruffner |
| 6,662,889 | B2 | 12/2003 | De Fazio et al. |
| 6,728,607 | B1 | 4/2004 | Anderson |
| 6,763,282 | B2 | 7/2004 | Glenn et al. |
| 6,779,217 | B2 | 8/2004 | Fisher |
| 6,809,490 | B2 | 10/2004 | Jones et al. |
| 6,813,557 | B2 | 11/2004 | Schmidt et al. |
| 6,850,024 | B2 | 2/2005 | Peless et al. |
| 6,870,792 | B2 | 3/2005 | Chiappetta |
| 6,879,878 | B2 | 4/2005 | Glenn et al. |
| 6,885,912 | B2 | 4/2005 | Peless et al. |
| 6,907,336 | B2 | 6/2005 | Gray et al. |
| 6,934,615 | B2 | 8/2005 | Flann et al. |
| 6,984,952 | B2 | 1/2006 | Peless et al. |
| 7,010,425 | B2 | 3/2006 | Gray et al. |
| 7,024,842 | B2 | 4/2006 | Hunt et al. |
| 7,024,843 | B2 | 4/2006 | Hunt et al. |
| 7,047,712 | B1 | 5/2006 | Hunt et al. |
| 7,053,580 | B2 | 5/2006 | Aldred |
| 7,069,111 | B2 | 6/2006 | Glenn et al. |
| 7,076,348 | B2 | 7/2006 | Bucher et al. |
| 7,079,923 | B2 | 7/2006 | Abramson et al. |
| 7,079,943 | B2 | 7/2006 | Flann et al. |
| 7,085,624 | B2 | 8/2006 | Aldred et al. |
| 7,103,457 | B2 | 9/2006 | Dean |
| 7,110,881 | B2 | 9/2006 | Gray et al. |
| 7,114,318 | B2 | 10/2006 | Poulson et al. |
| 7,117,660 | B1 | 10/2006 | Colens |
| 7,133,746 | B2 | 11/2006 | Abramson et al. |
| 7,146,786 | B2 | 12/2006 | Brandon |
| 7,155,308 | B2 | 12/2006 | Jones |
| 7,155,309 | B2 | 12/2006 | Peless et al. |
| 7,166,983 | B2 | 1/2007 | Jung |
| 7,167,775 | B2 | 1/2007 | Abramson et al. |
| 7,173,391 | B2 | 2/2007 | Jones et al. |
| 7,174,157 | B2 | 2/2007 | Gassho et al. |
| 7,211,980 | B1 | 5/2007 | Bruemmer et al. |
| 7,216,033 | B2 | 5/2007 | Flann et al. |
| 7,227,334 | B2 | 6/2007 | Yang et al. |
| 7,228,214 | B2 | 6/2007 | Flann et al. |
| 7,233,683 | B2 | 6/2007 | Han et al. |
| 7,242,791 | B2 | 7/2007 | Han et al. |
| 7,286,902 | B2 | 10/2007 | Kim et al. |
| D559,867 | S | 1/2008 | Abramson |
| 7,332,890 | B2 | 2/2008 | Cohen et al. |
| 7,349,759 | B2 | 3/2008 | Peless et al. |
| 7,363,994 | B1 | 4/2008 | Defazio et al. |
| 7,369,460 | B2 | 5/2008 | Chiappetta et al. |
| 7,369,924 | B2 | 5/2008 | Han et al. |
| 7,388,343 | B2 | 6/2008 | Jones et al. |
| D573,610 | S | 7/2008 | Abramson |
| 7,395,648 | B1 | 7/2008 | Silbernagel et al. |
| 7,418,328 | B2 | 8/2008 | Romig |
| 7,429,843 | B2 | 9/2008 | Jones et al. |
| 7,430,455 | B2 | 9/2008 | Casey et al. |
| 7,444,214 | B2 | 10/2008 | Cho et al. |
| 7,469,525 | B2 | 12/2008 | Zeigler et al. |
| 7,474,941 | B2 | 1/2009 | Kim et al. |

(56) References Cited

U.S. PATENT DOCUMENTS

| | | |
|---|---|---|
| 7,480,958 B2 | 1/2009 | Song et al. |
| 7,480,960 B2 | 1/2009 | Kim |
| 7,497,053 B2 | 3/2009 | Nicolet |
| 7,499,774 B2 | 3/2009 | Barrett et al. |
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,539,557 B2 | 5/2009 | Yamauchi |
| 7,568,873 B1 | 8/2009 | Rambo |
| 7,574,282 B2 | 8/2009 | Petersson et al. |
| 7,577,499 B2 | 8/2009 | Sun et al. |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |
| 7,613,543 B2 | 11/2009 | Petersson et al. |
| 7,614,835 B2 | 11/2009 | Kitamura |
| 7,617,890 B2 | 11/2009 | Romig |
| 7,647,144 B2 | 1/2010 | Haegermarck |
| D610,072 S | 2/2010 | Wallet et al. |
| 7,663,333 B2 | 2/2010 | Jones et al. |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,720,572 B2 | 5/2010 | Ziegler et al. |
| 7,729,801 B2 | 6/2010 | Abramson |
| 7,730,705 B2 | 6/2010 | Kubinski |
| 7,769,490 B2 | 8/2010 | Abramson et al. |
| 7,787,989 B2 | 8/2010 | Colens |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,091,105 B2 | 1/2012 | Lee |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,135,498 B2 | 3/2012 | Hyung et al. |
| 8,150,574 B2 | 4/2012 | Han et al. |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,234,010 B2 | 7/2012 | Thompson et al. |
| 8,234,848 B2 | 8/2012 | Messina et al. |
| 8,237,389 B2 | 8/2012 | Fitch et al. |
| 8,239,992 B2 | 8/2012 | Schnittman et al. |
| 8,255,092 B2 | 8/2012 | Phillips et al. |
| 8,271,132 B2 | 9/2012 | Nielsen et al. |
| 8,292,007 B2 | 10/2012 | Defazio et al. |
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,297 B2 | 4/2014 | Letsky |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |

(56) References Cited

U.S. PATENT DOCUMENTS

| | | |
|---|---|---|
| 8,760,397 B2 | 6/2014 | Robbins et al. |
| 8,761,935 B2 | 6/2014 | Casey et al. |
| 8,781,627 B2 | 7/2014 | Sandin et al. |
| 8,788,092 B2 | 7/2014 | Casey et al. |
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,854,001 B2 | 10/2014 | Cohen et al. |
| 8,856,150 B2 | 10/2014 | Machtelinck |
| 8,868,237 B2 | 10/2014 | Sandin et al. |
| 8,869,337 B2 | 10/2014 | Sumonthee |
| 8,869,369 B1 | 10/2014 | Roach |
| 8,874,269 B2 | 10/2014 | Biber et al. |
| 8,874,300 B2 | 10/2014 | Allard et al. |
| D718,339 S | 11/2014 | Damshak et al. |
| D718,340 S | 11/2014 | Damshak et al. |
| D718,341 S | 11/2014 | Gur et al. |
| 8,892,352 B2 | 11/2014 | Petereit et al. |
| D718,793 S | 12/2014 | Gur et al. |
| 8,911,192 B2 | 12/2014 | Hohmann et al. |
| 8,918,241 B2 | 12/2014 | Chen et al. |
| 8,925,667 B2 | 1/2015 | Chen |
| 8,930,023 B2 | 1/2015 | Gutmann et al. |
| 8,930,024 B2 | 1/2015 | Abramson |
| 8,938,318 B2 | 1/2015 | Bergström et al. |
| 8,942,862 B2 | 1/2015 | Markusson et al. |
| 8,954,193 B2 | 2/2015 | Sandin et al. |
| 8,958,911 B2 | 2/2015 | Wong et al. |
| 8,958,939 B2 | 2/2015 | Einecke et al. |
| 8,965,578 B2 | 2/2015 | Versteeg et al. |
| 8,989,946 B2 | 3/2015 | Anderson |
| 8,989,972 B2 | 3/2015 | Anderson |
| 8,996,171 B2 | 3/2015 | Anderson et al. |
| 8,996,177 B2 | 3/2015 | Coenen |
| D729,280 S | 5/2015 | Näslund et al. |
| 9,021,777 B2 | 5/2015 | Johnson et al. |
| 9,026,299 B2 | 5/2015 | Johnson et al. |
| 9,026,302 B2 | 5/2015 | Stout et al. |
| 9,031,050 B2 | 5/2015 | Cherian et al. |
| 9,037,294 B2 | 5/2015 | Chung et al. |
| 9,043,016 B2 | 5/2015 | Filippov et al. |
| 9,043,129 B2 | 5/2015 | Bonefas et al. |
| D731,402 S | 6/2015 | Tedesco et al. |
| 9,043,952 B2 | 6/2015 | Sandin et al. |
| 9,043,953 B2 | 6/2015 | Sandin et al. |
| 9,072,218 B2 | 7/2015 | Johnson et al. |
| 9,072,219 B2 | 7/2015 | Da Rocha et al. |
| 9,079,303 B2 | 7/2015 | Abramson et al. |
| 9,093,868 B2 | 7/2015 | Baxter |
| 9,104,204 B2 | 8/2015 | Jones et al. |
| 9,104,206 B2 | 8/2015 | Biber et al. |
| 9,110,471 B2 | 8/2015 | Pack et al. |
| 9,113,595 B2 | 8/2015 | Roth et al. |
| 9,119,341 B2 | 9/2015 | Jägenstedt |
| 9,137,943 B2 | 9/2015 | Einecke et al. |
| 9,144,193 B2 | 9/2015 | Paden |
| 9,182,763 B2 | 11/2015 | Park et al. |
| 9,186,800 B2 | 11/2015 | Shin et al. |
| 9,188,980 B2 | 11/2015 | Anderson |
| 9,188,983 B2 | 11/2015 | Stout et al. |
| 9,195,256 B2 | 11/2015 | Robbins et al. |
| D745,897 S | 12/2015 | Mehra et al. |
| 9,213,934 B1 | 12/2015 | Versteeg et al. |
| 9,215,957 B2 | 12/2015 | Cohen et al. |
| 9,223,312 B2 | 12/2015 | Goel et al. |
| 9,232,692 B2 | 1/2016 | Björn et al. |
| 9,235,214 B2 | 1/2016 | Anderson |
| 9,236,637 B2 | 1/2016 | Anderson |
| 9,241,441 B2 | 1/2016 | Björn et al. |
| D748,568 S | 2/2016 | Helin et al. |
| 9,258,942 B2 | 2/2016 | Biber et al. |
| 9,268,331 B2 | 2/2016 | Abramson et al. |
| 9,276,419 B2 | 3/2016 | Borinato et al. |
| 9,278,690 B2 | 3/2016 | Smith |
| 9,301,444 B2 | 4/2016 | Campbell et al. |
| D757,637 S | 5/2016 | Horowitz |
| 9,327,407 B2 | 5/2016 | Jones et al. |
| 9,335,767 B2 | 5/2016 | Jang et al. |
| 9,338,130 B2 | 5/2016 | Von Huben et al. |
| 9,348,897 B2 | 5/2016 | Shoham et al. |
| 9,349,187 B2 | 5/2016 | Schepelmann et al. |
| D758,455 S | 6/2016 | Maibach et al. |
| D759,577 S | 6/2016 | Wang et al. |
| 9,357,699 B2 | 6/2016 | Elonsson |
| 9,363,945 B2 | 6/2016 | Jägenstedt et al. |
| 9,375,842 B2 | 6/2016 | Shamlian et al. |
| 9,376,027 B2 | 6/2016 | Harris |
| D760,806 S | 7/2016 | Cmich et al. |
| 9,380,742 B2 | 7/2016 | Biber et al. |
| 9,405,294 B2 | 8/2016 | Jägenstedt et al. |
| 9,412,515 B2 | 8/2016 | Hyde et al. |
| 9,419,453 B2 | 8/2016 | Andersson et al. |
| 9,420,741 B2 | 8/2016 | Balutis et al. |
| 9,421,879 B2 | 8/2016 | Pastoor et al. |
| 9,426,946 B2 | 8/2016 | Fisher |
| 9,429,950 B2 | 8/2016 | Sjöholm |
| 9,436,185 B2 | 9/2016 | Schnittman |
| 9,439,348 B2 | 9/2016 | Biber et al. |
| 9,439,367 B2 | 9/2016 | Abhyanker |
| 9,440,350 B2 | 9/2016 | Mou et al. |
| 9,440,354 B2 | 9/2016 | Gutmann et al. |
| 9,446,521 B2 | 9/2016 | Casey et al. |
| 9,452,525 B2 | 9/2016 | Ziegler et al. |
| 9,452,685 B2 | 9/2016 | Hyde et al. |
| D769,180 S | 10/2016 | Wang et al. |
| 9,456,545 B2 | 10/2016 | Biber |
| 9,457,677 B2 | 10/2016 | Hyde et al. |
| 9,463,704 B2 | 10/2016 | Hyde et al. |
| 9,471,063 B2 | 10/2016 | Ouyang |
| 9,480,201 B2 | 11/2016 | Maruyama et al. |
| 9,483,055 B2 | 11/2016 | Johnson et al. |
| 9,491,904 B2 | 11/2016 | Jägenstedt et al. |
| 9,497,901 B2 | 11/2016 | Willgert |
| 9,505,140 B1 | 11/2016 | Fay et al. |
| 9,510,505 B2 | 12/2016 | Halloran et al. |
| 9,516,806 B2 | 12/2016 | Yamauchi et al. |
| D776,169 S | 1/2017 | Cmich et al. |
| 9,532,688 B1 | 1/2017 | Ebrahimi Afrouzi et al. |
| 9,538,702 B2 | 1/2017 | Balutis et al. |
| 9,543,680 B2 | 1/2017 | Elonsson |
| 9,545,032 B2 | 1/2017 | Baer et al. |
| 9,550,294 B2 | 1/2017 | Cohen et al. |
| 9,554,508 B2 | 1/2017 | Balutis et al. |
| 9,559,461 B1 | 1/2017 | Diehr |
| 9,560,800 B2 | 2/2017 | Reichen et al. |
| 9,563,204 B2 | 2/2017 | Willgert |
| 9,573,275 B2 | 2/2017 | Reigo et al. |
| D781,349 S | 3/2017 | Cmich |
| D781,926 S | 3/2017 | Al-hashimi et al. |
| 9,586,563 B2 | 3/2017 | Kanai et al. |
| 9,590,862 B2 | 3/2017 | Larocca |
| 9,606,541 B2 | 3/2017 | Abramson |
| 9,622,399 B2 | 4/2017 | Kremmer et al. |
| 9,623,557 B2 | 4/2017 | Gutmann et al. |
| 9,630,319 B2 | 4/2017 | Vicenti |
| 9,632,489 B2 | 4/2017 | Biber et al. |
| 9,699,964 B2 | 7/2017 | Roth et al. |
| 9,701,020 B1 | 7/2017 | Ebrahimi Afrouzi |
| 9,711,767 B2 | 7/2017 | Juenger et al. |
| 9,713,302 B2 | 7/2017 | Sandin et al. |
| 9,713,303 B2 | 7/2017 | Jägenstedt et al. |
| D794,089 S | 8/2017 | Maibach et al. |
| 9,717,175 B2 | 8/2017 | Fay, II et al. |
| 9,720,417 B2 | 8/2017 | Reigo et al. |
| 9,723,782 B2 | 8/2017 | Roth et al. |
| 9,736,981 B2 | 8/2017 | Roth et al. |
| 9,740,210 B2 | 8/2017 | Sjöholm |
| D796,555 S | 9/2017 | Landberg et al. |
| D797,530 S | 9/2017 | Cmich |
| 9,750,183 B2 | 9/2017 | Haun |
| 9,766,627 B2 | 9/2017 | Jägenstedt et al. |

(56) References Cited

U.S. PATENT DOCUMENTS

| | | |
|---|---|---|
| D799,555 S | 10/2017 | Cmich |
| 9,785,148 B2 | 10/2017 | Yun |
| 9,788,481 B2 | 10/2017 | Das et al. |
| 9,788,483 B2 | 10/2017 | Roth et al. |
| 9,791,860 B2 | 10/2017 | Phillips et al. |
| 9,804,604 B2 | 10/2017 | Mattsson et al. |
| 9,807,925 B2 | 11/2017 | Johnson |
| 9,807,930 B1 | 11/2017 | Lydon et al. |
| 9,817,398 B2 | 11/2017 | Yamamura et al. |
| 9,820,433 B2 | 11/2017 | Borinato |
| 9,826,678 B2 | 11/2017 | Balutis et al. |
| 9,829,891 B2 | 11/2017 | Smith et al. |
| 9,841,768 B2 | 12/2017 | Hiramatsu et al. |
| 9,844,876 B2 | 12/2017 | Chung et al. |
| 9,848,529 B2 | 12/2017 | Franzius et al. |
| 9,848,532 B2 | 12/2017 | Keski-Luopa et al. |
| 9,851,718 B2 | 12/2017 | Booher |
| 9,853,468 B2 | 12/2017 | Ireland |
| D807,281 S | 1/2018 | Irwin et al. |
| D807,811 S | 1/2018 | Wang et al. |
| 9,854,737 B2 | 1/2018 | Yamauchi et al. |
| 9,854,956 B2 | 1/2018 | Song et al. |
| 9,857,025 B2 | 1/2018 | Gottinger et al. |
| 9,861,035 B2 | 1/2018 | Kruckeberg et al. |
| 9,872,437 B2 | 1/2018 | Markusson et al. |
| 9,874,876 B2 | 1/2018 | Shimamura |
| 9,876,370 B2 | 1/2018 | Yamamura et al. |
| D810,664 S | 2/2018 | Sgreccia et al. |
| D810,665 S | 2/2018 | Sgreccia et al. |
| 9,884,423 B2 | 2/2018 | Cohen et al. |
| 9,894,836 B2 | 2/2018 | Garton |
| 9,895,808 B2 | 2/2018 | Stout et al. |
| 9,901,028 B2 | 2/2018 | Hans |
| 9,903,947 B2 | 2/2018 | Das et al. |
| 9,924,632 B2 | 3/2018 | Chenevert et al. |
| 9,924,847 B2 | 3/2018 | Gottinger et al. |
| 9,931,007 B2 | 4/2018 | Morin et al. |
| 9,931,008 B2 | 4/2018 | Yoo et al. |
| 9,931,750 B2 | 4/2018 | Cohen et al. |
| 9,936,635 B2 | 4/2018 | Gottinger et al. |
| 9,968,024 B2 | 5/2018 | Haneda et al. |
| 9,972,098 B1 | 5/2018 | Ebrahimi Afrouzi et al. |
| 9,983,586 B2 | 5/2018 | Borinato |
| 10,011,180 B2 | 7/2018 | Hyde et al. |
| 10,021,830 B2 | 7/2018 | Doughty |
| 10,024,964 B2 | 7/2018 | Pierce et al. |
| 10,029,368 B2 | 7/2018 | Wolowelsky et al. |
| 10,031,527 B2 | 7/2018 | Björn |
| 10,034,421 B2 | 7/2018 | Doughty et al. |
| 10,035,270 B2 | 7/2018 | Fay et al. |
| 10,037,038 B2 | 7/2018 | Sandin et al. |
| 10,046,130 B2 | 8/2018 | Molden et al. |
| 10,054,924 B2 | 8/2018 | Willgert |
| 10,057,813 B1 | 8/2018 | Likar et al. |
| 10,067,232 B2 | 9/2018 | Halloran et al. |
| 10,070,764 B2 | 9/2018 | Schnittman et al. |
| 10,071,475 B2 | 9/2018 | Lin et al. |
| 10,078,336 B2 | 9/2018 | Reigo et al. |
| 10,080,326 B2 | 9/2018 | Yamamura et al. |
| D830,418 S | 10/2018 | Näslund et al. |
| 10,091,930 B2 | 10/2018 | Balutis et al. |
| 10,093,194 B2 | 10/2018 | Hyde et al. |
| 10,093,259 B2 | 10/2018 | Pan |
| 10,098,277 B2 | 10/2018 | Ouyang |
| 10,104,835 B2 | 10/2018 | Köhler et al. |
| 10,105,838 B2 | 10/2018 | Mou et al. |
| 10,108,198 B2 | 10/2018 | Björn et al. |
| D834,185 S | 11/2018 | Molden et al. |
| D834,504 S | 11/2018 | Ropars |
| D834,505 S | 11/2018 | Wang et al. |
| 10,117,379 B2 | 11/2018 | Guiet et al. |
| 10,123,479 B2 | 11/2018 | Ladd, Jr. et al. |
| 10,124,494 B2 | 11/2018 | Outa et al. |
| 10,131,057 B2 | 11/2018 | Patel et al. |
| 10,136,576 B2 | 11/2018 | Reigo |
| 10,149,430 B2 | 12/2018 | Bergström et al. |
| 10,152,062 B2 | 12/2018 | Schnittman |
| 10,157,334 B2 | 12/2018 | Schepelmann et al. |
| 10,159,180 B2 | 12/2018 | Balutis et al. |
| 10,162,359 B2 | 12/2018 | Johnson et al. |
| D837,150 S | 1/2019 | Näslund et al. |
| 10,165,725 B2 | 1/2019 | Sugumaran et al. |
| 10,172,282 B2 | 1/2019 | Svensson et al. |
| 10,178,826 B2 | 1/2019 | Jägenstedt et al. |
| 10,183,400 B2 | 1/2019 | Trigui et al. |
| 10,183,701 B2 | 1/2019 | Ebrahimi Afrouzi et al. |
| 10,185,325 B2 | 1/2019 | Reigo et al. |
| 10,201,261 B2 | 2/2019 | Tanaka et al. |
| 10,207,557 B2 | 2/2019 | Björn et al. |
| 10,212,880 B2 | 2/2019 | Cmich et al. |
| 10,238,026 B2 | 3/2019 | Köhler et al. |
| D845,877 S | 4/2019 | Geng et al. |
| 10,244,678 B2 | 4/2019 | Lydon et al. |
| 10,246,907 B2 | 4/2019 | Shen |
| 10,257,976 B2 | 4/2019 | Ladd, Jr. et al. |
| 10,259,498 B2 | 4/2019 | Jägenstedt et al. |
| 10,268,206 B2 | 4/2019 | Yamamura |
| 10,274,954 B2 | 4/2019 | Balutis et al. |
| D848,488 S | 5/2019 | Cmich |
| 10,281,912 B2 | 5/2019 | Hollister |
| 10,281,922 B2 | 5/2019 | Smith et al. |
| 10,299,431 B2 | 5/2019 | Ladd, Jr. et al. |
| 10,299,652 B2 | 5/2019 | Gilbert, Jr. et al. |
| D852,232 S | 6/2019 | Eidson et al. |
| 10,310,510 B2 | 6/2019 | Mannefred et al. |
| 10,315,306 B2 | 6/2019 | Abramson |
| 10,321,625 B2 | 6/2019 | Einecke et al. |
| 10,327,384 B2 | 6/2019 | Johansson et al. |
| D853,447 S | 7/2019 | Mehra et al. |
| D853,448 S | 7/2019 | Mehra et al. |
| D853,449 S | 7/2019 | Mehra et al. |
| 10,338,602 B2 | 7/2019 | Grufman et al. |
| 10,343,280 B1 | 7/2019 | Ebrahimi Afrouzi |
| 10,346,995 B1 | 7/2019 | Ebrahimi Afrouzi |
| 10,353,399 B2 | 7/2019 | Ebrahimi Afrouzi |
| 10,362,730 B2 | 7/2019 | Ladd, Jr. et al. |
| 10,365,661 B2 | 7/2019 | Jägenstedt et al. |
| 10,369,705 B2 | 8/2019 | Trigui et al. |
| 10,372,140 B2 | 8/2019 | Sun et al. |
| 10,375,880 B2 | 8/2019 | Morin et al. |
| 10,377,035 B2 | 8/2019 | He et al. |
| 10,379,172 B2 | 8/2019 | Kleiner et al. |
| 10,384,346 B2 | 8/2019 | Hickman et al. |
| 10,386,844 B2 | 8/2019 | Wilcox et al. |
| 10,390,483 B2 | 8/2019 | Balutis et al. |
| D858,424 S | 9/2019 | Chattopadhyay |
| 10,405,488 B2 | 9/2019 | Kamfors et al. |
| 10,425,488 B2 | 9/2019 | Larsén et al. |
| D864,256 S | 10/2019 | Eidson et al. |
| 10,426,083 B2 | 10/2019 | Doughty |
| 10,440,879 B2 | 10/2019 | Björn et al. |
| 10,442,083 B2 | 10/2019 | Wolowelsky et al. |
| 10,444,756 B2 | 10/2019 | Kamfors et al. |
| 10,444,757 B2 | 10/2019 | Dong et al. |
| 10,444,760 B2 | 10/2019 | Grufman et al. |
| 10,448,565 B2 | 10/2019 | Mannefred et al. |
| 10,454,287 B2 | 10/2019 | Yamamura et al. |
| 10,456,924 B2 | 10/2019 | Outa et al. |
| 10,459,452 B2 | 10/2019 | Eagling et al. |
| 10,462,961 B2 | 11/2019 | Tjernberg et al. |
| 10,463,215 B2 | 11/2019 | Morin et al. |
| 10,464,206 B2 | 11/2019 | Frisby et al. |
| 10,466,710 B2 | 11/2019 | Biber et al. |
| 10,485,164 B2 | 11/2019 | Letsky |
| 10,488,865 B2 | 11/2019 | Afrouzi et al. |
| 10,496,262 B1 | 12/2019 | Ebrahimi Afrouzi et al. |
| 10,500,722 B2 | 12/2019 | Vicenti |
| 10,514,701 B2 | 12/2019 | Windorfer |
| 10,517,211 B2 | 12/2019 | Öhrlund et al. |
| 10,518,651 B2 | 12/2019 | Svensson et al. |
| 10,520,113 B1 | 12/2019 | Thompson |
| 10,542,667 B2 | 1/2020 | Song et al. |
| 10,542,670 B2 | 1/2020 | Cmich et al. |
| 10,549,646 B2 | 2/2020 | Reynolds et al. |

(56) References Cited

U.S. PATENT DOCUMENTS

| | | |
|---|---|---|
| 10,551,844 B2 | 2/2020 | Biber et al. |
| 10,552,770 B2 | 2/2020 | Brough et al. |
| 10,555,456 B2 | 2/2020 | Borinato |
| 10,555,457 B2 | 2/2020 | Song et al. |
| 10,561,063 B2 | 2/2020 | Hasegawa et al. |
| 10,568,258 B2 | 2/2020 | Wahlgren |
| 10,571,905 B2 | 2/2020 | Yamamura |
| 10,571,928 B2 | 2/2020 | Sun et al. |
| 10,575,465 B2 | 3/2020 | Ran et al. |
| 10,575,696 B2 | 3/2020 | O'Brien et al. |
| 10,583,562 B2 | 3/2020 | Stout et al. |
| 10,588,255 B2 | 3/2020 | Song et al. |
| 10,589,418 B2 | 3/2020 | Gordon-Carroll et al. |
| 10,589,432 B2 | 3/2020 | Al Nahwi et al. |
| 10,589,433 B2 | 3/2020 | Al Nahwi et al. |
| 10,592,998 B2 | 3/2020 | Eijdenberg et al. |
| 10,594,117 B2 | 3/2020 | Song et al. |
| 10,595,459 B2 | 3/2020 | Aposhian et al. |
| 10,595,692 B2 | 3/2020 | Morin et al. |
| 10,598,793 B2 | 3/2020 | Öhrlund et al. |
| 10,599,154 B2 | 3/2020 | Dean et al. |
| 10,606,275 B2 | 3/2020 | Dean et al. |
| 10,606,279 B2 | 3/2020 | Grufman et al. |
| D880,532 S | 4/2020 | Gunnarsson et al. |
| D881,252 S | 4/2020 | Vestberg et al. |
| D882,640 S | 4/2020 | Estey |
| 10,609,862 B2 | 4/2020 | Wu et al. |
| 10,611,028 B1 | 4/2020 | Zhou et al. |
| 10,612,929 B2 | 4/2020 | Afrouzi et al. |
| 10,613,541 B1 | 4/2020 | Ebrahimi Afrouzi et al. |
| 10,621,537 B2 | 4/2020 | Ben-Alexander |
| D884,762 S | 5/2020 | Gunnarsson et al. |
| D884,763 S | 5/2020 | Gunnarsson et al. |
| 10,643,377 B2 | 5/2020 | Grufman et al. |
| 10,646,997 B2 | 5/2020 | Reigo et al. |
| 10,649,466 B2 | 5/2020 | Holmström et al. |
| 10,651,594 B1 | 5/2020 | Tsai et al. |
| 10,653,057 B2 | 5/2020 | Choi et al. |
| 10,653,058 B2 | 5/2020 | Yamanaka et al. |
| 10,653,282 B2 | 5/2020 | Song et al. |
| 10,656,652 B2 | 5/2020 | Dean et al. |
| D887,464 S | 6/2020 | Gunnarsson et al. |
| D887,465 S | 6/2020 | Gunnarsson et al. |
| D887,466 S | 6/2020 | Gunnarsson et al. |
| 10,670,406 B2 | 6/2020 | Eguchi et al. |
| 10,673,630 B2 | 6/2020 | Pakkan et al. |
| 10,674,659 B2 | 6/2020 | Ladd, Jr. et al. |
| 10,674,660 B2 | 6/2020 | Matsuzawa et al. |
| 10,681,863 B2 | 6/2020 | Hans et al. |
| 10,681,864 B2 | 6/2020 | Matt et al. |
| 10,691,000 B2 | 6/2020 | Du et al. |
| 10,698,417 B2 | 6/2020 | Churavy et al. |
| D889,517 S | 7/2020 | Prybor et al. |
| 10,716,258 B2 | 7/2020 | Pellenc et al. |
| 10,721,860 B2 | 7/2020 | Liljedahl |
| D892,187 S | 8/2020 | Maggard |
| 10,737,369 B2 | 8/2020 | Steinhauser et al. |
| 10,737,395 B2 | 8/2020 | Wolff et al. |
| 10,738,495 B2 | 8/2020 | Durvasula et al. |
| 10,739,769 B2 | 8/2020 | Dean et al. |
| 10,747,413 B2 | 8/2020 | Schneider et al. |
| 10,750,667 B2 | 8/2020 | Yamauchi et al. |
| 10,750,918 B2 | 8/2020 | Jung et al. |
| D896,737 S | 9/2020 | Phely |
| 10,758,100 B2 | 9/2020 | Cohen et al. |
| 10,765,284 B2 | 9/2020 | Song et al. |
| 10,766,147 B2 | 9/2020 | Trigui et al. |
| 10,777,000 B2 | 9/2020 | Grufman et al. |
| 10,782,705 B2 | 9/2020 | Reigo et al. |
| 10,785,907 B2 | 9/2020 | Doughty et al. |
| 10,788,832 B2 | 9/2020 | Nykamp |
| 10,791,684 B2 | 10/2020 | He et al. |
| 10,795,377 B2 | 10/2020 | Afrouzi et al. |
| 10,806,075 B2 | 10/2020 | Grufman et al. |
| 10,809,071 B2 | 10/2020 | Afrouzi et al. |
| 10,809,740 B2 | 10/2020 | Reinert et al. |
| 10,814,495 B2 | 10/2020 | Patel et al. |
| 10,820,493 B2 | 11/2020 | Ritzer et al. |
| 10,824,163 B2 | 11/2020 | Einecke et al. |
| 10,842,074 B2 | 11/2020 | Jägenstedt et al. |
| 10,843,734 B1 | 11/2020 | Ebrahimi Afrouzi et al. |
| 10,843,735 B1 | 11/2020 | Ebrahimi Afrouzi et al. |
| 10,845,481 B2 | 11/2020 | Pierce et al. |
| 10,845,804 B2 | 11/2020 | Holgersson et al. |
| D906,373 S | 12/2020 | Morin et al. |
| 10,849,267 B2 | 12/2020 | Strandberg et al. |
| 10,849,270 B2 | 12/2020 | Johansson et al. |
| 10,850,400 B2 | 12/2020 | Park |
| 10,852,735 B2 | 12/2020 | Tan et al. |
| 10,852,738 B2 | 12/2020 | Mannefred et al. |
| 10,856,467 B2 | 12/2020 | Maggard |
| 10,858,041 B2 | 12/2020 | Jägenstedt et al. |
| 10,869,432 B2 | 12/2020 | Wykman et al. |
| 10,873,194 B2 | 12/2020 | Lydon et al. |
| 10,874,045 B2 | 12/2020 | Balutis et al. |
| 10,874,049 B2 | 12/2020 | Ladd, Jr. et al. |
| 10,874,051 B2 | 12/2020 | Kasai et al. |
| 10,874,278 B2 | 12/2020 | Matt et al. |
| D908,597 S | 1/2021 | Meng et al. |
| D908,598 S | 1/2021 | Meng et al. |
| 10,882,187 B2 | 1/2021 | Li et al. |
| 10,888,046 B2 | 1/2021 | Gorenflo et al. |
| 10,890,921 B2 | 1/2021 | Gillett |
| 10,895,876 B2 | 1/2021 | Arenz et al. |
| 10,899,171 B2 | 1/2021 | Cmich |
| 10,912,253 B2 | 2/2021 | Einecke et al. |
| 10,928,833 B2 | 2/2021 | Reigo |
| 10,932,409 B2 | 3/2021 | Ingvalson et al. |
| 10,935,383 B1 | 3/2021 | Ebrahimi Afrouzi et al. |
| 10,939,611 B2 | 3/2021 | Liljedahl |
| 10,952,578 B2 | 3/2021 | Gill et al. |
| 10,959,371 B2 | 3/2021 | Zhou et al. |
| 10,966,368 B2 | 4/2021 | Desai et al. |
| 10,967,752 B2 | 4/2021 | Liu et al. |
| 10,973,168 B2 | 4/2021 | Hans et al. |
| 10,986,775 B2 | 4/2021 | Matt et al. |
| 10,986,971 B1 | 4/2021 | Ebrahimi Afrouzi |
| 10,993,598 B2 | 5/2021 | Park et al. |
| 11,003,192 B2 | 5/2021 | Dalfra et al. |
| 11,009,869 B2 | 5/2021 | Moroi et al. |
| 11,013,655 B1 | 5/2021 | Ebrahimi Afrouzi et al. |
| 11,014,460 B2 | 5/2021 | Schnittman et al. |
| 11,016,481 B2 | 5/2021 | Gustavsson et al. |
| D922,444 S | 6/2021 | Morin et al. |
| 11,019,975 B2 | 6/2021 | Jang et al. |
| 11,020,857 B2 | 6/2021 | Xiong et al. |
| 11,039,582 B2 | 6/2021 | Gilliam et al. |
| 11,039,583 B2 | 6/2021 | Gilliam et al. |
| 11,044,844 B2 | 6/2021 | Keski-luopa et al. |
| 11,048,268 B2 | 6/2021 | Ouyang |
| 11,051,449 B2 | 7/2021 | Bergh et al. |
| 11,051,671 B2 | 7/2021 | Jang et al. |
| 11,052,535 B2 | 7/2021 | Parks, II et al. |
| 11,052,540 B2 | 7/2021 | Stout et al. |
| 11,054,822 B2 | 7/2021 | Özmen |
| 11,054,836 B2 | 7/2021 | Wang et al. |
| 11,058,053 B2 | 7/2021 | Patel et al. |
| 11,064,652 B2 | 7/2021 | Matt et al. |
| 11,065,762 B2 | 7/2021 | Sakai et al. |
| 11,069,082 B1 | 7/2021 | Ebrahimi Afrouzi et al. |
| 11,071,429 B2 | 7/2021 | Jang et al. |
| 11,072,250 B2 | 7/2021 | Gilbert, Jr. et al. |
| 11,072,255 B2 | 7/2021 | Svensson et al. |
| 11,075,910 B2 | 7/2021 | Dean et al. |
| 11,076,529 B2 | 8/2021 | Chen et al. |
| 11,079,755 B2 | 8/2021 | Schlacks, IV et al. |
| 11,084,172 B2 | 8/2021 | Casey et al. |
| 11,089,732 B2 | 8/2021 | Jägenstedt et al. |
| 11,097,428 B2 | 8/2021 | Al Nahwi et al. |
| 11,099,572 B2 | 8/2021 | Cestonaro et al. |
| 11,104,006 B2 | 8/2021 | Fay et al. |
| 11,105,109 B2 | 8/2021 | Durvasula et al. |
| 11,106,215 B2 | 8/2021 | Dalfra |
| 11,109,528 B2 | 9/2021 | Strang |

(56) References Cited

U.S. PATENT DOCUMENTS

| | | |
|---|---|---|
| 11,109,731 B2 | 9/2021 | Jang et al. |
| 11,112,505 B2 | 9/2021 | Öhrlund et al. |
| 11,112,532 B2 | 9/2021 | Jägenstedt et al. |
| 11,115,798 B2 | 9/2021 | Beaulieu et al. |
| 11,117,264 B2 | 9/2021 | Tsai et al. |
| 11,119,496 B1 | 9/2021 | Ebrahimi Afrouzi et al. |
| 11,126,193 B2 | 9/2021 | Mannefred et al. |
| 11,134,609 B2 | 10/2021 | Willgert et al. |
| 11,140,815 B2 | 10/2021 | Matt et al. |
| 11,140,819 B2 | 10/2021 | Chen et al. |
| 11,141,034 B2 | 10/2021 | Jang et al. |
| 11,154,006 B2 | 10/2021 | Liljedahl |
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0121932 A1 | 5/2009 | Whitehead et al. |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |

(56) References Cited

U.S. PATENT DOCUMENTS

| | | |
|---|---|---|
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |
| 2016/0091899 A1* | 3/2016 | Aldred ............... B25J 5/00 901/1 |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1* | 10/2017 | Grufman ............... G06T 7/80 |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2017/0368691 A1 | 12/2017 | Li |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267142 A1* | 9/2018 | Motoyama ............ G01S 7/4026 |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0011928 A1* | 1/2019 | Ouyang ............... G05D 1/0212 |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0163174 A1* | 5/2019 | Ko ............... G05D 1/028 |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0327886 A1 | 10/2019 | Hahn et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0189107 A1 | 6/2020 | Joo et al. |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0275604 A1* | 9/2020 | Chen ............... G01S 19/43 |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |

(56) References Cited

U.S. PATENT DOCUMENTS

| | | |
|---|---|---|
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0089040 A1* | 3/2021 | Ebrahimi Afrouzi .................... G05D 1/0248 |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0182579 A1 | 6/2021 | Cui et al. |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0111522 A1* | 4/2022 | Ko .................... B25J 9/1666 |
| 2022/0124973 A1* | 4/2022 | Juel .................... A01D 34/008 |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0167820 A1 | 6/2022 | Wu et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0264793 A1 | 8/2022 | Kangro |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0329968 A1* | 10/2022 | Raj .................... H04W 72/54 |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |

(56) References Cited

U.S. PATENT DOCUMENTS

| | | | |
|---|---|---|---|
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |
| 2023/0270044 A1 | 8/2023 | Frick et al. |
| 2023/0345865 A1 | 11/2023 | Lee et al. |
| 2023/0389490 A1 | 12/2023 | Schenk et al. |
| 2024/0000018 A1 | 1/2024 | Choi |
| 2024/0065144 A1 | 2/2024 | Lee et al. |
| 2024/0069561 A1 | 2/2024 | Lee et al. |
| 2024/0168488 A1 | 5/2024 | Lee et al. |

FOREIGN PATENT DOCUMENTS

| | | |
|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |
| CN | 2693167 Y | 4/2005 |
| CN | 3512456 | 3/2006 |
| CN | 3599999 | 1/2007 |
| CN | 3626101 | 3/2007 |
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |
| CN | 100498602 C | 6/2009 |
| CN | 201260303 Y | 6/2009 |
| CN | 301144405 | 2/2010 |
| CN | 301276003 | 6/2010 |
| CN | 301290512 | 7/2010 |
| CN | 201557392 U | 8/2010 |
| CN | 301328063 | 8/2010 |
| CN | 101292244 B | 12/2010 |
| CN | 301444971 | 1/2011 |
| CN | 101982037 A | 3/2011 |
| CN | 201797741 U | 4/2011 |
| CN | 301506267 | 4/2011 |
| CN | 201846616 U | 6/2011 |
| CN | 301573109 | 6/2011 |
| CN | 301611305 | 7/2011 |
| CN | 301653707 | 8/2011 |
| CN | 301660006 | 8/2011 |
| CN | 301742022 | 11/2011 |
| CN | 202077380 U | 12/2011 |
| CN | 102523841 A | 7/2012 |
| CN | 302020661 | 8/2012 |
| CN | 102687620 A | 9/2012 |
| CN | 102687625 A | 9/2012 |
| CN | 302080704 | 9/2012 |
| CN | 102771246 A | 11/2012 |
| CN | 102771259 A | 11/2012 |
| CN | 302218376 | 12/2012 |
| CN | 102880175 A | 1/2013 |
| CN | 302299693 | 1/2013 |
| CN | 302350176 | 3/2013 |
| CN | 302456271 | 6/2013 |
| CN | 302483861 | 6/2013 |
| CN | 103294056 A | 9/2013 |
| CN | 103324191 A | 9/2013 |
| CN | 103324192 A | 9/2013 |
| CN | 203233683 U | 10/2013 |
| CN | 302629702 | 11/2013 |
| CN | 103473497 A | 12/2013 |
| CN | 302702748 | 1/2014 |
| CN | 103578164 A | 2/2014 |
| CN | 103676947 A | 3/2014 |
| CN | 203575087 U | 5/2014 |
| CN | 103858584 A | 6/2014 |
| CN | 203691948 U | 7/2014 |
| CN | 203735069 U | 7/2014 |
| CN | 302881351 | 7/2014 |
| CN | 104007765 A | 8/2014 |
| CN | 104025796 A | 9/2014 |
| CN | 203840762 U | 9/2014 |
| CN | 302943247 | 9/2014 |
| CN | 302943249 | 9/2014 |
| CN | 104094727 A | 10/2014 |
| CN | 104111460 A | 10/2014 |
| CN | 104111651 A | 10/2014 |
| CN | 104111652 A | 10/2014 |
| CN | 104111653 A | 10/2014 |
| CN | 203851480 U | 10/2014 |
| CN | 302974154 | 10/2014 |
| CN | 104160830 A | 11/2014 |
| CN | 302993652 | 11/2014 |
| CN | 204014494 U | 12/2014 |
| CN | 204047176 U | 12/2014 |
| CN | 303058887 | 12/2014 |
| CN | 303075143 | 1/2015 |
| CN | 104360684 A | 2/2015 |
| CN | 204143255 U | 2/2015 |
| CN | 104571102 A | 4/2015 |
| CN | 104686050 A | 6/2015 |
| CN | 104704979 A | 6/2015 |
| CN | 104704980 A | 6/2015 |
| CN | 204362599 U | 6/2015 |
| CN | 303232131 | 6/2015 |
| CN | 104737699 A | 7/2015 |
| CN | 104750104 A | 7/2015 |
| CN | 104782314 A | 7/2015 |
| CN | 104793614 A | 7/2015 |
| CN | 104793617 A | 7/2015 |
| CN | 204443108 U | 7/2015 |
| CN | 204462853 U | 7/2015 |
| CN | 204495362 U | 7/2015 |
| CN | 204515530 U | 7/2015 |
| CN | 204539960 U | 8/2015 |
| CN | 303318601 | 8/2015 |
| CN | 104904403 A | 9/2015 |
| CN | 104904404 A | 9/2015 |
| CN | 204613789 U | 9/2015 |
| CN | 204649212 U | 9/2015 |
| CN | 303408640 | 10/2015 |
| CN | 105082080 A | 11/2015 |
| CN | 105096177 A | 11/2015 |
| CN | 303452341 | 11/2015 |
| CN | 303452355 | 11/2015 |
| CN | 105163037 A | 12/2015 |
| CN | 204810982 U | 12/2015 |
| CN | 204858702 U | 12/2015 |
| CN | 303478376 | 12/2015 |
| CN | 303519781 | 12/2015 |
| CN | 105230225 A | 1/2016 |
| CN | 103621244 B | 2/2016 |
| CN | 105353758 A | 2/2016 |
| CN | 303579400 | 2/2016 |
| CN | 105432212 A | 3/2016 |
| CN | 105512689 A | 4/2016 |
| CN | 303654613 | 4/2016 |
| CN | 105557175 A | 5/2016 |
| CN | 105573308 A | 5/2016 |
| CN | 105573311 A | 5/2016 |
| CN | 303670522 | 5/2016 |
| CN | 105660039 A | 6/2016 |
| CN | 105684630 A | 6/2016 |
| CN | 105700521 A | 6/2016 |
| CN | 204925588 U | 6/2016 |
| CN | 205335882 U | 6/2016 |
| CN | 205336853 U | 6/2016 |
| CN | 303690781 | 6/2016 |
| CN | 105759813 A | 7/2016 |

(56) References Cited

FOREIGN PATENT DOCUMENTS

| | | |
|---|---|---|
| CN | 205431101 U | 8/2016 |
| CN | 205489586 U | 8/2016 |
| CN | 303778782 | 8/2016 |
| CN | 303862286 | 9/2016 |
| CN | 103283404 B | 10/2016 |
| CN | 105988469 A | 10/2016 |
| CN | 105988470 A | 10/2016 |
| CN | 106020207 A | 10/2016 |
| CN | 303888354 | 10/2016 |
| CN | 303888360 | 10/2016 |
| CN | 106142023 A | 11/2016 |
| CN | 205694315 U | 11/2016 |
| CN | 303933081 | 11/2016 |
| CN | 103941600 B | 12/2016 |
| CN | 106171248 A | 12/2016 |
| CN | 205812811 U | 12/2016 |
| CN | 205829192 U | 12/2016 |
| CN | 205830138 U | 12/2016 |
| CN | 303969591 | 12/2016 |
| CN | 106258166 A | 1/2017 |
| CN | 106325280 A | 1/2017 |
| CN | 106355609 A | 1/2017 |
| CN | 304004639 | 1/2017 |
| CN | 106393094 A | 2/2017 |
| CN | 106406301 A | 2/2017 |
| CN | 304055132 | 2/2017 |
| CN | 304055134 | 2/2017 |
| CN | 304055136 | 2/2017 |
| CN | 106489412 A | 3/2017 |
| CN | 205993268 U | 3/2017 |
| CN | 103576681 B | 4/2017 |
| CN | 206115269 U | 4/2017 |
| CN | 304095129 | 4/2017 |
| CN | 106647727 A | 5/2017 |
| CN | 106708033 A | 5/2017 |
| CN | 206196372 U | 5/2017 |
| CN | 304129527 | 5/2017 |
| CN | 304129534 | 5/2017 |
| CN | 106852225 A | 6/2017 |
| CN | 106877420 A | 6/2017 |
| CN | 206274765 U | 6/2017 |
| CN | 206278169 U | 6/2017 |
| CN | 304175254 | 6/2017 |
| CN | 304208974 | 7/2017 |
| CN | 107024910 A | 8/2017 |
| CN | 304227934 | 8/2017 |
| CN | 304241160 | 8/2017 |
| CN | 206472500 U | 9/2017 |
| CN | 304283754 | 9/2017 |
| CN | 206547328 U | 10/2017 |
| CN | 206547363 U | 10/2017 |
| CN | 206611777 U | 11/2017 |
| CN | 206611791 U | 11/2017 |
| CN | 206611812 U | 11/2017 |
| CN | 206619022 U | 11/2017 |
| CN | 107463166 A | 12/2017 |
| CN | 107463168 A | 12/2017 |
| CN | 107505939 A | 12/2017 |
| CN | 107515603 A | 12/2017 |
| CN | 107516226 A | 12/2017 |
| CN | 107517642 A | 12/2017 |
| CN | 206686605 U | 12/2017 |
| CN | 206808075 U | 12/2017 |
| CN | 107544483 A | 1/2018 |
| CN | 107600209 A | 1/2018 |
| CN | 107624368 A | 1/2018 |
| CN | 207037461 U | 2/2018 |
| CN | 107800200 A | 3/2018 |
| CN | 207075257 U | 3/2018 |
| CN | 304529661 | 3/2018 |
| CN | 304544247 | 3/2018 |
| CN | 107888751 A | 4/2018 |
| CN | 107913034 A | 4/2018 |
| CN | 107960191 A | 4/2018 |
| CN | 207201326 U | 4/2018 |
| CN | 304565875 | 4/2018 |
| CN | 108055906 A | 5/2018 |
| CN | 108064539 A | 5/2018 |
| CN | 108073179 A | 5/2018 |
| CN | 108156957 A | 6/2018 |
| CN | 108205313 A | 6/2018 |
| CN | 108226965 A | 6/2018 |
| CN | 207496811 U | 6/2018 |
| CN | 108323326 A | 7/2018 |
| CN | 108337987 A | 7/2018 |
| CN | 108345297 A | 7/2018 |
| CN | 108345298 A | 7/2018 |
| CN | 207639110 U | 7/2018 |
| CN | 207651536 U | 7/2018 |
| CN | 207692389 U | 8/2018 |
| CN | 304767946 | 8/2018 |
| CN | 304794944 | 8/2018 |
| CN | 207851614 U | 9/2018 |
| CN | 304806495 | 9/2018 |
| CN | 304811825 | 9/2018 |
| CN | 108664014 A | 10/2018 |
| CN | 108693873 A | 10/2018 |
| CN | 207965652 U | 10/2018 |
| CN | 108919814 A | 11/2018 |
| CN | 208159284 U | 11/2018 |
| CN | 108957512 A | 12/2018 |
| CN | 109062225 A | 12/2018 |
| CN | 109075284 A | 12/2018 |
| CN | 208175354 U | 12/2018 |
| CN | 208285831 U | 12/2018 |
| CN | 304926953 | 12/2018 |
| CN | 304926955 | 12/2018 |
| CN | 109213123 A | 1/2019 |
| CN | 208387297 U | 1/2019 |
| CN | 304980236 | 1/2019 |
| CN | 305010344 | 1/2019 |
| CN | 305010365 | 1/2019 |
| CN | 305017366 | 1/2019 |
| CN | 105875063 B | 2/2019 |
| CN | 208480301 U | 2/2019 |
| CN | 208521989 U | 2/2019 |
| CN | 305027640 | 2/2019 |
| CN | 109542092 A | 3/2019 |
| CN | 208638993 U | 3/2019 |
| CN | 109566065 A | 4/2019 |
| CN | 109601114 A | 4/2019 |
| CN | 109658937 A | 4/2019 |
| CN | 109682368 A | 4/2019 |
| CN | 109682371 A | 4/2019 |
| CN | 109683604 A | 4/2019 |
| CN | 109696888 A | 4/2019 |
| CN | 208739598 U | 4/2019 |
| CN | 208752461 U | 4/2019 |
| CN | 109757189 A | 5/2019 |
| CN | 106982585 B | 6/2019 |
| CN | 109892096 A | 6/2019 |
| CN | 109946646 A * | 6/2019 |
| CN | 209002355 U | 6/2019 |
| CN | 209002393 U | 6/2019 |
| CN | 305196413 | 6/2019 |
| CN | 305225230 | 6/2019 |
| CN | 305227797 | 6/2019 |
| CN | 305227798 | 6/2019 |
| CN | 305227800 | 6/2019 |
| CN | 305503785 | 6/2019 |
| CN | 109960253 A | 7/2019 |
| CN | 109962512 A | 7/2019 |
| CN | 109983907 A | 7/2019 |
| CN | 109983908 A | 7/2019 |
| CN | 110018686 A | 7/2019 |
| CN | 209170907 U | 7/2019 |
| CN | 305261165 | 7/2019 |
| CN | 305261166 | 7/2019 |
| CN | 305265564 | 7/2019 |
| CN | 209265268 U | 8/2019 |
| CN | 209299766 U | 8/2019 |
| CN | 106155056 B | 9/2019 |
| CN | 110221594 A | 9/2019 |
| CN | 110268858 A | 9/2019 |

(56) References Cited

FOREIGN PATENT DOCUMENTS

| | | |
|---|---|---|
| CN | 209409782 U | 9/2019 |
| CN | 305355791 | 9/2019 |
| CN | 305357008 | 9/2019 |
| CN | 110347144 A | 10/2019 |
| CN | 110366368 A | 10/2019 |
| CN | 305407445 | 10/2019 |
| CN | 110447372 A | 11/2019 |
| CN | 209676901 U | 11/2019 |
| CN | 305447400 | 11/2019 |
| CN | 305452583 | 11/2019 |
| CN | 110584551 A | 12/2019 |
| CN | 110622680 A | 12/2019 |
| CN | 209861609 U | 12/2019 |
| CN | 305523640 | 12/2019 |
| CN | 209955654 U | 1/2020 |
| CN | 209964645 U | 1/2020 |
| CN | 305574602 | 1/2020 |
| CN | 110764495 A | 2/2020 |
| CN | 110850858 A | 2/2020 |
| CN | 110850860 A | 2/2020 |
| CN | 110852133 A | 2/2020 |
| CN | 210016305 U | 2/2020 |
| CN | 210116329 U | 2/2020 |
| CN | 305596393 | 2/2020 |
| CN | 105988472 B | 3/2020 |
| CN | 107493797 B | 3/2020 |
| CN | 110881903 A | 3/2020 |
| CN | 110895411 A | 3/2020 |
| CN | 110915409 A | 3/2020 |
| CN | 110928280 A | 3/2020 |
| CN | 110928285 A | 3/2020 |
| CN | 107643751 B | 4/2020 |
| CN | 111034450 A | 4/2020 |
| CN | 111045423 A | 4/2020 |
| CN | 305716236 | 4/2020 |
| CN | 107643750 B | 5/2020 |
| CN | 108142070 B | 5/2020 |
| CN | 111123910 A | 5/2020 |
| CN | 111165158 A | 5/2020 |
| CN | 210444878 U | 5/2020 |
| CN | 210580043 U | 5/2020 |
| CN | 305750432 | 5/2020 |
| CN | 305757781 | 5/2020 |
| CN | 305789888 | 5/2020 |
| CN | 111226569 A | 6/2020 |
| CN | 210782124 U | 6/2020 |
| CN | 210808273 U | 6/2020 |
| CN | 210821640 U | 6/2020 |
| CN | 210839520 U | 6/2020 |
| CN | 305827495 | 6/2020 |
| CN | 305827496 | 6/2020 |
| CN | 305827503 | 6/2020 |
| CN | 305860595 | 6/2020 |
| CN | 305860598 | 6/2020 |
| CN | 305869411 | 6/2020 |
| CN | 106717462 B | 7/2020 |
| CN | 108811699 B | 7/2020 |
| CN | 210900401 U | 7/2020 |
| CN | 210987056 U | 7/2020 |
| CN | 211015146 U | 7/2020 |
| CN | 305946746 | 7/2020 |
| CN | 305946760 | 7/2020 |
| CN | 111487982 A | 8/2020 |
| CN | 111512766 A | 8/2020 |
| CN | 211212948 U | 8/2020 |
| CN | 305989577 | 8/2020 |
| CN | 306019404 | 8/2020 |
| CN | 105988471 B | 9/2020 |
| CN | 111685651 A | 9/2020 |
| CN | 211531846 U | 9/2020 |
| CN | 211580673 U | 9/2020 |
| CN | 107637255 B | 10/2020 |
| CN | 110754204 B | 10/2020 |
| CN | 111742692 A | 10/2020 |
| CN | 111766589 A | 10/2020 |
| CN | 111819988 A | 10/2020 |
| CN | 211721118 U | 10/2020 |
| CN | 211721119 U | 10/2020 |
| CN | 211741921 U | 10/2020 |
| CN | 211741924 U | 10/2020 |
| CN | 306085189 | 10/2020 |
| CN | 306128197 | 10/2020 |
| CN | 306140210 | 10/2020 |
| CN | 306174630 | 11/2020 |
| CN | 112009175 A | 12/2020 |
| CN | 112119742 A | 12/2020 |
| CN | 112120620 A | 12/2020 |
| CN | 112134314 A | 12/2020 |
| CN | 112147992 A | 12/2020 |
| CN | 212061111 U | 12/2020 |
| CN | 212116218 U | 12/2020 |
| CN | 212116223 U | 12/2020 |
| CN | 306223128 | 12/2020 |
| CN | 306236075 | 12/2020 |
| CN | 306236808 | 12/2020 |
| CN | 112230636 A | 1/2021 |
| CN | 112230637 A | 1/2021 |
| CN | 112230644 A | 1/2021 |
| CN | 112235760 A | 1/2021 |
| CN | 112259866 A | 1/2021 |
| CN | 112261631 A | 1/2021 |
| CN | 212304892 U | 1/2021 |
| CN | 212305863 U | 1/2021 |
| CN | 306278588 | 1/2021 |
| CN | 306303188 | 1/2021 |
| CN | 106909140 B | 2/2021 |
| CN | 109247117 B | 2/2021 |
| CN | 109683556 B | 2/2021 |
| CN | 112306049 A | 2/2021 |
| CN | 112385401 A | 2/2021 |
| CN | 112400453 A | 2/2021 |
| CN | 212499740 U | 2/2021 |
| CN | 212515710 U | 2/2021 |
| CN | 212520009 U | 2/2021 |
| CN | 212539202 U | 2/2021 |
| CN | 212572469 U | 2/2021 |
| CN | 212621511 U | 2/2021 |
| CN | 306328112 | 2/2021 |
| CN | 112435422 A | 3/2021 |
| CN | 112438114 A | 3/2021 |
| CN | 112445221 A | 3/2021 |
| CN | 112449864 A | 3/2021 |
| CN | 112492956 A | 3/2021 |
| CN | 112514637 A | 3/2021 |
| CN | 112567959 A | 3/2021 |
| CN | 112567961 A | 3/2021 |
| CN | 212696648 U | 3/2021 |
| CN | 212696668 U | 3/2021 |
| CN | 306358736 | 3/2021 |
| CN | 112602441 A | 4/2021 |
| CN | 112720451 A | 4/2021 |
| CN | 112731935 A | 4/2021 |
| CN | 212876733 U | 4/2021 |
| CN | 212906002 U | 4/2021 |
| CN | 212933333 U | 4/2021 |
| CN | 212970834 U | 4/2021 |
| CN | 213075541 U | 4/2021 |
| CN | 213091901 U | 4/2021 |
| CN | 112740889 A | 5/2021 |
| CN | 112764419 A | 5/2021 |
| CN | 112769424 A | 5/2021 |
| CN | 112773264 A | 5/2021 |
| CN | 112799395 A | 5/2021 |
| CN | 112799399 A | 5/2021 |
| CN | 112823584 A | 5/2021 |
| CN | 112824993 A | 5/2021 |
| CN | 112826376 A | 5/2021 |
| CN | 112840828 A | 5/2021 |
| CN | 112859828 A | 5/2021 |
| CN | 213187216 U | 5/2021 |
| CN | 213210764 U | 5/2021 |
| CN | 213214364 U | 5/2021 |
| CN | 213240579 U | 5/2021 |
| CN | 306511371 | 5/2021 |

(56) References Cited

FOREIGN PATENT DOCUMENTS

| | | |
|---|---|---|
| CN | 306530808 | 5/2021 |
| CN | 306569554 | 5/2021 |
| CN | 306569555 | 5/2021 |
| CN | 306569560 | 5/2021 |
| CN | 107976995 B | 6/2021 |
| CN | 110122045 B | 6/2021 |
| CN | 112947399 A | 6/2021 |
| CN | 112970414 A | 6/2021 |
| CN | 113039919 A | 6/2021 |
| CN | 213306269 U | 6/2021 |
| CN | 306604261 | 6/2021 |
| CN | 113064419 A | 7/2021 |
| CN | 113115621 A | 7/2021 |
| CN | 113156928 A | 7/2021 |
| CN | 113156929 A | 7/2021 |
| CN | 213814000 U | 7/2021 |
| CN | 306670241 | 7/2021 |
| CN | 306680105 | 7/2021 |
| CN | 306694791 | 7/2021 |
| CN | 106300578 B | 8/2021 |
| CN | 108781704 B | 8/2021 |
| CN | 113311830 A | 8/2021 |
| CN | 213850492 U | 8/2021 |
| CN | 213921292 U | 8/2021 |
| CN | 306745285 | 8/2021 |
| CN | 306753239 | 8/2021 |
| CN | 306768440 | 8/2021 |
| CN | 113366964 A | 9/2021 |
| CN | 113439526 A | 9/2021 |
| CN | 113448259 A | 9/2021 |
| CN | 214126036 U | 9/2021 |
| CN | 214151499 U | 9/2021 |
| CN | 214178073 U | 9/2021 |
| CN | 214240309 U | 9/2021 |
| CN | 306824139 | 9/2021 |
| CN | 306839148 | 9/2021 |
| CN | 306846782 | 9/2021 |
| CN | 113455167 A | 10/2021 |
| CN | 113552873 A | 10/2021 |
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 113821021 A * | 12/2021 ........... G05D 1/0214 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114039681 A | 2/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 114518747 A | 5/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115166755 A | 10/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| DE | 102022100849 A1 | 7/2022 |
| EP | 1364571 A2 | 11/2003 |
| EP | 1709859 A | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |

(56) References Cited

FOREIGN PATENT DOCUMENTS

| | | |
|---|---|---|
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2946650 A1 | 11/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3725146 A1 | 10/2020 |
| EP | 3753387 A1 | 12/2020 |
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |
| EP | 3639644 B1 | 1/2022 |
| EP | 4187280 A1 | 5/2023 |
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 3/1971 |
| GB | 1371959 A | 10/1974 |
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 2517572 B | 2/2019 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006251883 A | 9/2006 |
| JP | 2006268497 A | 10/2006 |
| JP | 2011020615 A | 2/2011 |
| JP | 2015149963 A | 8/2015 |
| JP | 2020203075 A | 12/2020 |
| KR | 101204086 B1 | 11/2012 |
| KR | 20130044130 A | 5/2013 |
| KR | 20150125305 A | 11/2015 |
| KR | 102060715 B1 | 12/2019 |
| KR | 102070068 B1 | 3/2020 |
| KR | 20220026600 A | 3/2022 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO9106435 A1 | 5/1991 |
| WO | WO9749528 A1 | 12/1997 |
| WO | WO0060921 A1 | 10/2000 |
| WO | WO0074466 A1 | 12/2000 |
| WO | WO03040846 A1 | 5/2003 |
| WO | WO03103375 A1 | 12/2003 |
| WO | WO2005002320 A1 | 1/2005 |
| WO | WO2006094887 A2 | 9/2006 |
| WO | WO2006094889 A1 | 9/2006 |
| WO | WO2006102740 A1 | 10/2006 |
| WO | WO2007091967 A1 | 8/2007 |
| WO | WO2007140930 A1 | 12/2007 |
| WO | WO2008015479 A2 | 2/2008 |
| WO | WO2008060689 A2 | 5/2008 |
| WO | WO2008068494 A1 | 6/2008 |
| WO | WO2008095715 A2 | 8/2008 |
| WO | WO2008144135 A1 | 11/2008 |
| WO | WO2009036644 A1 | 3/2009 |
| WO | WO2009071379 A1 | 6/2009 |
| WO | WO2009077239 A1 | 6/2009 |
| WO | WO2009083319 A1 | 7/2009 |
| WO | WO2010077198 A1 | 7/2010 |
| WO | WO2010130479 A2 | 11/2010 |
| WO | WO2011115536 A1 | 9/2011 |
| WO | WO2012047176 A1 | 4/2012 |
| WO | WO2013010475 A1 | 1/2013 |
| WO | WO2013011252 A1 | 1/2013 |
| WO | WO2013025135 A1 | 2/2013 |
| WO | WO2013064301 A1 | 5/2013 |
| WO | WO2013081516 A1 | 6/2013 |
| WO | WO2013083311 A1 | 6/2013 |
| WO | WO2013102417 A1 | 7/2013 |
| WO | WO2013107266 A1 | 7/2013 |
| WO | WO2013107374 A1 | 7/2013 |
| WO | WO2013125992 A1 | 8/2013 |
| WO | WO2013185622 A1 | 12/2013 |
| WO | WO2014007694 A1 | 1/2014 |
| WO | WO2014056443 A1 | 4/2014 |
| WO | WO2014071860 A1 | 5/2014 |
| WO | WO2014079363 A1 | 5/2014 |
| WO | WO2014079632 A1 | 5/2014 |
| WO | WO2014086267 A1 | 6/2014 |
| WO | WO2014173290 A1 | 10/2014 |
| WO | WO2015010277 A1 | 1/2015 |
| WO | WO2015053488 A1 | 4/2015 |
| WO | WO2015144998 A1 | 10/2015 |
| WO | WO2015154822 A1 | 10/2015 |
| WO | WO2015161829 A1 | 10/2015 |
| WO | WO2015169343 A1 | 11/2015 |
| WO | WO2015172831 A1 | 11/2015 |

(56) References Cited

FOREIGN PATENT DOCUMENTS

| | | |
|---|---|---|
| WO | WO2015182514 A1 | 12/2015 |
| WO | WO2015192903 A1 | 12/2015 |
| WO | WO2016038512 A1 | 3/2016 |
| WO | WO2016097891 A1 | 6/2016 |
| WO | WO2016097892 A1 | 6/2016 |
| WO | WO2016097897 A1 | 6/2016 |
| WO | WO2016103070 A1 | 6/2016 |
| WO | WO2016108104 A1 | 7/2016 |
| WO | WO2016109721 A1 | 7/2016 |
| WO | WO2016119751 A1 | 8/2016 |
| WO | WO2016127923 A1 | 8/2016 |
| WO | WO2016131399 A1 | 8/2016 |
| WO | WO2016184398 A1 | 11/2016 |
| WO | WO2017101882 A1 | 6/2017 |
| WO | WO2017123137 A1 | 7/2017 |
| WO | WO2017129551 A1 | 8/2017 |
| WO | WO2017133625 A1 | 8/2017 |
| WO | WO2017148438 A1 | 9/2017 |
| WO | WO2017167207 A1 | 10/2017 |
| WO | WO2017181995 A1 | 10/2017 |
| WO | WO2017186372 A1 | 11/2017 |
| WO | WO2017190784 A1 | 11/2017 |
| WO | WO2017198222 A1 | 11/2017 |
| WO | WO2017206950 A1 | 12/2017 |
| WO | WO2017211308 A1 | 12/2017 |
| WO | WO2018001340 A1 | 1/2018 |
| WO | WO2018010650 A1 | 1/2018 |
| WO | WO2018028624 A1 | 2/2018 |
| WO | WO2018057250 A1 | 3/2018 |
| WO | WO2018057452 A2 | 3/2018 |
| WO | WO2018057589 A1 | 3/2018 |
| WO | WO2018059323 A1 | 4/2018 |
| WO | WO2018103178 A1 | 6/2018 |
| WO | WO2018117190 A1 | 6/2018 |
| WO | WO2018125222 A1 | 7/2018 |
| WO | WO2018127209 A1 | 7/2018 |
| WO | WO2018146518 A1 | 8/2018 |
| WO | WO2018153599 A1 | 8/2018 |
| WO | WO2018174777 A1 | 9/2018 |
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO2020193513 A1 | 10/2020 |
| WO | WO2020199055 A1 | 10/2020 |
| WO | WO2020218960 A1 | 10/2020 |
| WO | WO2020256619 A1 | 12/2020 |
| WO | WO2020259586 A1 | 12/2020 |
| WO | WODM212022 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021058030 A1 | 4/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | 2021162840 A1 | 8/2021 |
| WO | WO2021164738 A1 | 8/2021 |
| WO | WO2021175331 A1 | 9/2021 |
| WO | WO2021180123 A1 | 9/2021 |
| WO | WO2021190627 A1 | 9/2021 |
| WO | WO2021208308 A1 | 10/2021 |
| WO | WO2021212731 A1 | 10/2021 |
| WO | WO2021215980 A1 | 10/2021 |
| WO | WODM217452 | 10/2021 |
| WO | WO2021225494 A1 | 11/2021 |
| WO | WO2021230791 A1 | 11/2021 |
| WO | WO2021233205 A1 | 11/2021 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Machine translation of CN-109946646-A (Year: 2019).*
Machine translation of CN-113821021-A (Year: 2021).*
Extended European Search Report for Application No. 23169272.4 dated Aug. 23, 2023 (9 pages).

* cited by examiner

CREATION OF A VIRTUAL BOUNDARY FOR A ROBOTIC GARDEN TOOL

RELATED APPLICATIONS

This application claims priority to U.S. Provisional Application No. 63/370,628, filed on Aug. 5, 2022 and to U.S. Provisional Application No. 63/335,944, filed on Apr. 28, 2022, the entire contents of each of which are hereby incorporated by reference.

FIELD

The present disclosure relates to robotic garden tools, particularly to methods and systems for creating one or more virtual boundaries for a robotic garden tool within an operating area.

SUMMARY

One embodiment includes a communication system that may include a robotic garden tool. The robotic garden tool may include a housing, and a set of wheels coupled to the housing and configured to rotate to propel the robotic garden tool on an operating surface in an operating area. The robotic garden tool may also include at least one wheel motor coupled to one or more wheels of the set of wheels. The at least one wheel motor may be configured to drive rotation of the one or more wheels. The robotic garden tool may also include an electronic processor that may be configured to determine a plurality of relative distances between the robotic garden tool and an object as the object moves in the operating area. The electronic processor may be further configured to determine one or more locations of the robotic garden tool as the object moves in the operating area. The electronic processor may be further configured to determine a respective location of the one or more locations of the robotic garden tool at a respective time at which data was captured that allowed for the determination of each relative distance of the plurality of relative distances. A virtual boundary may be generated using each relative distance of the plurality of relative distances in combination with the respective location of the robotic garden tool at the respective time at which the data was captured that allowed for the determination of each relative distance of the plurality of relative distances. The electronic processor may be further configured to control the robotic garden tool to be confined by the virtual boundary to remain in the operating area during operation of the robotic garden tool.

In addition to any combination of features described above, the electronic processor may be configured to determine a plurality of waypoints. Each waypoint of the plurality of waypoints may be based on a respective relative distance of the plurality of relative distances and the respective location of the robotic garden tool at the respective time at which the data was captured that allowed for the determination of the respective relative distance of the plurality of relative distances. The electronic processor also may be configured to generate the virtual boundary using the waypoints.

In addition to any combination of features described above, the communication system may include a network interface configured to allow the electronic processor to communicate with a base station device. The base station device may be configured to receive a location signal from a satellite and transmit calibration information regarding the location signal to the robotic garden tool. The electronic processor may be configured to receive the location signal from the satellite, receive the calibration information from the base station device, and determine the one or more locations of the robotic garden tool based on (i) the location signal and (ii) the calibration information.

In addition to any combination of features described above, the electronic processor may be configured to receive the location signal via a first real-time kinematic global navigating satellite systems (RTK GNSS) receiver of the robotic garden tool. The electronic processor may be configured to receive the calibration information via a first radio frequency transceiver of the robotic garden tool. The base station device may be configured to receive the location signal via a second RTK GNSS receiver of the base station device. The base station device may also be configured to transmit the calibration information via a second radio frequency transceiver of the base station device.

In addition to any combination of features described above, the electronic processor may be configured to control operation of the at least one wheel motor to control movement of the robotic garden tool such that the robotic garden tool moves toward the object as the object moves in the operating area.

In addition to any combination of features described above, the electronic processor may be configured to control operation of the at least one wheel motor to control movement of the robotic garden tool such that the robotic garden tool moves toward the object as the object moves in the operating area by at least one of: (i) determining a received signal strength indication (RSSI) of a signal output by the object, and controlling movement of the robotic garden tool such that the RSSI of the signal output by the object is at or above a predetermined RSSI threshold; (ii) determining that a relative distance of the plurality of relative distances is greater than or equal to a predetermined threshold, and controlling movement of the robotic garden tool to move toward the object until the relative distance between the robotic garden tool and the object decreases below the predetermined threshold; and (iii) receiving a command from the object, wherein the command includes instructions for how to control the robotic garden tool to move the robotic garden tool toward the object.

In addition to any combination of features described above, the electronic processor may be configured to time stamp each relative distance of the plurality of relative distances with the respective time corresponding to when the data was captured that allowed for the determination of the relative distance. The electronic processor may also be configured to time stamp each location of the one or more locations with a second respective time corresponding to when the location was determined. The electronic processor also may be configured to transmit the plurality of relative distances, the one or more locations, and respective time stamps for each of the plurality of relative distances and the one or more locations to a remote device. The remote device may be configured to generate the virtual boundary using the plurality of relative distances, the one or more locations, and the respective time stamps for each of the plurality of relative distances and the one or more locations. The electronic processor may also be configured to receive the virtual boundary from the remote device.

In addition to any combination of features described above, the electronic processor may be configured to receive a plurality of images captured by a camera as the object moves in the operating area. Each image of the plurality of images may include the object. The electronic processor may also be configured to determine each relative distance of the plurality of relative distances based on a location and orientation of the object in a respective image of the plurality of images.

In addition to any combination of features described above, the camera may be integrated into the housing of the robotic garden tool.

In addition to any combination of features described above, the camera may be integrated into an external device, and the robotic garden tool may include a securing device to secure the external device to the robotic garden tool. The robotic garden tool may be configured to receive the plurality of images from the external device.

In addition to any combination of features described above, the object may include a human user, and the electronic processor may be configured to recognize the object within each image of the plurality of images using an image analytics technique based on an expected shape of the human user.

In addition to any combination of features described above, the object may include a fiducial marker, and the electronic processor may be configured to recognize the object within each image of the plurality of images using an image analytics technique based on an expected design of the fiducial marker.

In addition to any combination of features described above, the communication system may include a millimeter wave radar device. The electronic processor may be configured to receive a plurality of data samples captured by the millimeter wave radar device as the object moves in the operating area. Each data sample of the plurality of data samples may include data indicating a respective location of the object. The electronic processor may be configured to determine each relative distance of the plurality of relative distances based on the respective location of the object in each data sample of the plurality of data samples.

In addition to any combination of features described above, the object may include a human user, and the electronic processor, the millimeter wave radar device, or both the electronic processor and the millimeter wave radar device may be configured to recognize the object within each data sample of the plurality of data samples based on an expected shape of the human user.

In addition to any combination of features described above, the communication system may include a server device configured to receive the plurality of relative distances and the respective location of the robotic garden tool at the respective time at which the data was captured that allowed for the determination of each relative distance of the plurality of relative distances. The server device may be configured to generate the virtual boundary using each relative distance of the plurality of relative distances in combination with the respective location of the robotic garden tool at the respective time at which the data was captured that allowed for the determination of each relative distance of the plurality of relative distances.

Another embodiment includes a method of creating a virtual boundary. The method may include determining, with an electronic processor of a robotic garden tool, a plurality of relative distances between the robotic garden tool and an object as the object moves in an operating area. The robotic garden tool may include a housing, and a set of wheels coupled to the housing and configured to rotate to propel the robotic garden tool on an operating surface in the operating area. The robotic garden tool may further include at least one wheel motor coupled to one or more wheels of the set of wheels, the at least one wheel motor configured to drive rotation of the one or more wheels. The method may further include determining, with the electronic processor, one or more locations of the robotic garden tool as the object moves in the operating area. The method may further include determining, with the electronic processor, a respective location of the one or more locations of the robotic garden tool at a respective time at which data was captured that allowed for the determining of each relative distance of the plurality of relative distances. The method may further include generating the virtual boundary using each relative distance of the plurality of relative distances in combination with the respective location of the robotic garden tool at the respective time at which the data was captured that allowed for the determining of each relative distance of the plurality of relative distances. The method may further include controlling, with the electronic processor, the robotic garden tool to be confined by the virtual boundary to remain in the operating area during operation of the robotic garden tool.

In addition to any combination of features described above, the method may also include receiving, with the electronic processor, a plurality of images captured by a camera as the object moves in the operating area. Each image of the plurality of images may include the object. The method may also include determining, with the electronic processor, each relative distance of the plurality of relative distances based on (i) a location of the object in a respective image of the plurality of images and (ii) the respective location of the robotic garden tool at the respective time at which the respective image was captured.

In addition to any combination of features described above, the camera may be integrated into the housing of the robotic garden tool. In addition to any combination of features described above, the camera may be integrated into an external device, and the robotic garden tool may include a securing device to secure the external device to the robotic garden tool. In some instances, receiving the plurality of images includes receiving, with the electronic processor via a network interface of the robotic garden tool, the plurality of images from the external device.

In addition to any combination of features described above, the object may include a fiducial marker, and the method may also include recognizing, with the electronic processor, the object within each image of the plurality of images using an image analytics technique based on an expected design of the fiducial marker.

In addition to any combination of features described above, the method may also include receiving, with the electronic processor, a plurality of data samples captured by a millimeter wave radar device as the object moves in the operating area. Each data sample of the plurality of data samples may includes data indicating a respective location of the object. The method may also include determining, with the electronic processor, each relative distance of the plurality of relative distances based on (i) the respective location of the object in each data sample of the plurality of data samples and (ii) the respective location of the robotic garden tool at the respective time at which each data sample was captured. In some instances, the object includes a human user, and the method also includes recognizing, with the electronic processor, the millimeter wave radar device, or both the electronic processor, the millimeter wave radar device, the object within each data sample of the plurality of data samples based on an expected shape of the human user.

In addition to any combination of features described above, generating the virtual boundary may include generating, with a server device located remotely from the robotic garden tool, the virtual boundary.

Another embodiment includes a communication system that may include a robotic garden tool that may include a housing, a fiducial marker, and a set of wheels coupled to the housing and configured to rotate to propel the robotic garden tool on an operating surface in an operating area. The robotic garden tool also may include at least one wheel motor coupled to one or more wheels of the set of wheels. The at least one wheel motor may be configured to drive rotation of the one or more wheels. The robotic garden tool may also include a first electronic processor that may be configured to determine a location of the robotic garden tool. The communication system may also include an external device that may include a data capture device (e.g., a camera, an object detection device, and/or the like). The external device may also include a second electronic processor that may be configured to control the data capture device to capture a plurality of data samples (e.g., images) as the external device is moved in the operating area. Each data sample of the plurality of data samples may include data indicative of a relative location of the robotic garden tool with respect to the external device (e.g., each image may include the fiducial marker of the robotic garden tool to allow the relative distance to be determined). A plurality of locations of the external device may be determined using the plurality of images based on (i) a location of the fiducial marker in a respective image of the plurality of images and (ii) the location of the robotic garden tool at a time corresponding to when the respective image was captured. Each location of the plurality of locations of the external device may be stored as a waypoint. A virtual boundary may be generated using the waypoints. The robotic garden tool may be configured to be confined by the virtual boundary to remain in the operating area during operation of the robotic garden tool.

In addition to any combination of features described above, the communication system also may include a base station device that may be configured to communicate with the robotic garden tool. The base station device may be configured to receive a location signal from a satellite and transmit calibration information regarding the location signal to the robotic garden tool. The first electronic processor of the robotic garden tool may be configured to receive the location signal from the satellite, receive the calibration information from the base station device, and determine a current location of the robotic garden tool based on (i) the location signal and (ii) the calibration information.

In addition to any combination of features described above, the first electronic processor may be configured to receive the location signal via a first real-time kinematic global navigating satellite systems (RTK GNSS) receiver of the robotic garden tool. The first electronic processor may also be configured to receive the calibration information via a first radio frequency transceiver of the robotic garden tool. The base station device may be configured to receive the location signal via a second RTK GNSS receiver of the base station device. The base station device may also be configured to transmit the calibration information via a second radio frequency transceiver of the base station device.

In addition to any combination of features described above, the first electronic processor of the robotic garden tool may be configured to control operation of the at least one wheel motor to control movement of the robotic garden tool such that the robotic garden tool moves toward the external device as the external device is moved in the operating area.

In addition to any combination of features described above, the first electronic processor of the robotic garden tool may be configured to control operation of the at least one wheel motor to control movement of the robotic garden tool such that the robotic garden tool moves toward the external device as the external device is moved in the operating area by at least one of: (i) receiving a current location of the external device from the external device, wherein the external device includes a first global positioning system (GPS) receiver configured to receive data to be used to determine the current location of the external device, and controlling movement of the robotic garden tool toward the current location of the external device, (ii) determining a received signal strength indication (RSSI) of a signal output by the external device, and controlling movement of the robotic garden tool such that the RSSI of the signal output by the external device is at or above a predetermined RSSI threshold, and (iii) receiving a command from the external device, wherein the command includes instructions for how to control the robotic garden tool to move the robotic garden tool toward the external device.

In addition to any combination of features described above, the robotic garden tool may include a first global positioning system (GPS) receiver, and the first electronic processor may be configured to determine the location of the robotic garden tool at least partially using the first GPS receiver. The external device may include a second GPS receiver, and the second electronic processor may be configured to determine a location of the external device using the second GPS receiver. In some instances, the first GPS receiver and the second GPS receiver are different types of GPS receivers such that the first GPS receiver of the robotic garden tool allows for more accurate positioning determinations than the second GPS receiver of the external device.

In addition to any combination of features described above, the second electronic processor may be configured to receive, from the robotic garden tool, a plurality of locations of the robotic garden tool. Each location of the plurality of locations of the robotic garden tool may include a respective time stamp. The second electronic processor may also be configured to determine the plurality of locations of the external device based on (i) the location of the fiducial marker in the respective image of the plurality of images and (ii) the location of the robotic garden tool at the time corresponding to when the respective image was captured. The location of the robotic garden tool at the time corresponding to when the respective image was captured may be determined using the plurality of locations of the robotic garden tool received from the robotic garden tool. The second electronic processor may also be configured to store locations of the plurality of locations of the external device as the waypoints. The second electronic processor may also be configured to generate the virtual boundary using the waypoints, and transmit information indicative of the virtual boundary to the robotic garden tool.

In addition to any combination of features described above, the second electronic processor may be configured to time stamp each image of the plurality of images with the time corresponding to when the respective image was captured, and transmit the plurality of images and respective time stamps to at least one of the robotic garden tool and a remote device. In some instances, at least one of the first electronic processor of the robotic garden tool and another electronic processor of the remote device is configured to determine the plurality of locations of the external device, store locations of the plurality of locations of the external device as the waypoints, and generate the virtual boundary using the waypoints.

Another embodiment includes a method of creating a virtual boundary. The method may include determining, with a first electronic processor of a robotic garden tool, a location of the robotic garden tool. The robotic garden tool may include a housing, a fiducial marker, and a set of wheels coupled to the housing and configured to rotate to propel the robotic garden tool on an operating surface in an operating area. The robotic garden tool may also include at least one wheel motor coupled to one or more wheels of the set of wheels. The at least one wheel motor may be configured to drive rotation of the one or more wheels. The method may also include controlling, with a second electronic processor of an external device, a data capture device (e.g., a camera, an object detection device, and/or the like) of the external device to capture a plurality of data samples (e.g., images) as the external device is moved in the operating area. Each image of the plurality of images may include data indicative of a relative location of the robotic garden tool with respect to the external device (e.g., each image may include the fiducial marker of the robotic garden tool to allow the relative distance to be determined). The method may also include determining a plurality of locations of the external device using the plurality of images based on (i) a location of the fiducial marker in a respective image of the plurality of images and (ii) the location of the robotic garden tool at a time corresponding to when the respective image was captured. The method may also include storing each location of the plurality of locations of the external device as a waypoint. The method may also include generating the virtual boundary using the waypoints. The robotic garden tool may be configured to be confined by the virtual boundary to remain in the operating area during operation of the robotic garden tool.

In addition to any combination of features described above, the method may include receiving, with a base station device, a location signal from a satellite. The method may also include transmitting, with the base station device, calibration information regarding the location signal to the robotic garden tool. The method may also include receiving, with the first electronic processor of the robotic garden tool, the location signal from the satellite. The method may also include receiving, with the first electronic processor of the robotic garden tool, the calibration information from the base station device. The method may also include determining, with the first electronic processor of the robotic garden tool, a current location of the robotic garden tool based on (i) the location signal and (ii) the calibration information.

In addition to any combination of features described above, the method may also include controlling, with the first electronic processor of the robotic garden tool, operation of the at least one wheel motor to control movement of the robotic garden tool such that the robotic garden tool moves toward the external device as the external device is moved in the operating area.

In addition to any combination of features described above, in some instances, controlling operation of the at least one wheel motor to control movement of the robotic garden tool such that the robotic garden tool moves toward the external device as the external device is moved in the operating area includes at least one of: (i) receiving, with the first electronic processor, a current location of the external device from the external device, wherein the external device includes a first global positioning system (GPS) receiver configured to receive data to be used to determine the current location of the external device, and controlling, with the first electronic processor, movement of the robotic garden tool toward the current location of the external device, (ii) determining, with the first electronic processor, a received signal strength indication (RSSI) of a signal output by the external device, and controlling, with the first electronic processor, movement of the robotic garden tool such that the RSSI of the signal output by the external device is at or above a predetermined RSSI threshold, and (iii) receiving, with the first electronic processor, a command from the external device, wherein the command includes instructions for how to the control the robotic garden tool to move the robotic garden tool toward the external device.

In addition to any combination of features described above, the method may include receiving, with the second electronic processor and from the robotic garden tool, a plurality of locations of the robotic garden tool. Each location of the plurality of locations of the robotic garden tool may include a respective time stamp. The method may also include determining, with the second electronic processor, the plurality of locations of the external device based on (i) the location of the fiducial marker in the respective image of the plurality of images and (ii) the location of the robotic garden tool at the time corresponding to when the respective image was captured. The location of the robotic garden tool at the time corresponding to when the respective image was captured may be determined using the plurality of locations of the robotic garden tool received from the robotic garden tool. The method may also include storing, with the second electronic processor, locations of the plurality of locations of the external device as the waypoints. The method may also include generating, with the second electronic processor, the virtual boundary using the waypoints; and transmitting, with the second electronic processor, information indicative of the virtual boundary to the robotic garden tool.

In addition to any combination of features described above, the method may include time stamping, with the second electronic processor, each image of the plurality of images with the time corresponding to when the respective image was captured. The method may also include transmitting, with the second electronic processor, the plurality of images and respective time stamps to at least one of the robotic garden tool and a remote device. The method also may include determining, with at least one of the first electronic processor of the robotic garden tool and another electronic processor of the remote device, the plurality of locations of the external device. The method also may include storing, with at least one of the first electronic processor of the robotic garden tool and the another electronic processor of the remote device, locations of the plurality of locations of the external device as the waypoints. The method also may include generating, with at least one of the first electronic processor of the robotic garden tool and the another electronic processor of the remote device, the virtual boundary using the waypoints.

Another embodiment includes a robotic garden tool that may include a housing, a fiducial marker, and a set of wheels coupled to the housing and configured to rotate to propel the robotic garden tool on an operating surface in an operating area. The robotic garden tool also may include at least one wheel motor coupled to one or more wheels of the set of wheels. The at least one wheel motor may be configured to drive rotation of the one or more wheels. The robotic garden tool also may include a first electronic processor that may be configured to control operation of the at least one wheel motor to control movement of the robotic garden tool such that the robotic garden tool moves toward an external device as the external device is moved in the operating area during creation of a virtual boundary. The first electronic processor also may be configured to determine a plurality of locations of the robotic garden tool as the robotic garden tool moves. The first electronic processor also may be configured to time stamp each location of the plurality of locations of the robotic garden tool. The plurality of locations of the robotic garden tool may be used in combination with information captured by the external device to generate the virtual boundary. The robotic garden tool may be configured to be confined by the virtual boundary to remain in the operating area during operation of the robotic garden tool.

In addition to any combination of features described above, a plurality of locations of the external device may be determined using a plurality of data samples (e.g., images) captured by a data capture device (e.g., a camera, an object detection device, and/or the like) of the external device and based on (i) data indicative of a relative location of the robotic garden tool with respect to the external device (e.g., a location of the fiducial marker in a respective image of the plurality of images) and (ii) the location of the robotic garden tool at a time corresponding to when the respective data sample was captured. Each location of the plurality of locations of the external device may be stored as a waypoint. The virtual boundary may be generated using the waypoints.

In addition to any combination of features described above, the first electronic processor may be configured to transmit the plurality of locations of the robotic garden tool and associated respective time stamps to the external device. A second electronic processor of the external device may be configured to determine the plurality of locations of the external device based on (i) the location of the fiducial marker in the respective image of the plurality of images and (ii) the location of the robotic garden tool at the time corresponding to when the respective image was captured. The location of the robotic garden tool at the time corresponding to when the respective image was captured may be determined using the plurality of locations of the robotic garden tool transmitted by the robotic garden tool. The second electronic processor may also be configured to generate the virtual boundary based on the plurality of locations of the external device. The first electronic processor of the robotic garden tool may be configured to receive information indicative of the virtual boundary from the external device, and control operation of the at least one wheel motor to control movement of the robotic garden tool based at least partially on the virtual boundary.

In addition to any combination of features described above, the first electronic processor may be configured to receive a location signal from a satellite, receive calibration information from a base station device, and determine a current location of the robotic garden tool based on (i) the location signal and (ii) the calibration information.

In addition to any combination of features described above, the first electronic processor may be configured to receive the location signal via a first real-time kinematic global navigating satellite systems (RTK GNSS) receiver of the robotic garden tool. The first electronic processor may be configured to receive the calibration information via a first radio frequency transceiver of the robotic garden tool.

In addition to any combination of features described above, the first electronic processor may be configured to control operation of the at least one wheel motor to control movement of the robotic garden tool such that the robotic garden tool moves toward the external device as the external device is moved in the operating area by at least one of: (i) receiving a current location of the external device from the external device, wherein the external device includes a first global positioning system (GPS) receiver configured to receive data to be used to determine the current location of the external device, and controlling movement of the robotic garden tool toward the current location of the external device, (ii) determining a received signal strength indication (RSSI) of a signal output by the external device, and controlling movement of the robotic garden tool such that the RSSI of the signal output by the external device is at or above a predetermined RSSI threshold, and receiving a command from the external device, wherein the command includes instructions for how to the control the robotic garden tool to move the robotic garden tool toward the external device.

Other aspects of the disclosure will become apparent by consideration of the detailed description and accompanying drawings.

DETAILED DESCRIPTION

Figure 1A:
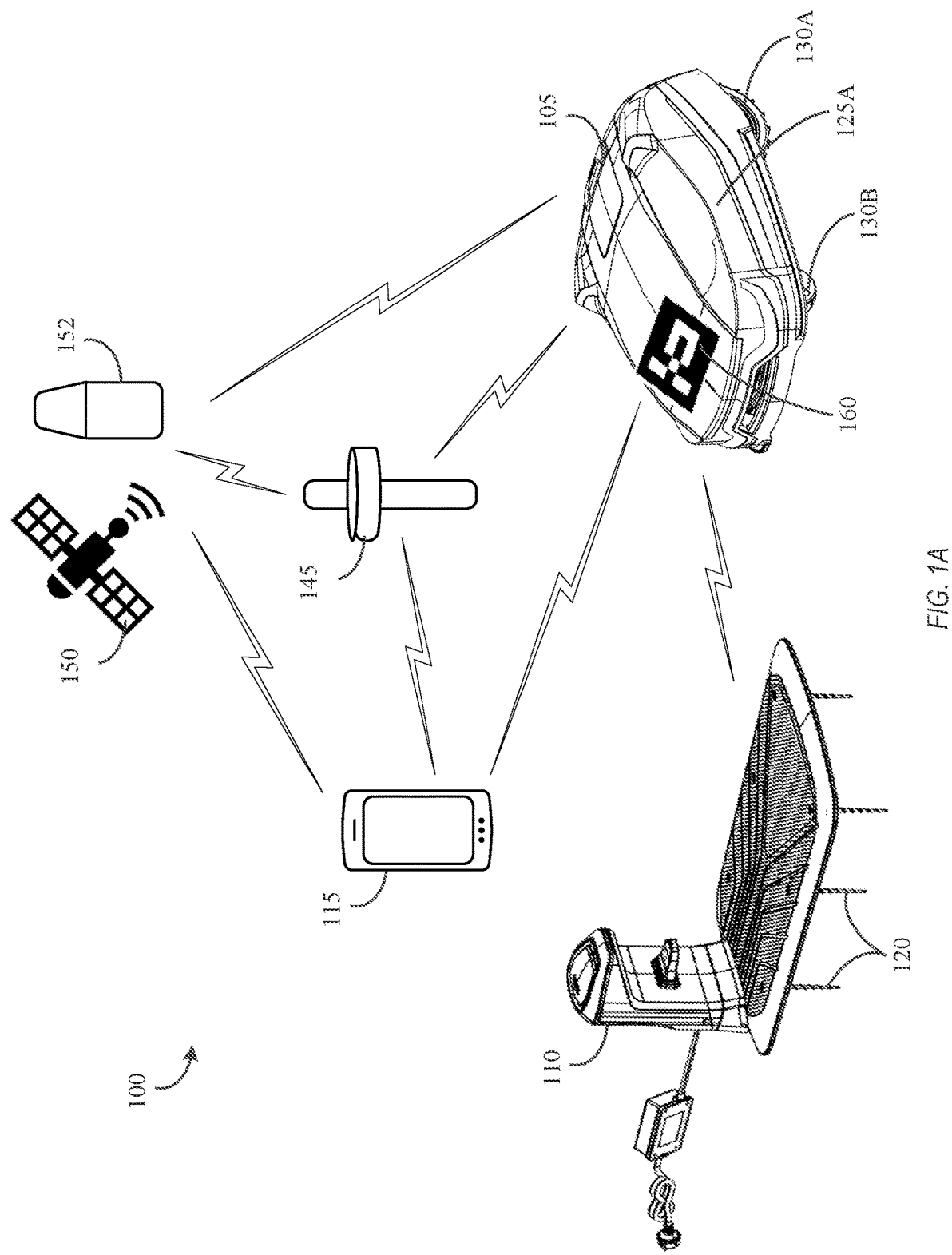
FIG. 1A illustrates a communication system including a robotic garden tool according to some example embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" may be used to describe the dimensions of various components and/or paths of travel of a robotic garden tool. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

FIG. 1A illustrates a communication system 100 that may include a robotic garden tool 105 (e.g., a robotic lawn mower 105 that may also be referred to as a robotic mower 105), a docking station 110 for the robotic mower 105, an external device 115, a base station device 145, a satellite 150, and a server 152 according to some example embodiments. The robotic garden tool 105 is primarily described as being a robotic lawn mower 105. However, in other embodiments, the robotic garden tool 105 may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. For example, other implementations of the robotic garden tool 105 may include a vacuum cleaner, a trimmer, a string trimmer, a hedge trimmer, a sweeper, a cutter, a plow, a blower, a snow blower, etc.

In some embodiments, a lawn may include any type of property that includes grass, a crop, some other material to be trimmed, cleared, gathered, etc., and/or that includes some material to receive treatment from the robotic garden tool (e.g., fertilizer to treat grass in the lawn). In some embodiments, a lawn may include paved portions of a property (e.g., a driveway), for example, when the robotic garden tool is used for snow plowing/removal.

In some embodiments, the docking station 110 may be installed in a yard/lawn using stakes 120. The robotic mower 105 may be configured to mow the yard and dock at the docking station 110 in order to charge a battery 245 of the robotic mower 105 (see FIG. 2). In some embodiments, the docking station 110 is configured to make an electrical connection with a power supply (e.g., via a cord and plug connected to a wall outlet that is connected to a power grid) in order to provide charging current to the robotic mower 105 when the robotic mower 105 is electrically coupled with the docking station 110.

In some embodiments, the docking station 110 may also be electrically connected to a boundary cable (i.e., boundary wire). In some embodiments, the docking station 110 provides power to the boundary cable to control the boundary cable to provide/emit, for example, an electromagnetic signal that may be detected by the robotic mower 105. In some embodiments, the boundary cable may be any cable, wire, etc. that is configured to transmit a signal and that is configured to be installed on an operating surface (e.g., a yard including grass) in a discrete and unobtrusive manner (e.g., secured at the base of the blades of grass against the ground/soil in which the grass is growing to prevent the robotic mower 105 and other people or objects from being physically obstructed by the boundary cable). For example, a plurality of pegs/stakes may be used to pin the boundary cable to the ground/soil. As another example, the boundary cable may be buried in the ground/soil underneath the grass (e.g., if the boundary cable is installed when a plot of land is being developed). In some embodiments, in response to detecting the electromagnetic signal from the boundary cable, the robotic mower 105 is configured to control its movement such that the robotic mower 105 remains within a boundary defined by the boundary cable. For example, in response to detecting the boundary cable, the robotic mower 105 may be configured to stop moving forward and turn in a random direction to begin traveling in an approximately straight line until the robotic mower 105 again detects the boundary cable.

In some embodiments, the robotic mower 105 does not operate in conjunction with a boundary cable. Rather, the robotic mower 105 may include mapping capabilities, positioning tracking capabilities, and/or the like that allow the robotic mower 105 to remain within a predefined boundary (e.g., a virtual boundary) without the use of the boundary cable. In some embodiments, the robotic mower 105 may determine its location (and/or may aid in allowing the base station device 145 and/or the external device 115 to determine their respective locations) by communicating with other devices such as the base station device 145 and/or the satellite 150 as described in detail below. For example, the robotic mower 105 and the base station device 145 may communicate with each other using a radio frequency (RF) communication protocol (e.g., WiFi™, Bluetooth™, Bluetooth™ Low Energy (BLE), and/or the like). Creation/generation of a virtual boundary according to some example embodiments is also described in detail below.

In some embodiments, the docking station 110 includes a docking cable loop, a magnet configured to be sensed by a magnetic sensor of the robotic mower 105, and/or another transmitting device configured to emit a docking signal that may be detected by the robotic mower 105. For example, the docking signal may indicate that the robotic mower 105 is near the docking station 110 and may allow the robotic mower 105 to take certain actions in response thereto to, for example, dock the robotic mower 105 at the docking station 110.

As indicated in FIG. 1A, in some embodiments, the robotic mower 105 is configured to wirelessly communicate with the external device 115 and/or the base station device 145 when the robotic mower 105 is within communication range of the external device 115 and/or the base station device 145 (e.g., via Bluetooth™, WiFi™, or the like). The external device 115 may be, for example, a smart phone (as illustrated), a laptop computer, a tablet computer, a personal digital assistant (PDA), a wireless communication router that allows another external device 115 that is located remotely from the robotic mower 105 to communicate with the robotic mower 105, or another electronic device capable of communicating with the robotic mower 105. The external device 115 may generate a user interface and allow a user to access and interact with robotic mower information. The external device 115 may receive user inputs to determine operational parameters/instructions for the robotic mower 105, enable or disable features of the robotic mower 105, and the like. In some embodiments, the communication between the external device 115 and the robotic mower 105 may be wired (e.g., via a Universal Serial Bus (USB) cord configured to connect to respective USB ports of the external device 115 and the robotic mower 105).

In some embodiments, the base station device 145 is considered an external device 115. The base station device 145 may be placed in a stationary manner at a base station location to aid the robotic mower 105 in determining a current location of the robotic mower 105 as the robotic mower 105 moves within an operating area as described in greater detail below. For example, the base station device 145 may be placed on a roof of a building adjacent to an operating area 155 where the robotic mower 105 performs a task (see FIG. 1B). As other examples, the base station device 145 may be located at a different location on a building or at a location within or near the operating area 155 (e.g., at the same location as the charging station 110, on a pole/stake that is inserted into the ground within or near the operating area 155, or the like). While the base station device 145 may be configured to remain stationary during operation of the robotic mower 105 within the operating area 155, in some embodiments, the base station device 145 may be removed from the base station location to define or revise a virtual boundary, to change the base station location when the robotic mower 105 is not operating, and/or the like.

Figure 1B:
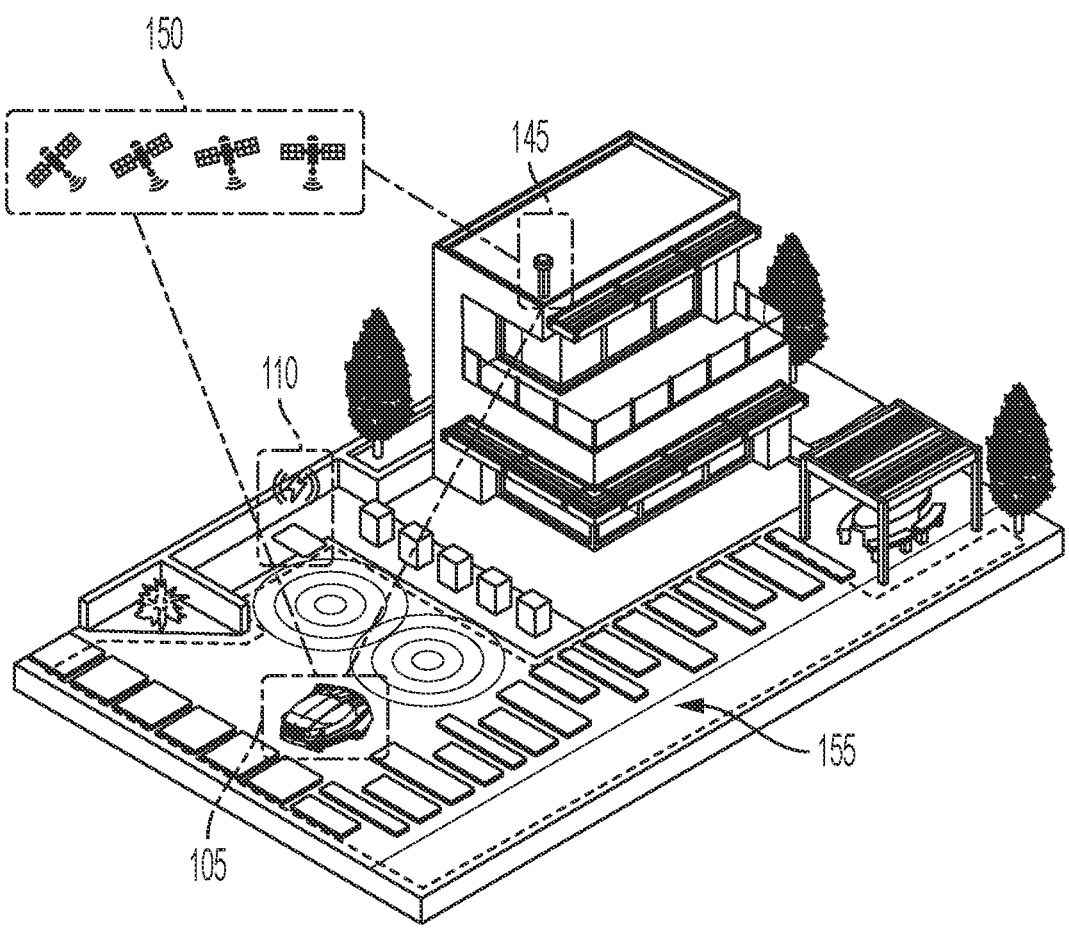
FIG. 1B illustrates an example implementation of the communication system of FIG. 1A according to some example embodiments.

As indicated by FIGS. 1A and 1B, in some embodiments, the robotic mower 105, the external device 115, and/or the base station device 145 are configured to wirelessly and bidirectionally communicate with each other and/or with one or more satellites 150 and/or one or more servers 152. For example, the robotic mower 105, the external device 115, and/or the base station device 145 may include a global positioning system (GPS) receiver configured to communicate with one or more satellites 150 to determine a location of the respective robotic mower 105, external device 115, and/or base station device 145. As another example, the robotic mower 105, the external device 115, and/or the base station device 145 may transmit information to and/or receive information from the server 152, for example, over a cellular network. Additional details of communication between (i) the robotic mower 105, the external device 115, and/or the base station device 145 and (ii) the one or more satellites 150 and/or the one or more servers 152 are described below. While FIG. 1A illustrates one satellite 150 and one server 152, in some embodiments, the communication system 100 includes additional satellites 150 and/or servers 152. In some embodiments, the communication system 100 may not include any servers 152.

As shown in FIG. 1A, in some embodiments, the robotic mower 105 includes a fiducial marker 160 (e.g., a binary square fiducial marker such as an Augmented Reality University of Cordoba (ArUco) marker). The fiducial marker 160 may be a removable marker that is placed on a predetermined area of the outer housing 125A to be viewable on an exterior of the robotic mower 105. The fiducial marker 160 may be removed from the robotic mower 105 when boundary creation is not being completed and may be placed on the robotic mower 105 when boundary creation is being completed. For example, the outer housing 125 may include a predetermined area as indicated by an indentation or label that indicates where the fiducial marker 160 should be placed on the outer housing 125A. In some embodiments, the fiducial marker 160 may be configured to be included in a plurality of images captured by a camera 330 of the external device 115 to create a virtual boundary as explained in detail below. For example, a location and orientation of the fiducial marker 160 in each captured image may allow for a camera pose estimation to be made to determine the location of the external device 115 at the time the respective image was captured.

Figure 1C:
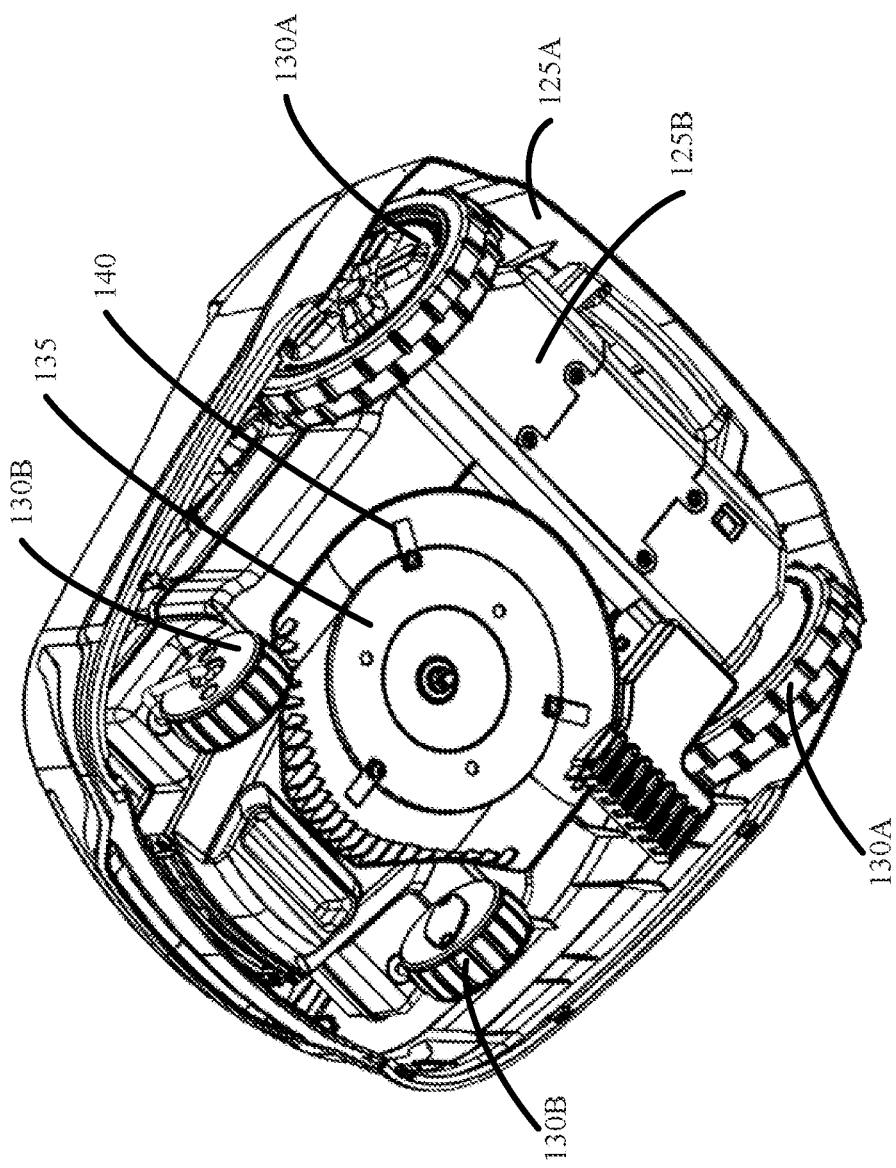
FIG. 1C illustrates a bottom perspective view of the robotic garden tool of FIG. 1A according to some example embodiments.

FIG. 1C illustrates a bottom perspective view of the robotic mower 105 according to some example embodiments. The robotic mower 105 may include a housing 125 that may include an outer housing 125A (i.e., outer housing shell) and an inner housing 125B. The outer housing 125A may be coupled to the inner housing 125B. The robotic mower 105 also may include wheels 130 (i.e., a set of wheels 130) coupled to the inner housing 125B and configured to rotate with respect to the housing 125 to propel the robotic mower 105 on an operating surface (e.g., a yard to be mowed). The wheels 130 may include motor-driven wheels 130A and non-motor-driven wheels 130B. In the embodiment shown in FIG. 1B, two rear wheels 130A are motor-driven wheels 130A while two front wheels 130B are non-motor-driven wheels 130B. In other embodiments, the robotic mower 105 may include a different wheel arrangement (e.g., a different number of total wheels, a different number of each type of wheel, different wheels being motor-driven or non-motor-driven, and/or the like). In some embodiments, the housing 125 may not include the outer housing 125A and the inner housing 125B. Rather, the housing 125 may include a single integrated body/housing to which the wheels 130 are attached.

In some embodiments, the robotic mower 105 includes a wheel motor 235 (see FIG. 2) coupled to one or more wheels 130 and configured to drive rotation of the one or more wheels 130. In some embodiments, the robotic mower 105 includes multiple wheel motors 235 where each wheel motor 235 is configured to drive rotation of a respective motor-driven wheel 130A (see FIG. 2).

In some embodiments, the robotic mower 105 includes a cutting blade assembly 135 coupled to the inner housing 125B and configured to rotate with respect to the housing 125 to cut grass on the operating surface. The cutting blade assembly 135 may include a rotating disc to which a plurality of cutting blades 140 configured to cut the grass are attached. In some embodiments, the robotic mower 105 includes a cutting blade assembly motor 240 (see FIG. 2) coupled to the inner housing 125B and to the cutting blade assembly 135. The cutting blade assembly motor 240 may be configured to drive rotation of the cutting blade assembly 135 to cut the grass on the operating surface.

In some embodiments, the robotic mower 105 and/or the docking station 110 include additional components and functionality than is shown and described herein.

Figure 2:
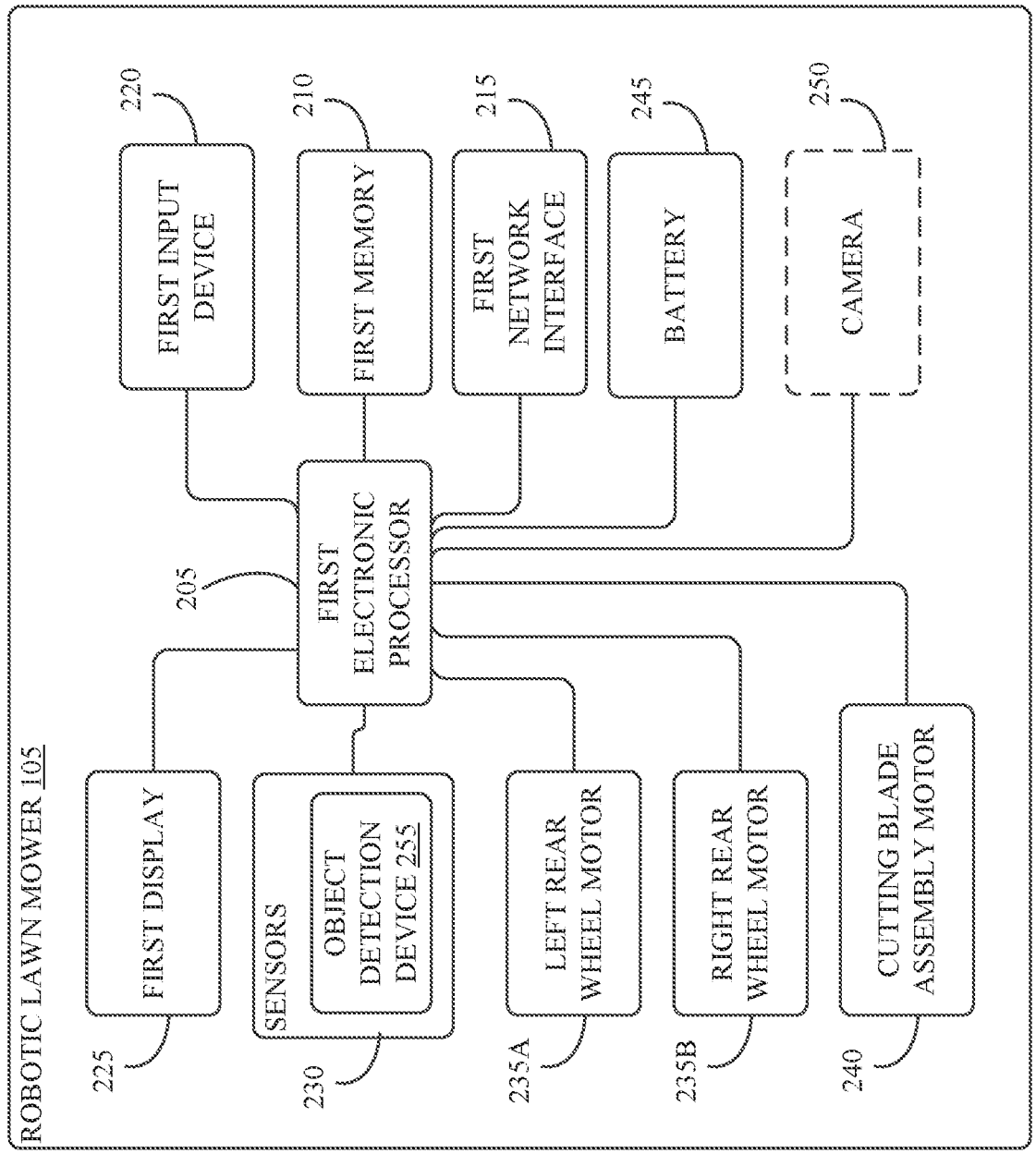
FIG. 2 is a block diagram of the robotic garden tool of FIGS. 1A and 1B according to some example embodiments.

FIG. 2 is a block diagram of the robotic mower 105 according to some example embodiments. In the embodiment illustrated, the robotic mower 105 includes a first electronic processor 205 (for example, a microprocessor or other electronic device). The first electronic processor 205 includes input and output interfaces (not shown) and is electrically coupled to a first memory 210, a first network interface 215, an optional first input device 220, an optional display 225, one or more sensors 230, a left rear wheel motor 235A, a right rear wheel motor 235B, a cutting blade assembly motor 240, and a battery 245. In some embodiments, the robotic mower 105 includes fewer or additional components in configurations different from that illustrated in FIG. 2. For example, the robotic mower 105 may not include the first input device 220 and/or the first display 225. As another example, the robotic mower 105 may include a height adjustment motor configured to adjust a height of the cutting blade assembly 135. As yet another example, the robotic mower 105 may include additional sensors or fewer sensors than the sensors 230 described herein. As yet another example, the robotic mower 105 may include a camera 250 (e.g., similar to the camera 330 described below with respect to FIG. 3) and/or may include a removably attachable interface 905 to secure a camera, a sensor (e.g., a millimeter wave radar device), and/or a device with a camera (e.g., the external device 115) to the housing 125 of the robotic mower 105 (see FIGS. 9-12). In some embodiments, the robotic mower 105 performs functionality other than the functionality described below.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 is configured to send data to and receive data from other devices in the communication system 100 (e.g., the external device 115, the base station device 145, the satellite 150, and/or the server 152). In some embodiments, the first network interface 215 includes one or more transceivers for wirelessly communicating with the external device 115, the docking station 110, and/or the base station device 145 (e.g., a first RF transceiver configured to communicate via Bluetooth™, WiFi™, or the like). The first network interface 215 may include an additional transceiver for wirelessly communicating with the server 152 via, for example, cellular communication. The first network interface 215 may also include a first GPS receiver (e.g., a first real-time kinematic global navigating satellite systems (RTK GNSS) receiver) configured to receive a location signal from one or more satellites 150. In some embodiments, at least some of the transceivers and/or receivers of the robotic mower 105 may be combined or share some elements (e.g., an antenna and/or other hardware). Alternatively or additionally, the first network interface 215 may include a connector or port for receiving a wired connection to the external device 115, such as USB cable. In some embodiments, one or more transceivers of the first network interface 215 may act as a sensor and may be configured to receive a wireless signal from the external device 115. The wireless signal from the external device 115 may be processed by the first electronic processor 205 to determine a strength of the wireless signal (e.g., a received signal strength indicator (RSSI)). For example, a portion of the first network interface 215 acting as a sensor may include a wireless communications receiver (e.g., a radio frequency transceiver), and the wireless signal received by the sensor may include a beacon signal of an ordinary data communication protocol including at least one of a Wi-Fi™ signal and a Bluetooth™ signal (e.g., a Bluetooth™ Low Energy (BLE) signal).

The first user input device 220 is configured to allow the first electronic processor 205 to receive a user input from a user to, for example, set/adjust an operational parameter of the robotic mower 105. The first display 225 is configured to display a user interface to the user. Similar to the user interface of the external device 115 described previously herein, the user interface displayed on the first display 225 may allow the user to access and interact with robotic mower information. In some embodiments, the first display 225 may also act as the first input device 220. For example, a touch sensitive input interface may be incorporated into the first display 225 to allow the user to interact with content provided on the first display 225. The first display 225 may be a liquid crystal display (LCD) screen, an organic light emitting display (OLED) display screen, or an E-ink display. In some embodiments, the first display 225 includes future-developed display technologies.

In some embodiments, the first electronic processor 205 is in communication with a plurality of sensors 230 that may include electromagnetic field sensors, radio frequency sensors (e.g., radio frequency identification (RFID) interrogators/sensors), Hall sensors, other magnetic sensors, a transceiver/receiver of the first network interface 215, and/or the like.

In some embodiments, the sensors 230 include one or more object detection devices 255 (i.e., object detection sensor 255). The one or more object detection devices 255 may use a first positioning technology to determine a relative position of one or more detected objects at one or more different times relative to the position/location of the robotic 105 (e.g., as explained in an example below with respect to a millimeter wave radar device/sensor). The object detection sensor 255 may include a millimeter wave radar device/sensor. The millimeter wave radar device may transmit millimeter waves and receive echoes of the millimeter waves from objects (e.g., a user walking around a boundary during virtual boundary creation, obstacles in the yard, etc.). Using a millimeter wave radar device on the robotic mower 105 may be particularly advantageous because millimeter waves may be able to penetrate most objects that may be encountered by the robotic mower 105 such as grass, rain, plastics, and the like. Accordingly, the millimeter wave radar device may detect objects that are located behind other objects to determine a more complete landscape of objects within a detection angle range/detection area of the millimeter wave radar device.

In some instances, the millimeter wave radar device determines data about each point (e.g., three-dimensional points in an x-y-z coordinate system) within the detection area/space of the millimeter wave radar device. For example, for each point, the millimeter wave radar device may determine a point identification, its respective x, y, and z coordinates, velocities in each direction x, y, and z of an object located at the point relative to the robotic mower 105, and a signal strength of the echoed signal that contacted the object located at the point. In some instances, the millimeter wave radar device and/or the first electronic processor 205 includes a built-in algorithm configured to group a plurality of adjacent points (i.e., a cluster of data points) as a single object/obstacle.

In some instances, the millimeter wave radar device provides object detection data (e.g., processed data samples) to the first electronic processor 205 where the object detection data indicates information about each object (e.g., a size and/or shape of each object based on a number of clustered/adjacent data points corresponding to the object, a location of each object including x-y coordinates of each object, x-y-z coordinates of each object, etc.) within the detection area of the millimeter wave radar device. In other words, the object detection data may indicate a respective position of each of one or more objects with respect to the robotic garden tool 105 (i.e., a relative distance between the object and the robotic garden tool 105). As indicated by the above explanation, the first electronic processor 205 may determine a respective distance between the robotic mower 105 and each object within the detection area of the millimeter wave radar device based on the object detection data received from the millimeter wave radar device. The object detection data may also indicate a respective size and/or shape of each of one or more objects based on a number of data points in a cluster that make up each object. For example, the more data points that are detected within a cluster of data points that represents an object, the larger the object is determined to be by the first electronic processor 205. In some instances, the first electronic processor 205, the millimeter wave radar device, or both the first electronic processor 205 and the millimeter wave radar device is configured to recognize an object (e.g., a human user 605 moving along a boundary during a virtual boundary creation process) within each data sample of a plurality of data samples captured by the millimeter wave radar device based on an expected shape of the object (e.g., an expected shape of the human user 605).

While some of the above explanation of the millimeter wave radar device indicates that the millimeter wave radar device provides processed object detection data (i.e., processed data samples) to the first electronic processor 205, in some instances, the millimeter wave radar device provides raw data samples to the first electronic processor 205, and the first electronic processor 205 processes the raw data to, for example, identify objects by grouping a plurality of adjacent points (i.e., a cluster of data points) as a single object/obstacle. In some instances, the object detection device 255 additionally or alternatively includes other types of object detection devices 255. For example, the object detection device 255 may be a laser distance meter or another range finding device whose data can be used to determine a relative distance between the robotic mower 105 and an object.

In instances where the robotic mower 105 includes the camera 250, the camera may be built-in to the housing 125. For example, the camera 250 may be located on a top of the housing 125A and/or on a front of the housing 125A. The camera 250 may include a plurality of cameras 250 to provide 360-degree coverage around the robotic mower 105. The camera 250 may be a depth of field (DoF) camera. In some instances, the camera 250 is a 360-degree camera. In some instances, the camera 250 may be considered to be a sensor 230.

In some instances (e.g., instances where the robotic mower 105 does not include an integrated camera 250), the robotic mower 105 may include a removably attachable interface 905 to secure a camera, a sensor (e.g., a millimeter wave radar device), and/or a device with a camera (e.g., the external device 115) to the housing 125 of the robotic mower 105 (see FIGS. 9-12). For example, the interface 905 includes an interface housing 1105 that is removably attachable (e.g., using screws) to a top surface of the housing 125 of the robotic mower 105.

Figure 9:
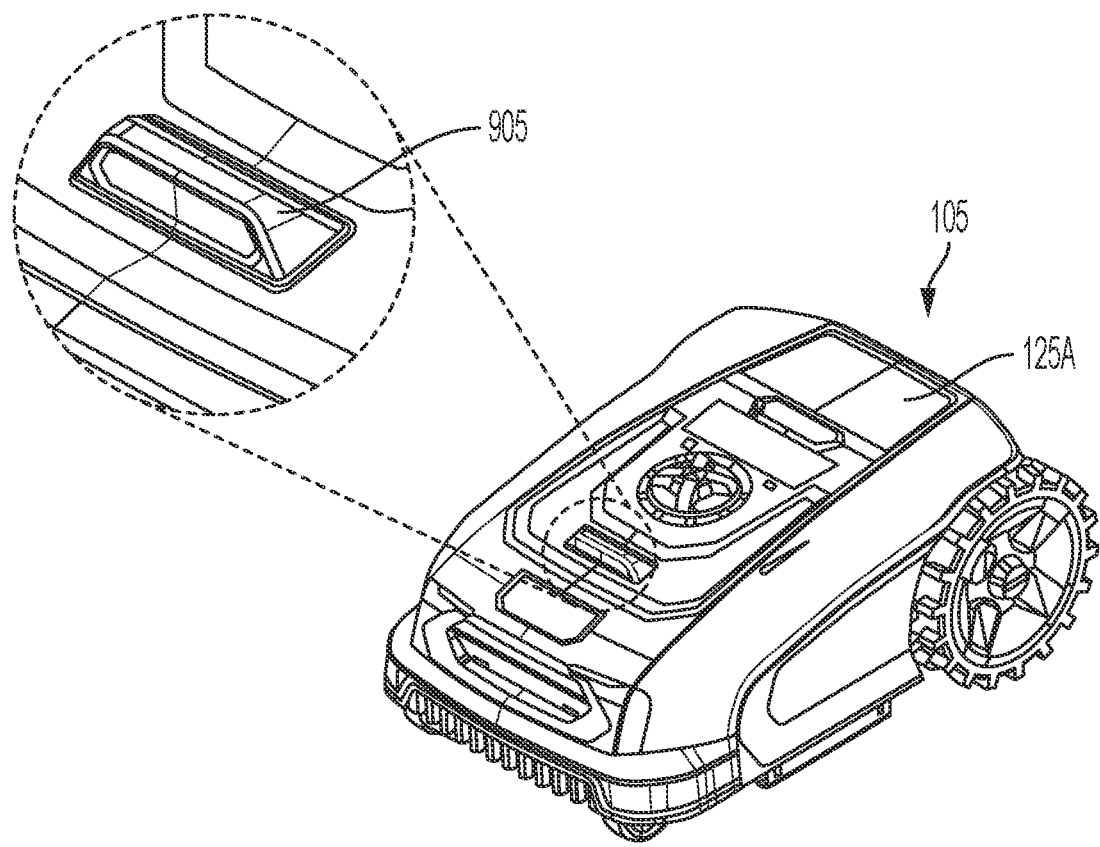
FIG. 9 illustrates a perspective view of the robotic garden tool of FIG. 1A and a zoomed-in view of an interface removably attached to the robotic garden tool according to some example embodiments.
Figure 10:
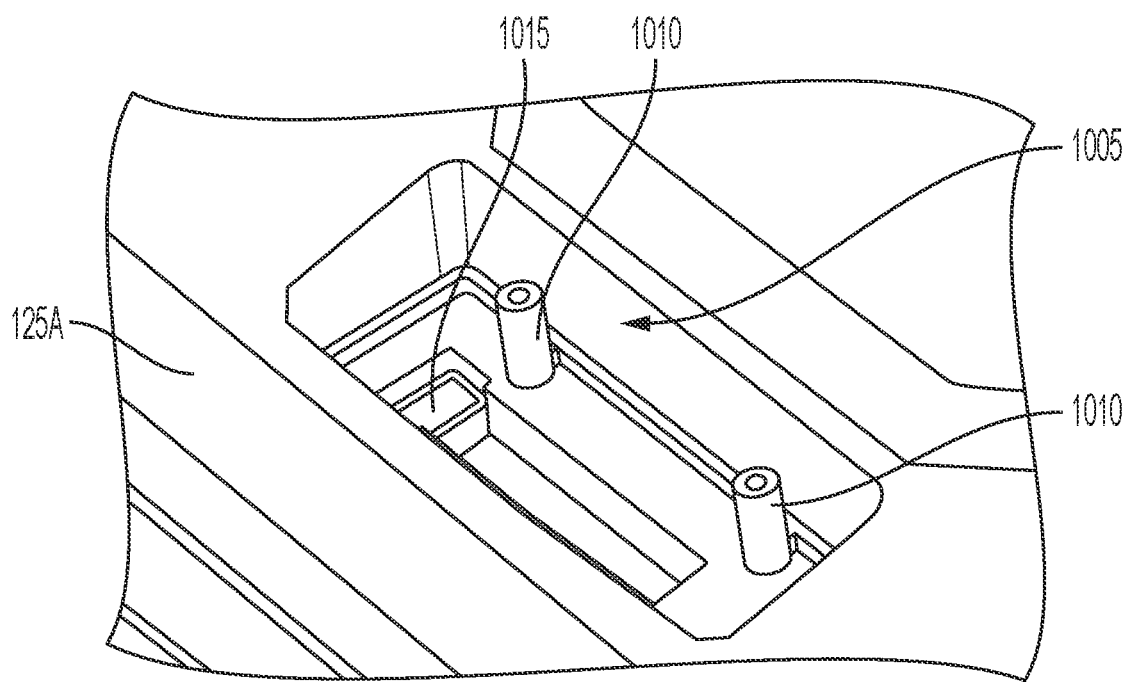
FIG. 10 illustrates a perspective view of a compartment on a housing of the robotic garden tool of FIG. 1A according to some example embodiments.

As indicated in the example shown in FIG. 10, the top surface of the housing 125 may include a compartment 1005 configured to receive a bottom portion of the interface housing 1105 while a top portion of the interface housing 1105 protrudes upwardly from the compartment 1005 (see FIG. 9). The compartment 1005 may include standoffs 1010 configured to receive screws to secure the interface 905 in the compartment 1005. The compartment 1005 may also include a first protruding/indented part 1015 configured to engage with a second protruding/indented part 1110 of a bottom surface of the interface 905 to ensure that the interface 905 is installed in the compartment 1005 correctly (e.g., facing in a desired direction). The compartment 1005 also may include a through-hole (not shown) (e.g., on its bottom surface) to allow electrical wires and/or a connector from the robotic mower 105 to connect to one or more components within the interface 905 when the interface 905 is installed in the compartment 1005.

FIGS. 11A-11D illustrate an example of the removably attachable interface 905 according to some example embodiments. The interface 905 may include the interface housing 1105 to house, for example, a camera, a sensor (e.g., a millimeter wave radar device), and/or the like. In the illustrated embodiment, the interface 905 includes a millimeter wave radar device 1115 (see FIG. 11C). A bottom surface of the interface housing 1105 may include the second protruding/indented part 1110 to aid in properly installing and securing the interface 905 to the housing 125 of the robotic mower 105. The interface housing 1105 may also include screw holes 1120 configured to receive screws to secure the interface 905 to the housing 125 of the robotic mower 105. In some instances, the interface 905 may be secured to the robotic mower 105 in other manners in addition to or as an alternative to using screws. The bottom surface of the interface housing 1105 may also include a through-hole 1125 to allow electrical wires and/or a connector from the robotic mower 105 to connect to one or more components within the interface 905 when the interface 905 is installed in the compartment 1005.

Figure 11A:
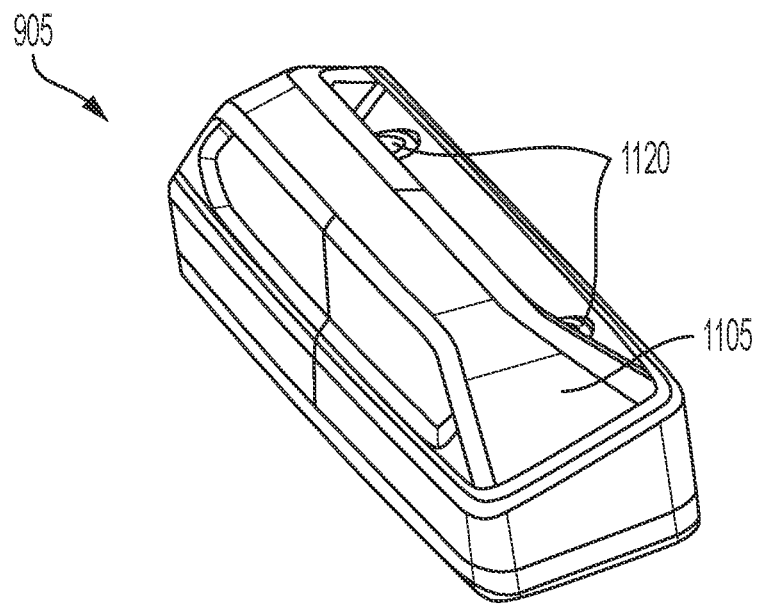
FIGS. 11A-11D illustrate perspective views of the removably attachable interface of FIG. 9 according to some example embodiments.
Figure 11B:
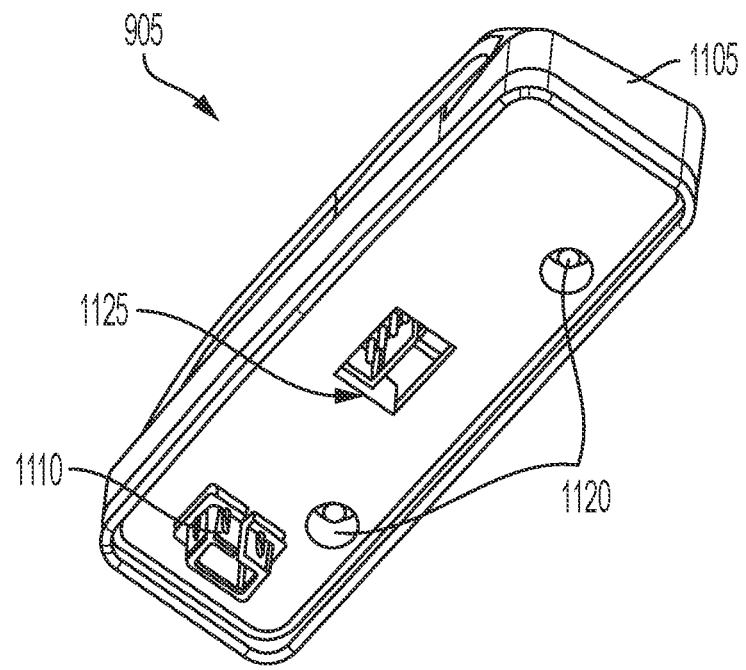
Figure 11C:
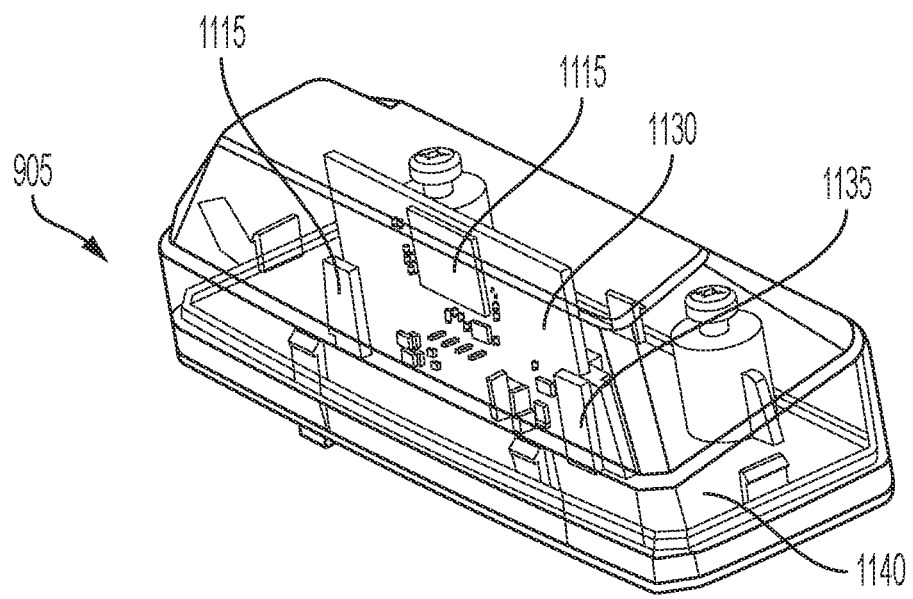
Figure 11D:
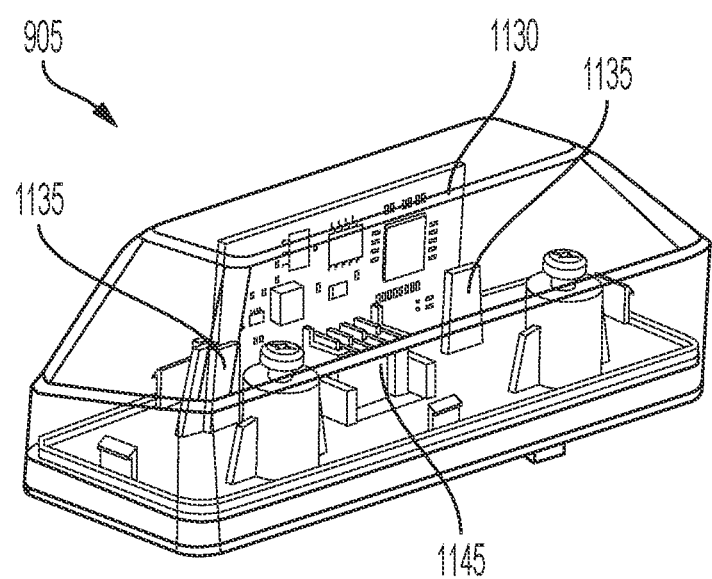
Figure 12:
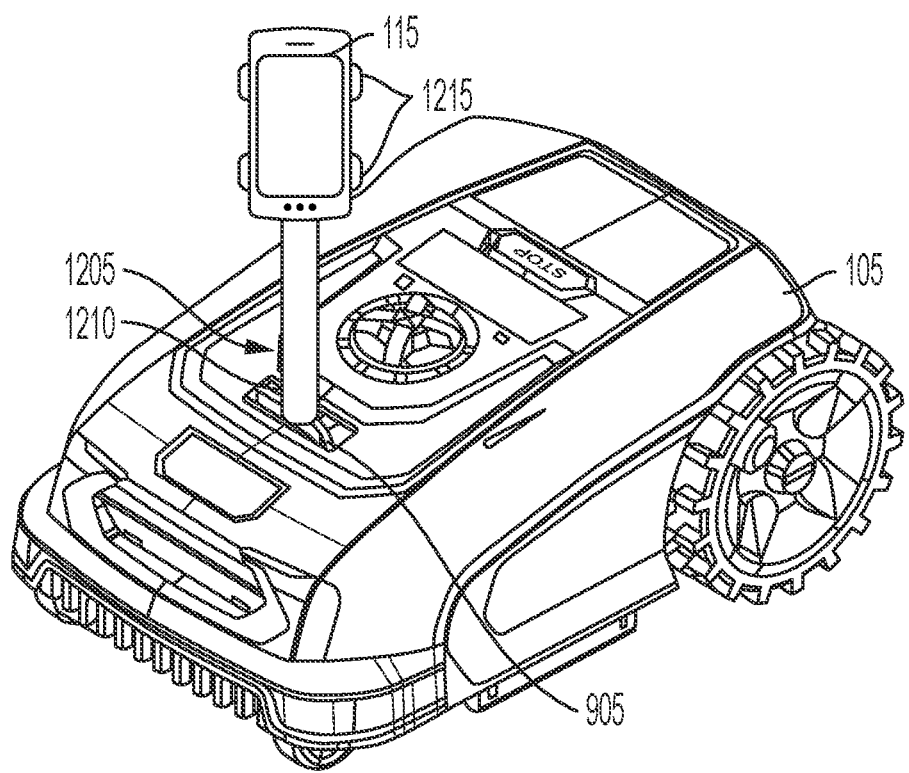
FIG. 12 illustrates a perspective view of the robotic garden tool of FIG. 1A according to some example embodiments in which the interface of FIG. 9 includes a securing device to hold another device.

FIGS. 11C and 11D illustrate the interface 905 with the interface housing 905 shown transparently to allow internal components of the interface 905 to be visible. As shown in the example of FIGS. 11C and 11D, the interface 905 may include a printed circuit board (PCB) 1130 mounted in a standing orientation and being held by brackets 1135 on a base 1140 of the interface 905. The millimeter wave radar device 1115 may be mounted on a forward-facing surface of the PCB 1130. An interface connector 1145 may be mounted on a rear-facing surface of the PCB 1130. In some instances, the interface connector 1145 may be mounted on the other side of the PCB 1130 (i.e., a forward-facing surface of the PCB 1130). Additional components may be mounted on either side of the PCB 1130 as shown.

Although the illustrated example of the interface 905 shown in FIGS. 11A-11D includes the millimeter wave radar device 1115, in other instances, the interface 905 may additionally or alternatively include a camera and/or another type of sensor. In some instances, any one of a plurality of removably attachable interfaces 905 with different sensing devices may be electrically (via electrical connection to the electronic processor 205 of the robotic mower 105) and mechanically coupled to the robotic mower 105.

In some instances, the interface 905 may include an attachment for a securing device 1205 configured to hold/secure a device with a camera or other sensor (e.g., the external device 115) to the robotic mower 105. For example, the external device 115 may be secured to the robotic mower 105 during a virtual boundary creation process explained in greater detail below. The securing device 1205 may include a rod 1210 that is inserted into the attachment (e.g., a threaded compartment, a snap-fit compartment, or the like) on the interface 905. The rod 1210 may include an adjustable holding bracket with grips 1215 that are configured to be adjusted clamp/hold the external device 115. In some embodiments, the rod 1210 and/or the holding bracket may be foldable/collapsible into an area of the housing 125 such that the rod 1210 does not protrude from the housing 125 (or protrudes less) when the securing device 1205 is not in use. In some embodiments, the rod 1210 and/or the holding bracket may be removably attached to the interface 905 that is attached to housing 125. Other structures and manners of securing a device with a camera (e.g., the external device 115) to the robotic mower 105 may be used. For example, the housing 125 of the robotic mower 105 (e.g., the compartment 1005) may include the attachment structure instead of the attachment being located on the interface 905. As another example, the securing device 1205 on the interface 905 may include a cavity configured to receive and hold/secure the external device 115 in an upright position without using the rod 1210.

The interface 905 that is secured to the robotic mower 105 (e.g., the external device 115) and/or a device (e.g., the external device 115) secured to the robotic mower 105 directly or via the interface 905 may communicate bidirectionally with the robotic mower 105 (e.g., with the first electronic processor 205) via a wired or wireless connection as explained previously herein. For example, the external device 115 may provide image data of captured images to the robotic mower 105 for use by the robotic mower 105 in generating a virtual boundary. As another example, the external device 115 may receive location information from the robotic mower 105 for use by the external device 115 in generating the virtual boundary. In some instances, any device 105, 115, 145, 152, or a combination thereof may generate a virtual boundary based on information captured by the device 105, 115, 145, 152 itself and/or based on information received from other devices 105, 115, 145, 152. In some instances, information may be shared between devices 105, 115, 145, 152 of the communication system 100 to allow any one or a combination of devices 105, 115, 145, 152 to generate the virtual boundary. In some instances, the sensing device(s) of the interface 905 may be considered to be part of the robotic mower 105 when the interface 905 is installed on the robotic mower 105.

In some embodiments, the inner housing 125B includes at least two boundary cable sensors in the form of electromagnetic field sensors configured to detect an electromagnetic signal being emitted by the boundary cable. For example, the electromagnetic field sensors may be able to detect a strength and/or a polarity of the electromagnetic signal from the boundary cable.

In some embodiments, the inner housing 125B includes an odometry sensor (e.g., one or more Hall sensors or other types of sensors) for each motor-driven wheel 130A. Data from the odometry sensors may be used by the first electronic processor 205 to determine how far each wheel 130A has rotated and/or how fast each wheel 130A is rotating in order to accurately control movement (e.g., turning capabilities) of the robotic mower 105. For example, the first electronic processor 205 may control the robotic mower 105 to move in an approximately straight line by controlling both of the wheel motors 235A and 235B to rotate at approximately the same speed. As another example, the first electronic processor 205 may control the robotic mower 105 to turn and/or pivot in a certain direction by controlling one of the wheel motors 235A or 235B to rotate faster than or in an opposite direction than the other of the wheel motors 235A or 235B. Similarly, rotating only one of the wheel motors 235A or 235B while the other wheel motor 235A or 235B is not rotated should result in the robotic mower 105 turning/pivoting.

In some embodiments, the inner housing 125B includes a cutting blade assembly motor sensor (e.g., one or more Hall sensors or other types of sensors). Data from the cutting blade assembly motor sensor may be used by the first electronic processor 205 to determine how fast the cutting blade assembly 135 is rotating.

In some embodiments, the battery 245 provides power to the first electronic processor 205 and to other components of the robotic mower 105 such as the motors 235A, 235B, 240 and the first display 225. In some embodiments, power may be supplied to other components besides the first electronic processor 205 through the first electronic processor 205 or directly to the other components. In some embodiments, when power is provided directly from the battery 245 to the other components, the first electronic processor 205 may control whether power is provided to one or more of the other components using, for example, a respective switch (e.g., a field-effect transistor) or a respective switching network including multiple switches. In some embodiments, the robotic mower 105 includes active and/or passive conditioning circuitry (e.g., voltage step-down controllers, voltage converters, rectifiers, filters, etc.) to regulate or control the power received by the components of the robotic mower 105 (e.g., the first electronic processor 205, the motors, 235A, 235B, 240, etc.) from the battery 245. In some embodiments, the battery 245 is a removable battery pack. In some embodiments, the battery 245 is configured to receive charging current from the docking station 110 when the robotic mower 105 is docked at the docking station 110 and electrically connected thereto.

Figure 3:
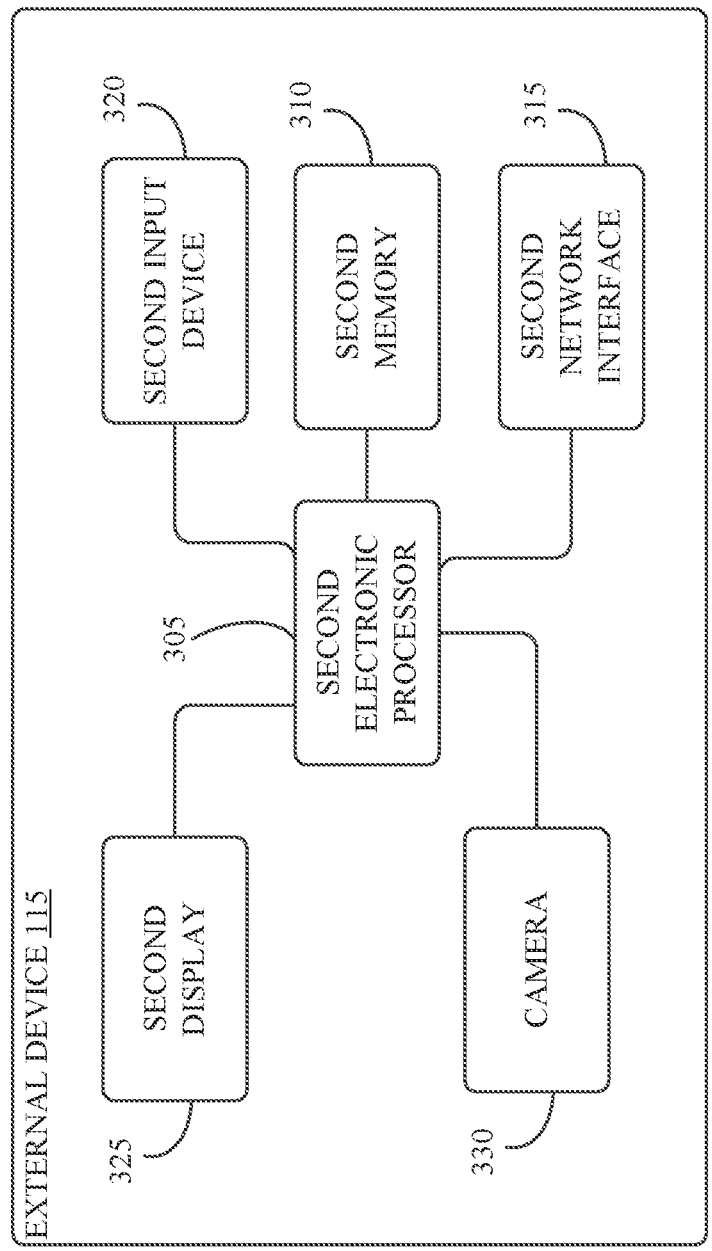
FIG. 3 is a block diagram of the external device of FIG. 1A according to some example embodiments.

FIG. 3 is a block diagram of the external device 115 according to some example embodiments. In the example shown, the external device 115 includes a second electronic processor 305 electrically connected to a second memory 310, a second network interface 315, a second user input device 320, a second display 325, and a camera 330. These components are similar to the like-named components of the robotic mower 105 explained above with respect to FIG. 2 and function in a similar manner as described above. For example, the second display 325 may also function as an input device (e.g., when the second display 325 is a touchscreen). In some embodiments, the second network interface 315 includes one or more transceivers for wirelessly communicating with the robotic mower 105 (e.g., a second RF transceiver configured to communicate via Bluetooth™, WiFi™, or the like). The second network interface 315 may include an additional transceiver for wirelessly communicating with the server 152 via, for example, cellular communication. The second network interface 315 may also include a second GPS receiver configured to receive a location signal from one or more satellites 150. In some embodiments, at least some of the transceivers and/or receivers of the external device 115 may be combined or share some elements (e.g., an antenna and/or other hardware). In some embodiments, the second electronic processor 305 sends data to and receives data from the robotic mower 105 and/or other devices of the communication system 100 via the second network interface 315.

In some embodiments, the second GPS receiver of the external device 115 may be a different type of GPS receiver than the first type of GPS receiver of the robotic mower 105. For example, the second GPS receiver may not be a RTK GNSS receiver while the first type of GPS receiver of the robotic mower 105 is a RTK GNSS receiver. In such embodiments, the first type of GPS receiver (i.e., the RTK GNSS receiver) of the robotic mower 105 may allow for more accurate positioning determinations than the second GPS receiver of the external device 115. Accordingly, incorporating the location of the robotic mower 105 as determined by the robotic mower 105 into a method of creating a virtual boundary results in a more accurate virtual boundary than creation of the virtual boundary using a method that merely uses an external device 115 tracking its own location to create the virtual boundary. The methods described below (e.g., the method 500 of FIG. 5) may take advantage of the more precise positioning determinations made by the robotic mower 105 without requiring the user 605 to manually move the robotic mower 105 around the boundary of the operating area 155 during creation of the virtual boundary. Rather, a hand-held external device 115 may be moved around the boundary of the operating area 155 or a user themselves with or without a fiducial marker or other device may move around a boundary of the operating area 155 to create a virtual boundary as explained in greater detail below. Thus, creation of the virtual boundary is improved by being accurate and more user friendly.

In some embodiments, the camera 330 is an optical camera (e.g., a depth-of-field (DoF) camera) configured to capture a plurality of images (e.g., a plurality of single images each captured in response to a user input received via a second input device 320 or a series of consecutive images/frames in the form of a video). In some embodiments, each image of the plurality of images may include the fiducial marker 160 of the robotic mower 105 and may be captured to create a virtual boundary for the robotic mower 105 as described in detail below. In some embodiments, the camera 330 may capture images of the user and/or a fiducial marker carried by the user in situations where the external device 115 is mounted/secured to the robotic mower 105 as described in greater detail herein. In some instances, the camera 330 may be a 360-degree camera that can capture images in 360 degrees around the robotic mower 105 without the robotic mower 105 moving. In some instances, the camera 330 may not be a 360-degree camera, and the robotic mower 105 may control itself to move such that the camera 330 is able to capture images of a moving object during a virtual boundary creation process in 360 degrees around the robotic mower 105 (e.g., by executing a "following" action as described in greater detail herein).

In some embodiments, the external device 115 includes fewer or additional components in configurations different from that illustrated in FIG. 3. For example, the external device 115 may include a battery, another GPS receiver, or the like. In some embodiments, the external device 115 performs functionality other than the functionality described below.

Figure 4:
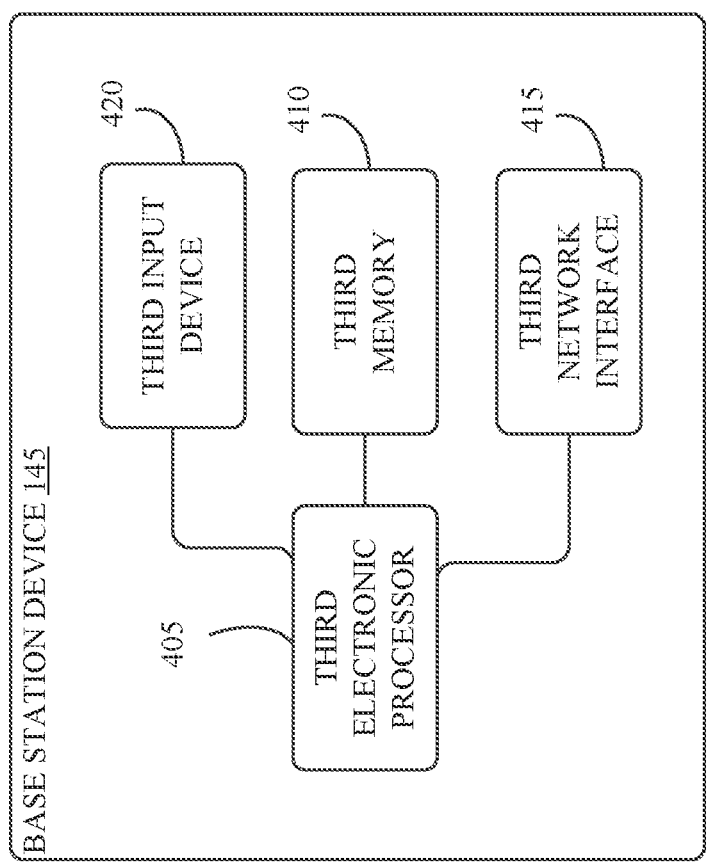
FIG. 4 is a block diagram of the base station device of FIG. 1A according to some example embodiments.

FIG. 4 is a block diagram of the base station device 145 according to some example embodiments. In the example shown, the base station device 145 includes a third electronic processor 405 electrically connected to a third memory 410, a third network interface 415, and a third user input device 420. These components are similar to the like-named components of the robotic mower 105 explained above with respect to FIG. 2 and function in a similar manner as described above. In some embodiments, the third network interface 415 includes one or more transceivers for wirelessly communicating information (e.g., calibration information) to the robotic mower 105 (e.g., a third RF transceiver configured to communicate via Bluetooth™, WiFi™, or the like) to aid the robotic mower 105 in determining a current location of the robotic mower 105 during a mowing operation as explained in greater detail below. The third network interface 415 may include an additional transceiver for wirelessly communicating with the server 152 via, for example, cellular communication. The third network interface 415 may also include a third GPS receiver (e.g., a second RTK GNSS receiver) configured to receive a location signal from one or more satellites 150. In some embodiments, at least some of the transceivers and/or receivers of the base station device 145 may be combined or share some elements (e.g., an antenna and/or other hardware). In some embodiments, the third electronic processor 405 sends data to and receives data from the robotic mower 105 and/or other devices of the communication system 100 via the third network interface 415. In some embodiments, the third input device 420 is a button or switch configured to be actuated by a user.

In some embodiments, the base station device 145 includes fewer or additional components in configurations different from that illustrated in FIG. 4. For example, the base station device 145 may include a battery, a display or indicator (e.g., a light emitting diode) to provide information to the user, or the like. As another example, the base station device 145 may not include the input device 420 in some embodiments. As yet another example, the base station device 145 may include a camera (e.g., similar to the camera 330 described above with respect to FIG. 3). For example, the camera of the base station device 145 may include a 360-degree camera. In some embodiments, the base station device 145 performs functionality other than the functionality described below.

In some embodiments, the satellite 150 and the server 152 include similar elements as the elements described above with respect to the devices 105, 115, and 145 that function in a similar manner. For example, the satellite 150 and the server 152 may each include an electronic processor, a memory, and a network interface, among other elements.

In some embodiments, the robotic mower 105 travels within a virtual boundary of the operating area 155 to execute a task (e.g., mowing a lawn). The robotic mower 105 may travel randomly within the operating area 155 defined by the virtual boundary. For example, the robotic mower 105 may be configured to travel in an approximate straight line until the robotic mower 105 determines that it has reached the virtual boundary. In response to detecting the virtual boundary, the robotic mower 105 may be configured to turn in a random direction and continue traveling in an approximate straight line along a new path until the robotic mower 105 again determines that it has reached the virtual boundary, at which point this process repeats. In some embodiments, the robotic mower 105 may travel in a predetermined pattern within the operating area 155 defined by the virtual boundary (e.g., in adjacent rows or columns between sides of the virtual boundary) to more efficiently and evenly mow the lawn within the operating area 155. In such embodiments, the robotic mower 105 may determine and keep track of its current location within the operating area 155.

For example, as indicated in FIGS. 1A and 1B, the robotic mower 105 and the stationary base station device 145 may both be configured to communicate with each other and with one or more satellites 150. In some embodiments, both the robotic mower 105 and the base station device 145 may include an RTK GNSS receiver. During a mowing operation, as the robotic mower 105 moves within the operating area 155, the robotic mower 105 may determine its current location based on a location signal received, via its RTK GNSS receiver, from the one or more satellites 150 and based on calibration information received from the base station device 145 regarding the same location signal received by the RTK GNSS receiver of the stationary base station device 145.

For example, during a mowing operation, the base station device 145 may be stationary (i.e., acting as a stationary base station) while the robotic mower 105 moves within the operating area 155. Both the robotic mower 105 and the base station device 145 may receive one or more location signals from one or more satellites 150 (e.g., from at least four common satellites 150). The base station device 145 may determine calibration information regarding the received location signal such as phase information of the location signals received by the base station device 145. The base station device 145 may transmit the calibration information to the robotic mower 105 that received the same one or more location signals from the one or more satellites 150. The robotic mower 105 may then compare the phase information of the location signals received by the base station device 145 with the phase information of the location signals received by the robotic mower 105 to aid the robotic mower 105 in determining the current location of the robotic mower 105 (e.g., using RTK GNSS principles). Accordingly, the stationary base station device 145 provides a reference for the robotic mower 105 to more accurately determine the location of the robotic mower 105 than if the robotic mower 105 determined its location based solely on the location signal received from the one or more satellites 150. More accurately determining the location of the robotic mower 105 allows the robotic mower 105 to better navigate itself within the operating area 155 (e.g., within or along a virtual boundary).

In some instances, the robotic mower 105 and the base station device 145 may operate in opposite roles as those described immediately above. For example, in situations where the base station device 145 is moved from its stationary location (e.g., during some types of virtual boundary creation), the base station device 145 may receive calibration information (i.e., location calibration information) from the robotic mower 105 that is placed at a stationary location. Based on its own received location signals from satellites 150 and the calibration information from the robotic mower 105 (that is based on the location signals from satellites 150 that are received by the stationary robotic mower 105), the base station device 145 may determine its location (e.g., using RTK GNSS principles).

Although the robotic mower 105 may determine its current location based at least partially on calibration information received from the base station device 145 as described above, in some embodiments, the robotic mower 105 may determine its current location without using information received from the base station device 145. In some embodiments, the base station device 145 may not be included in the system 100. In some embodiments, the robotic mower 105 may determine its current location based solely on the location signal received from the one or more satellites 150.

There are a number of existing manners of creating/generating a virtual boundary for a robotic tool. For example, a virtual boundary may be established by manually moving the robotic tool on a desired path (i.e., "dog walking") while the robotic tool stores the desired path. However, this method is not very efficient because the user has to manually move the robotic tool around an operating area. As another example, a virtual boundary may be created automatically by the robotic tool randomly moving on an operating surface and collecting a plurality of trajectories as it randomly moves. However, this method requires complex calculations and may not accurately generate a virtual boundary in many situations such as for a lawn with water areas (e.g., a lake or pond) or other segmented/separated areas. Accordingly, there is a technological problem with respect to creating an accurate virtual boundary for a robotic garden tool in an efficient manner that is not burdensome to the user.

The systems, methods, and devices described herein address the above-noted technological problem by using multiple devices to determine an accurate location of a device that is used to create a virtual boundary. Additionally, some of the systems, methods, and devices described herein use a fiducial marker 160 on the robotic garden tool 105 that is configured to be captured in a plurality of images taken by a user using a camera of the external device 115 as the user moves along a boundary of the operating area 155 to create the virtual boundary. Some of the systems, methods, and devices described herein involve the robotic garden tool 105 determining a relative distance (i.e., vector) to a plurality of waypoints along a virtual boundary by detecting a user, a fiducial marker carried by the user, or a signal emitted by a device carried by the user. Embodiments described herein enable more efficient creation of the virtual boundary because, for example, the robotic garden tool 105 does not need to be manually moved by the user during the creation of the virtual boundary. Rather, a more user-friendly device (or the user themselves) that is easier for a user to carry and move (e.g., an external device 115 such as a smart phone 115) is moved around the operating area 155 to create the virtual boundary while still taking advantage of increased location accuracy that may be provided by the robotic mower 105.

Figure 5:
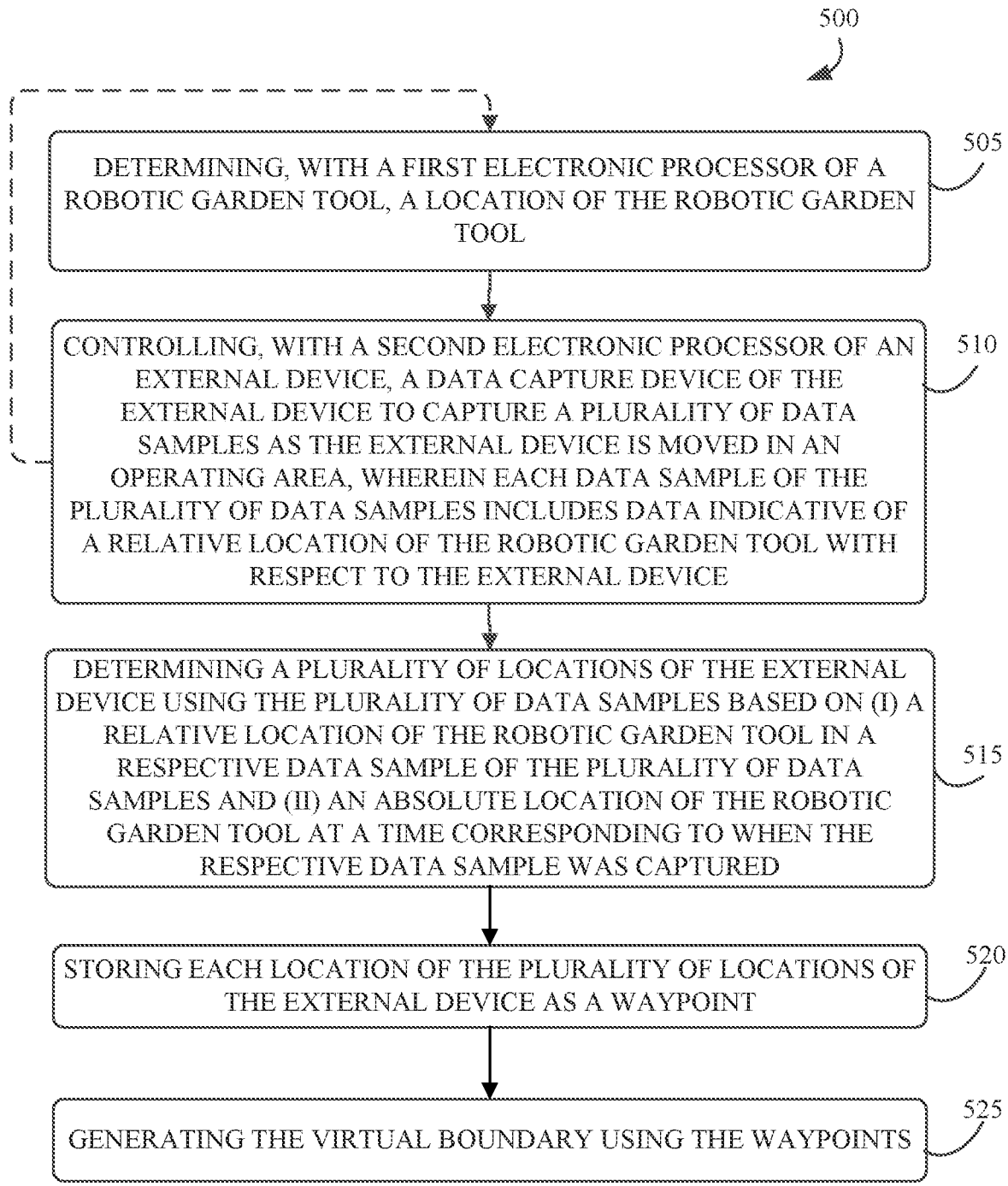
FIG. 5 illustrates a flowchart of a method that may be performed by the robotic garden tool and the base station device of FIG. 1A to create a virtual boundary for the robotic garden tool according to some example embodiments.

FIG. 5 illustrates a flowchart of a method 500 that may be performed by the first electronic processor 205 of the robotic mower 105 and another electronic processor (e.g., the second electronic processor 305 of the external device 115) to create a virtual boundary to confine the robotic mower 105 during its operation. While a particular order of processing steps, signal receptions, and/or signal transmissions is indicated in FIG. 5 as an example, timing and ordering of such steps, receptions, and transmissions may vary where appropriate without negating the purpose and advantages of the examples set forth in detail throughout the remainder of this disclosure. The explanation below refers primarily to the robotic mower 105 and an external device 115 such as a smart phone 115 that perform steps of the method 500 in order to create the virtual boundary. Additionally, the base station device 145 may contribute to execution of the method 500 by providing a reference location to the robotic mower 105 to allow the robotic mower 105 more accurately determine the location of the robotic mower 105. As noted above, the base station device 145 may be considered to be one type of external device 115. However, in some embodiments, the base station device 145 is configured to remain stationary at a base station location during creation of the virtual boundary. Thus, an external device 115 besides the base station device 145 (e.g., a smart phone 115) may be configured to perform the below-explained steps of the method 500 that are performed by the external device 115.

At block 505, the first electronic processor 205 of the robotic mower 105 determines a location of the robotic mower 105. For example, as explained previously herein with respect to movement of the robotic mower 105 during operation (e.g., during a mowing operation), the robotic mower 105 uses a location signal received by its RTK GNSS receiver from one or more satellites 150 and calibration information received from the stationary base station device 145 regarding the location signal received by its RTK GNSS receiver to determine a current location of the robotic mower 105. As another example, the robotic mower 105 may determine its location based solely on the location signal received from the one or more satellites 150.

In embodiments including the base station device 145, the base station device 145 may be configured to receive a location signal from a satellite 150 (e.g., via a second RTK GNSS receiver of the third network interface 415) and transmit calibration information regarding the location signal to the robotic mower 105 (e.g., via a second RF transceiver of the third network interface 415). In some embodiments, the third electronic processor 405 of the base station device 145 determines the calibration information regarding the first location signal (or regarding multiple first location signals). The calibration information may include phase information of the first location signal (e.g., a phase of a carrier wave of the first location signal) and a clock signal of the first location signal. In some embodiments, the first location signal includes a continuous signal transmitted by the satellite 150 for receipt by one or more devices that include an RTK GNSS receiver. In some embodiments, the first location signal includes periodic transmissions of multiple separate signals. In some embodiments, multiple satellites 150 each transmit a location signal that is received by the base station device 145 and the robotic mower 105. In such embodiments, the third electronic processor 405 may determine the location of the base station device 145 by averaging the results from the multiple location signals from multiple satellites 150. This averaging may increase the reliability of the location determination by the third electronic processor 405 for the stationary base station device 145. In some embodiments, the third electronic processor 405 may determine the location of the base station device 145 by additionally or alternatively averaging multiple location signals received from a respective satellite 150 over a time period. This additional or alternative time averaging may increase the reliability of the location determination by the third electronic processor 405 for the stationary base station device 145.

The first electronic processor 205 of the robotic mower 105 may be configured to receive the location signal from the satellite 150 (e.g., via a first RTK GNSS receiver of the first network interface 215). The first location signal received by the first electronic processor 205 may be the same signal received by the third electronic processor 405 of the robotic mower 105 except there may be a phase difference between the two received location signals based on the difference in location between the base station device 145 and the robotic mower 105. The first electronic processor 205 may also be configured to receive the calibration information from the base station device 145 (e.g., via a first RF transceiver of the first network interface 215). The first electronic processor 205 may also be configured to determine a current location of the robotic mower 105 based on (i) the location signal and (ii) the calibration information. For example, the first electronic processor 205 may determine the amount of time that it took for the location signal to travel from the satellite 150 to the robotic mower 105. In some embodiments, the first electronic processor 205 is configured to compare first phase information included in the calibration information from the base station device 145 to second phase information of the first location signal received by the robotic mower 105 according to RTK GNSS principles to aid in determining the current location of the robotic mower 105.

In some embodiments, the first electronic processor 205 may determine/keep track of a plurality of locations of the robotic mower 105 as the robotic mower 105 moves in the operating area 155 during the creation of the virtual boundary. In some embodiments, the first electronic processor 205 may continuously or periodically (at predetermined time intervals such as every 100 milliseconds, every 500 milliseconds, every one second, or the like) determine the current location of the robotic mower 105 and time stamp each location of the plurality of locations of the robotic mower 105. The plurality of locations of the robotic mower 105 and associated time stamps may be saved by the first electronic processor 205 in the first memory 210 and/or may be transmitted to another device (e.g., the server 152, the external device 115, etc.) for storage and/or use.

At block 510, the second electronic processor 305 of the external device 115 (e.g., a smart phone 115) controls a data capture device (e.g., the camera 330, an object detection device, and/or the like) of the external device 115 to capture a plurality of data samples as the external device 115 is moved in the operating area 155. Each data sample of the plurality of data samples may include data indicative of a relative location of the robotic mower 105 with respect to the external device 115 that may be determined using a first positioning technology (e.g., image/data analytics, radar-based analysis techniques, and/or the like based on an approximate expected shape and size of the robotic mower 105 or an expected design of the fiducial marker 160). The plurality of data samples may be captured by any one or a combination of different devices. A number of example data capture devices and types of data samples captured by each example data capture device are provided immediately below.

In some instances, the second electronic processor 305 is configured to receive a plurality of images captured by the camera 330 as the object moves in the operating area 155. Each image of the plurality of images may include the fiducial marker 160 of the robotic mower 105. The plurality of images may include a plurality of single images each captured in response to a user input or may include a series of consecutive images/frames in the form of a video).

In some instances, the second electronic processor 205 is configured to receive a plurality of data samples captured by a millimeter wave radar device of the external device 115 as the object moves in the operating area 155. Each data sample of the plurality of data samples may include data indicating a respective location of the robotic mower 105 relative to the external device 115 (i.e., a distance between the robotic mower 105 and the external device 115).

In some instances, the second electronic processor 305 is configured to receive a plurality of data samples captured by a receiver of the second network interface 315 from the robotic mower 105 that is configured to emit a beacon signal for distance and directional determination as the user moves in the operating area. Each data sample of the plurality of data samples may include data indicating a respective location of the robotic mower 105 relative to the external device 115 (i.e., a distance between the robotic mower 105 and the external device 115). For example, the receiver may include one or more directional antennas such that the second electronic processor 305 may determine a distance between the robotic mower 105 and the external device 115 carried by the user (e.g., based on a received signal strength indication (RSSI) of the beacon signal) as well as a direction from which the beacon signal was received.

In some instances, the second electronic processor 305 is configured to receive a plurality of data samples captured by laser distance meter or other range finding device of the external device 115 as the user moves in the operating area 155. Each data sample of the plurality of data samples may include data indicating a respective location of the robotic mower 105 relative to the external device 115 (i.e., a distance between the robotic mower 105 and the external device 115). In some instances, the laser distance meter may not be configured to recognize/identify different objects on its own (as may be done using the data capture devices included in the above examples) but may be controlled such that a distance measurement of the robotic mower 105 is obtained by the user pointing the laser distance meter of the external device 115 such that the laser distance meter faces the robotic mower 105.

While any one or a combination of numerous data capture devices may be used by the external device 115 to capture data indicating a respective location of the robotic mower 105 relative to the external device 115 as the user moves the external device 115 around a perimeter of the operating area 115, the below explanation of FIGS. 5 and 6 primarily refers to a use case where the data capture device is the camera 330 and the captured data samples are images/frames of a video that are captured by the camera 330.

Figure 6:
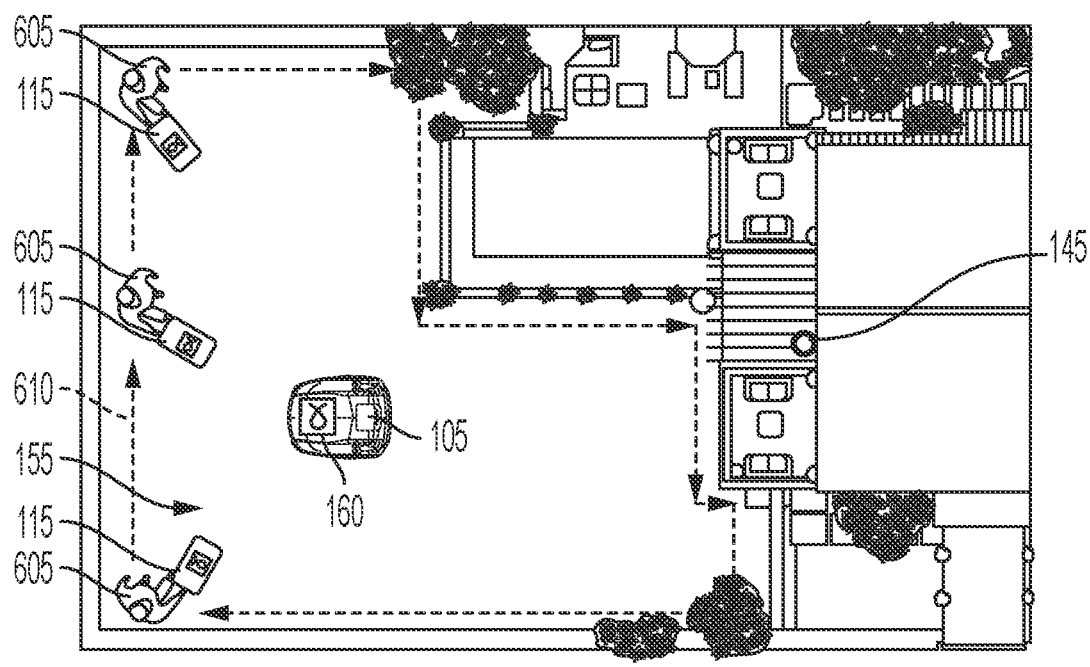
FIG. 6 illustrates an example use case of creation of the virtual boundary according to some example embodiments.

As shown in the example use case of FIG. 6, a user 605 may move around a boundary of the operating area 155 while capturing images of the fiducial marker 160 with the camera 330 in order to create a virtual boundary 610. FIG. 6 shows three example locations of the user 605 at which the user 605 instructs the external device 115 (via a user input) to capture a single image while the camera 330 of the external device 115 is pointed toward the fiducial marker 160 of the robotic mower 105. In some embodiments, the camera 330 may be controlled to capture a video of the fiducial marker 160 as the user 605 moves along the boundary of the operating area 155. In some embodiments, the second electronic processor 305 may continuously or periodically (at predetermined time intervals such as every 100 milliseconds, every 500 milliseconds, every one second, or the like) flag or store one or more still images/frames of the video and time stamp the still images/frames to indicate a time at which the still images/frames were captured.

As indicated by the dashed line in FIG. 5 from block 510 back to block 505, blocks 505 and 510 may be repeated until the user 605 has completed capturing data around the boundary of the operating area 155 as desired. In some embodiments, the second electronic processor 305 receives a user input from the user 605 via a second input device 320 that indicates that all data desired to be captured has been captured (e.g., indicating that the user 605 has captured images from locations around the entire enclosed boundary).

Once all desired data has been captured, at block 515, a plurality of locations of the external device 115 is determined using a first positioning technology that may be based on any one or a combination of the captured data samples from the data capture devices described previously herein. In some instances, the plurality of locations of the external device 115 is determined using the plurality of data samples based on (i) a relative location of the robotic mower 105 in a respective data sample of the plurality of data samples (e.g., as determined using the first positioning technology which may determine relative positions between two objects) and (ii) an absolute location of the robotic mower 105 (e.g., as determined by an RTK GNSS receiver of the robotic mower 105) at a time corresponding to when the respective data sample was captured. For example, the plurality of locations of the external device 115 is determined using the plurality of images based on (i) a location of the fiducial marker 160 in a respective image of the plurality of images and (ii) the location of the robotic mower 105 at a time corresponding to when the respective image was captured. For example, using the determined location of the robotic mower 105 at a given time and the location and orientation of the fiducial marker 160 in a respective image corresponding to the given time, a camera pose estimation may be made to determine the location of the external device 115 at the time the respective image was captured (i.e., a distance between the robotic mower 105 and the external device 115).

In some instances, the fiducial marker 160 may not be used or may not be recognizable by certain data capture devices. In such instances, the data capture device of the external device 115 may recognize the robotic mower 105 in captured data samples using image/data analytics, radar-based analysis techniques, and/or the like based on an approximate expected shape and size of the robotic mower 105.

The server 152, the electronic processor 205, 305, 405 of any device, or a combination thereof may perform block 515 to determine one or more locations of the plurality of locations of the external device 115. In some embodiments, information may be shared between devices of the communication system 100 to allow different devices to perform steps of the method 500 such as determining one or more locations of the plurality of locations of the external device 115.

For example, the second electronic processor 305 of the external device 115 may perform block 515 by receiving, from the robotic mower 105, a plurality of locations of the robotic mower 105 as determined by the robotic mower 105 (at block 505). As noted previously herein, each location of the plurality of locations of the robotic mower 105 may include a respective time stamp that is also received by the external device 115. The second electronic processor 305 may then determine the plurality of locations of the external device 115 based on (i) the location of the fiducial marker 160 in the respective image of the plurality of images and (ii) the location of the robotic mower 105 at the time corresponding to when the respective image was captured. As is evident from the above explanation, the location of the robotic mower 105 at the time corresponding to when the respective image was captured is determined using the plurality of locations (and associated time stamps) of the robotic mower 105 received from the robotic mower 105.

As another example, a device besides the external device 115 may perform block 515 to determine one or more locations of the plurality of locations of the external device 115. In some embodiments, the second electronic processor 305 of the external device 115 may time stamp each image of the plurality of images with the time corresponding to when the respective image was captured. The second electronic processor 305 may also transmit the plurality of images and respective associated time stamps to at least one of the robotic mower 105 and a remote device (e.g., the server 152, the base station device 145, another external device 115, etc.). In some embodiments, at least one of the first electronic processor 205 of the robotic mower 105 and another electronic processor of the remote device is configured to determine the plurality of locations of the external device 115 (at block 515).

In some embodiments, at block 515, one or more locations of the plurality of locations of the external device 115 may be discarded, for example, if they are identical to other locations. For example, numerous images may be captured while the external device 115 is located at the same location. Accordingly, redundant locations may be discarded such that only one of the redundant locations is stored as a waypoint (at block 520).

At block 520, each location of the plurality of locations of the external device 115 is stored as a waypoint. The server 152, the electronic processor 205, 305, 405 of any device, or a combination thereof may perform block 520 to store the locations of the external device 115 as waypoints.

At block 525, the virtual boundary 610 is generated using the waypoints. The server 152, the electronic processor 205, 305, 405 of any device, or a combination thereof may perform block 525 to generate the virtual boundary 610 using the waypoints. For example, waypoint data may be shared between devices such that any device may generate the virtual boundary 610. The virtual boundary 610 may be generated by connecting adjacent waypoints using approximately straight lines to create an enclosed operating area 155. In some embodiments, lines between adjacent waypoints or including multiple waypoints are smoothened using cubic splining. In some embodiments, the device generating the virtual boundary 610 may determine that waypoints are redundant and/or that one or more waypoints are within or outside an enclosed area defined by the remaining waypoints. In response to identifying such waypoints, the device may remove the waypoints from the determination of the generation of the virtual boundary 610. Additionally, the user 605 may selectively remove waypoints as desired. For example, the smart phone 115 may retrieve the waypoints from the second memory 310 or receive the waypoints from another device and may display locations of the waypoints on the second display 325. In response to a user input on the second display 325, the smart phone 115 may delete waypoints selected by the user 605.

When the virtual boundary 610 is generated by a device besides the robotic mower 105, the device that generated the virtual boundary 610 may transmit information indicative of the virtual boundary 610 to the robotic mower 105. The robotic mower 105 (specifically, the first electronic processor 205) may be configured to use the information indicative of the virtual boundary 610 and a determined current location of the robotic mower 105 to control the robotic mower 105 to remain in the operating area 155 during operation of the robotic mower 105 (e.g., during a mowing operation).

In some embodiments, the smart phone 115 may provide an extended user interface with respect to other devices in the system 100 (e.g., the robotic mower 105). In some embodiments, the collected waypoints and/or the virtual boundary 610 may be displayed on the second display 325. In some embodiments, the second electronic processor 305 of the smart phone 115 may receive a user input via the second display 325 that indicates whether certain waypoints and/or portions of the virtual boundary 610 correspond to obstacles within a perimeter virtual boundary 610 around an edge of the operating area 155 or the like.

In some embodiments, the method 500 may be repeated to generate more than one virtual boundary and/or to modify an existing virtual boundary. For example, a perimeter virtual boundary 610 may be created at an outer edge of an operating area 155 to define the operating area 155 that the robotic mower 105 should operate within. One or more additional virtual boundaries may be created in a similar manner within the perimeter virtual boundary 610 to, for example, surround objects/areas within the main virtual boundary in which the robotic mower 105 should not operate. For example, such objects/areas may include one or more trees, a swimming pool, a boundary of a garden, flower bed, etc., or the like. As noted above, in some embodiments, the second electronic processor 305 of the smart phone 115 may receive a user input via the second display 325 that indicates whether certain waypoints and/or portions of a virtual boundary (e.g., additional virtual boundaries) correspond to obstacles within a perimeter virtual boundary 610. Additionally or alternatively, the device generating the virtual boundaries may determine that the waypoints of an additional virtual boundary are located within the perimeter virtual boundary 610. In response to this determination and based on an assumption that the user desires to define a "keep-out" zone, the device generating the virtual boundaries may generate the additional virtual boundary such that the robotic mower 105 is configured to stay out of a second area within the additional virtual boundary. In other words, the virtual boundaries may be generated such that the robotic mower 105 stays within the perimeter virtual boundary 610 and outside of the additional virtual boundary. This area between the virtual boundaries where the robotic mower 105 is configured to travel may be referred to as the operating area 155 in some embodiments. In other embodiments, the operating area 155 may include an entire area within the perimeter virtual boundary 610 (e.g., including "keep-out" zones).

Although the above example explains the additional virtual boundary within the perimeter virtual boundary 610 being generated after the perimeter virtual boundary 610 has been generated, in some embodiments, the device generating the virtual boundaries may generally determine whether an area to be mowed by the robotic mower 105 is within or outside a virtual boundary based on a relative relationship of virtual boundaries that have been generated. For example, in contrast to the above example, the additional virtual boundary may be generated before the perimeter virtual boundary 610. In such a situation, the device generating the virtual boundaries may determine that the waypoints of the later-generated perimeter virtual boundary 610 are located outside of the earlier-made additional virtual boundary. In response to this determination and based on an assumption that the user desires to define a "keep-out" zone using the inner set of waypoints, the device generating the virtual boundaries may generate the additional virtual boundary using the inner waypoints and the perimeter virtual boundary 610 using the outer waypoints. In some embodiments, the function/purpose of each set of waypoints may be adjusted/controlled via user input on the smart phone 115 as explained previously herein.

In some embodiments, a graphical user interface (GUI) on the second display 325 may display a user-selectable button that enables/disables the capturing of images during creation of the virtual boundary 610. For example, actuation of the user-selectable button may enable a "virtual boundary creation" mode of the external device 115 to perform at least some steps of the method 500. In response to entering the "virtual boundary creation" mode, the external device 115 may send a notification/command to other devices in the system 100 (e.g., the robotic mower 105) to indicate that the user 605 intends to create the virtual boundary 610. In response to receiving the notification/command from the external device 115, the robotic mower 105 may control operation of the at least one wheel motor 235 to control movement of the robotic mower 105 such that the robotic mower 105 moves toward the external device 115 as the external device 115 is moved in the operating area 155. For example, the robotic mower 105 may be configured to "follow" the external device 115 as the external device 115 is moved by the user 605. The "following" action by the robotic mower 105 may aid in ensuring that the fiducial marker 160 is adequately included in the plurality of images captured by the external device 115 such that camera pose estimation can be determined based on each of the plurality of images.

In some embodiments, the robotic mower 105 may be configured to "follow" the external device 115 by receiving a current location of the external device 115 from the external device 115 (e.g., through RF communication via an RF transceiver). The current location of the external device 115 may be a relative position of the external device 115 with respect to the robotic mower 105 (e.g., as determined by a data capture device of the external device 115 using the first positioning technology) and/or may be an absolute location of the external device 115 (e.g., as determined by a global positioning system (GPS) receiver of the external device 115). For example, as explained previously herein, the external device 115 may include a GPS receiver configured to receive data to be used to determine the current location of the external device 115. The robotic mower 105 may also include its own GPS receiver. Accordingly, the first electronic processor 205 of the robotic mower 105 may control movement of the robotic mower 105 toward the current location of the external device 115. In some embodiments, the robotic mower 105 controls itself to move to a predetermined distance from the external device 115 (e.g., 1-3 meters) to get close enough the external device 115 such that the fiducial marker 160 is adequately visible in captured images but far enough away from the external device 115 so as to not crowd the user 605.

In some embodiments, the robotic mower 105 may be configured to "follow" the external device 115 by determining a received signal strength indication (RSSI) of a signal output by the external device 115, and controlling movement of the robotic mower 105 such that the RSSI of the signal output by the external device 115 is at or above a predetermined RSSI threshold. For example, upon the external device 115 entering the "virtual boundary creation" mode, the external device 115 may receive a user input indicating that the user 605 intends to move the external device 115 in a clockwise manner around the boundary of the operating area 155. The external device 115 may transmit information to the robotic mower 105 to indicate that the user 605 intends to move the external device 115 in a clockwise manner around the boundary of the operating area 155. In embodiments where the fiducial marker 160 is on a front-top surface of the housing 125, the user 605 may initially set up the robotic mower 105 to be facing the user 605. As the user 605 moves the external device 115 around the boundary, the external device 115 may output a beacon signal, for example, from the second network interface 315. As long as the RSSI of the beacon signal received by the robotic mower 105 is at or above the predetermined RSSI threshold, the robotic mower 105 may remain stationary. In some embodiments, the robotic mower 105 may include multiple sensors/receivers configured to receive the beacon signal and may be able to determine a direction from which the beacon signal is being received. In such embodiments, the first electronic processor 205 of the robotic mower 105 may control the robotic mower 105 to pivot in place to face in a direction of the external device 115. In response to the first electronic processor 205 determining that the RSSI of the beacon signal has decreased below the predetermined RSSI threshold, the first electronic processor 205 controls the robotic mower 105 to gradually turn clockwise and/or gradually move forward until the RSSI of the beacon signal increases to be at or above the predetermined RSSI threshold. Such control of the robotic mower 105 may repeat during the virtual boundary creation process until the external device 115 exits the "virtual boundary creation" mode and sends a notification/command to the robotic mower 105 indicating that the virtual boundary 610 is no longer being created.

In some embodiments, the notification/command from the external device 115 to the robotic mower 105 indicating that a virtual boundary 610 is being created using the external device 115 includes instructions for how to control the robotic mower 105 to move the robotic mower 105 toward the external device 115. For example, when a GPS receiver of the external device 115 is disabled, the command may instruct the robotic mower 105 to use the RSSI monitoring process explained above to "follow" the external device 115. However, when the GPS receiver of the external device 115 is enabled, the command may instruct the robotic mower 105 to controls itself to move to a predetermined distance from the GPS location of the external device 115. The GPS location of the external device 115 may also be included in the command to the robotic mower 105. Additionally, as indicated by the RSSI example above, the command may indicate whether the user 605 intends to move the external device 115 clockwise or counter-clockwise around the boundary of the operating area 155.

Although the fiducial marker 160 is described as being located on the housing 125 of the robotic mower 105 in the above embodiments, in some embodiments, the fiducial marker 160 may be located on, near, or connected to the base station device 145 (and/or the docking station 110 that may have its own RTK GNSS receiver). In some instances, the fiducial marker 160 may be placed at any other desired location whose position/location may be determined by placing (at least temporarily) a device with a RTK GNSS receiver (e.g., the robotic mower 105, the base station device 145, etc.) at the desired location. In embodiments where the fiducial marker 160 is located at a stationary location (e.g., not on the robotic mower 105), the fiducial marker 160 may be larger than the fiducial marker 160 on the robotic mower 105 to ensure that the fiducial marker 160 is adequately captured in the plurality of images by the external device 115 as the external device 115 is moved around a boundary of the operating area 155. In instances in which the fiducial marker 160 is located at a location associated with the base station device 145, at block 505, the base station device 145 may determine its location for use in the determination of the relative location between the external device 115 and the base station device 145. Such instances may otherwise be similar to instances described previously herein that have the fiducial marker 160 located on the robotic mower 105. For example, blocks 510, 515, 520, and 525 of FIG. 5 may generally be similar as previously described except the location of the base station device 145 is used instead of the location(s) of the robotic mower 105.

In some instances, the fiducial marker 160 may not be used. In such instances, the data capture device of the external device 115 may recognize an object of interest (e.g., the robotic mower 105, the base station device 145, the docking station 110, and/or the like) using image/data analytics, for example, based on an approximate expected shape and size of the object of interest. Such instances may otherwise be similar to instances described previously herein that use the fiducial marker 160 of the robotic mower 105. For example, blocks 505, 510, 515, 520, and 525 of FIG. 5 may generally be similar as previously described except the relative location of the object of interest with respect to the external device 115 is determined by using image/data analytics, radar-based analysis techniques, and/or the like without the use of the fiducial marker 160 on the object of interest. The absolute location of the object of interest may be determined by placing (at least temporarily) a device with a RTK GNSS receiver (e.g., the robotic mower 105, the base station device 145, etc.) at the location of the object of interest or by using a device with a RTK GNSS receiver as the object of interest.

Figure 7:
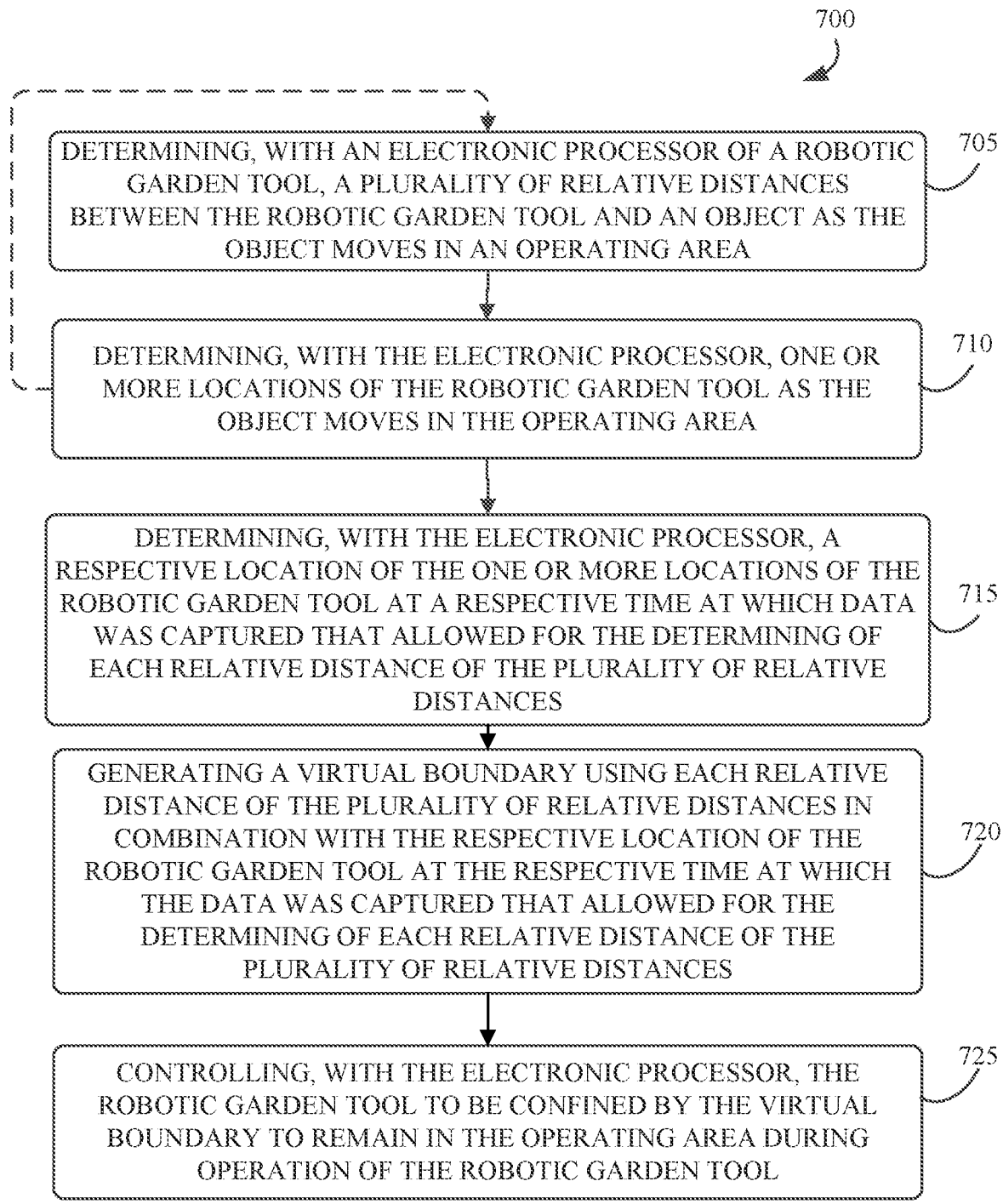
FIG. 7 illustrates a flowchart of another method that may be performed by the robotic garden tool of FIG. 1A to create a virtual boundary for the robotic garden tool according to some example embodiments.

FIG. 7 illustrates a flowchart of a method 700 that may be performed by the first electronic processor 205 of the robotic mower 105 and/or another electronic processor of a device that is secured to the robotic mower 105 (e.g., the second electronic processor 305 of the external device 115 when the external device 115 is secured to the robotic mower 105 via the securing device 905) to create a virtual boundary to confine the robotic mower 105 during its operation. While a particular order of processing steps, signal receptions, and/or signal transmissions is indicated in FIG. 7 as an example, timing and ordering of such steps, receptions, and transmissions may vary where appropriate without negating the purpose and advantages of the examples set forth in detail throughout the remainder of this disclosure.

The explanation below refers primarily to the robotic mower 105 (and/or the external device 115 secured to the robotic mower 105) that perform steps of the method 700 in order to create the virtual boundary. However, as explained below, other devices may perform one or more of the steps of the method 700 in some instances. For example, the server 152, the electronic processor 205, 305, 405 of any device, or a combination thereof may perform block 720 to generate the virtual boundary using gathered data. For example, gathered data may be shared between devices such that any device may generate the virtual boundary. Additionally, the base station device 145 may contribute to execution of the method 700 by providing a reference location to the robotic mower 105 to allow the robotic mower 105 to more accurately determine the location of the robotic mower 105 as explained previously herein. In some instances, the method 700 is generally similar to the method 500 of FIG. 5 except that the robotic mower 105 (and/or the external device 115 secured to the robotic mower 105) may be used to determine waypoints that are used to generate a virtual boundary instead of the external device 115 being carried by the user 605 being used to determine the waypoints that are used to generate the virtual boundary. Accordingly, many aspects of the method 500 described above with respect to FIG. 5 (e.g., the "following" action by the robotic mower 105) may apply to the method 700 explained below.

Figure 8:
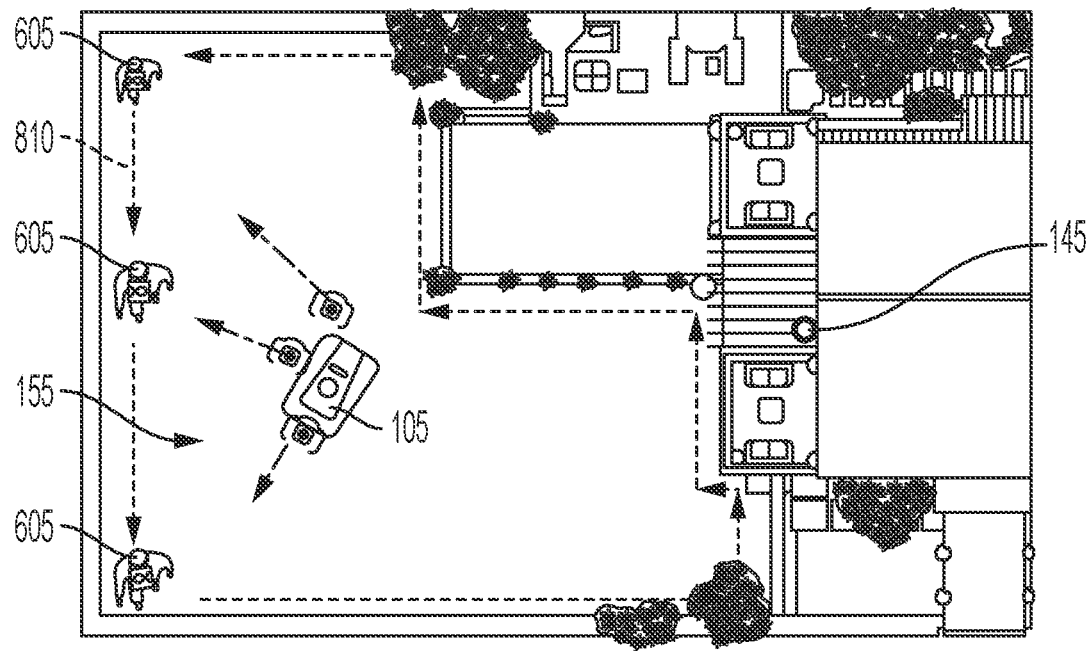
FIG. 8 illustrates another example use case of creation of the virtual boundary according to some example embodiments.

At block 705, the first electronic processor 205 of the robotic mower 105 determines a plurality of relative distances (i.e., vectors) between the robotic garden tool 105 and an object (e.g., the user 605) as the object moves in the operating area 155 (e.g., as the user 605 moves the object around a boundary to define a virtual boundary). As shown in the example use case of FIG. 8, the user 605 (with or without a fiducial marker and/or another device) may move around a boundary of the operating area 155 while the robotic mower 105 captures/determines relative distances between the robotic mower 105 and the user 605 in order to create a virtual boundary 810. FIG. 8 shows three example locations of the user 605 at which the robotic mower 105 may determine respective relative distances (i.e., vectors) between the robotic mower 105 and the user 605. In some instances, the first electronic processor 205 may determine the respective relative distances as the user 605 moves along the boundary of the operating area 155. In some instances, the first electronic processor 205 may be configured to continuously or periodically (at predetermined time intervals such as every 100 milliseconds, every 500 milliseconds, every one second, or the like) flag or store one or more data samples and/or still images/frames of a video and time stamp the data samples and/or still images/frames to indicate a time at which the data samples and/or still images/frames were captured. In instances where the external device 115 is secured to the robotic mower 105, the second electronic processor 305 of the external device 115 may be configured to continuously or periodically flag or store one or more data samples and/or still images/frames of the video and time stamp the data samples and/or still images/frames to indicate a time at which the data samples and/or still images/frames were captured.

The one or more data samples and/or still images/frames of a video may be captured by any one or a combination of different devices. A number of example data capture devices and the type of data captured are provided immediately below.

In some instances, the first electronic processor 205 is configured to receive a plurality of images captured by a camera 250 or 330 as the object moves in the operating area 155. Each image of the plurality of images may include the object. The first electronic processor 205 may be configured to determine each relative distance of the plurality of relative distances based on a location and orientation of the object in a respective image of the plurality of images. As explained previously herein, the camera 250 or 330 from which the plurality of images are received may be integrated into the housing 125 of the robotic mower 105. Additionally or alternatively, the camera 250 or 330 from which the plurality of images are received may be integrated into the external device 115 that is secured to the robotic mower 105 using the securing device 905.

In some instances, the first electronic processor 205 is configured to receive a plurality of data samples captured by the millimeter wave radar device (i.e., object detection device 255) as the object moves in the operating area 155. Each data sample of the plurality of data samples may include data indicating a respective location of the object relative to the robotic mower 105. The first electronic processor 205 may be configured to determine each relative distance of the plurality of relative distances based on the respective location of the object in each data sample of the plurality of data samples.

In some instances, the first electronic processor 205 is configured to receive a plurality of data samples captured by a receiver of the first network interface 215 from a device carried by a user that is configured to emit a beacon signal for distance and directional determination as the object moves in the operating area 155. Each data sample of the plurality of data samples may include data indicating a respective location of the object relative to the robotic mower 105. For example, the receiver may include one or more directional antennas such that the first electronic processor 205 may determine a distance between the robotic mower 105 and the device carried by the user (e.g., based on a received signal strength indication (RSSI) of the beacon signal) as well as a direction from which the beacon signal was received.

In some instances, the first electronic processor 205 is configured to receive a plurality of data samples captured by laser distance meter or other range finding device of the robotic mower 105 (or secured to the robotic mower 105) as the object moves in the operating area 155. Each data sample of the plurality of data samples may include data indicating a respective location of the object relative to the robotic mower 105 (i.e., a distance between the robotic mower 105 and the object). In some instances, the laser distance meter may not be configured to recognize/identify different objects on its own but may be controlled such that a distance measurement of the object is obtained by controlling the robotic mower 105 such that the laser distance meter faces the object. For example, the user 605 may carry a beacon device as described in the previous instance to allow the robotic mower 105 to determine a direction from which the beacon signal was received. The first electronic processor 205 may then control the robotic mower 105 to move such that the laser distance meter is facing the direction from which the beacon signal was received. In some instances, such control of the robotic mower 105 is similar to the "following" action by the robotic mower 105 that was described previously herein with respect to FIG. 5. In some instances, if the first electronic processor 205 determines that there is a difference between consecutive distance measurements to the object that is above a predetermined amount (e.g., a distance that the user 605 could not likely have moved in the time period between consecutive measurements), the first electronic processor 205 may determine that the laser distance meter has accidentally determined the distance to a different object that is not the object desired to be tracked around the boundary. In such instances, the robotic mower 105 may output a notification to indicate that the user 605 should check for other objects in the operating area 155 and/or recalibrate/restart the virtual boundary generation process.

The object may be any one of a number of different types of objects or combination of objects. In some instances, the object may include a fiducial marker carried by the user (e.g., a passive object that does emit a signal). For example, the fiducial marker may be similar to the fiducial marker 160 described previously herein but may be printed on a piece of paper, cardboard, a flag, etc. that is carried by the user 605. As another example, the fiducial marker may be printed on a shirt or other wearable item that is worn by the user 605. As yet another example, the fiducial marker may be displayed on a tablet (i.e., external device 115) carried by the user 605. In some instances, the object may include the human user 605 themselves (e.g., a passive object that does not emit a signal) who may or may not be carrying a fiducial marker or other device. In some instances, the object may be the external device 115 or another device configured to emit a beacon signal (e.g., an active object that emits a signal) as the user 605 moves the external device 115 or the another device around the boundary. In some instances, the robotic mower 105 may not include the fiduciary marker 160 when the method 700 is being executed (e.g., as indicated in the example use case shown in FIG. 8).

In instances where the object includes the human user 605 and images are captured by the camera 250 or 330, the first electronic processor 205 may be configured to recognize the object (i.e., the human user 605) within each image of the plurality of images using an image analytics technique based on an expected shape of the human user 605. Similarly, in instances where the object includes the human user 605 and data samples are captured by the millimeter wave radar device, the first electronic processor 205, the millimeter wave radar device, or both the first electronic processor 205 and the millimeter wave radar device may be configured to recognize the object within each data sample of the plurality of data samples based on an expected shape of the human user 605. In instances where the object includes the fiducial marker and images are captured by the camera 250 or 330, the first electronic processor 205 may be configured to recognize the object (i.e., the fiducial marker) within each image of the plurality of images using an image analytics technique based on an expected design of the fiducial marker.

In some instances, the first electronic processor 205 (or the second electronic processor 305 when the external device 115 is secured to the robotic mower 105) is configured to time stamp each relative distance of the plurality of relative distances (and/or each piece of captured data) with the respective time corresponding to when data was captured that allowed for the determination of the relative distance. The relative distances and corresponding time stamps may be stored in the first memory 210 (or second memory 310) and/or transmitted to another device (e.g., the external device 115, the robotic mower 105, a remote device such as the server 152, etc.).

In the same or a similar manner as described previously herein with respect to FIG. 5, in some instances, the robotic mower 105 may control operation of the at least one wheel motor 235 to control movement of the robotic mower 105 such that the robotic mower 105 moves toward the object (e.g., the user 605 themselves and/or the user holding the object) as the object moves in the operating area 155. For example, the robotic mower 105 may be configured to "follow" the object as the object moves around the boundary. The "following" action by the robotic mower 105 may aid in ensuring that the object is adequately included in the data captured by the robotic mower 105 (e.g., the plurality of images, the plurality of data samples, etc. captured by the robotic mower 105 or by the external device 115 secured to the robotic mower 105) such that the captured data allows for the respective relative distances between the robotic mower 105 and the object to be determined.

In some instances, the first electronic processor 205 is configured to control operation of the at least one wheel motor 235 to control movement of the robotic mower 105 such that the robotic mower 105 moves toward the object as the object moves in the operating area 155 by determining a received signal strength indication (RSSI) of a signal output by the object, and controlling movement of the robotic mower 105 such that the RSSI of the signal output by the object is at or above a predetermined RSSI threshold as explained previously herein with respect to FIG. 5.

In some instances, the first electronic processor 205 is configured to control operation of the at least one wheel motor 235 to control movement of the robotic mower 105 such that the robotic mower 105 moves toward the object as the object moves in the operating area 155 by determining that a relative distance of the plurality of relative distances is greater than or equal to a predetermined threshold, and controlling movement of the robotic mower 105 to move toward the object until the relative distance between the robotic mower 105 and the object decreases below the predetermined threshold. In some instances, the predetermined threshold may be preprogrammed based on a maximum detection range/viewing distance of the millimeter wave radar device, the camera 250, 330, or another device that is configured to capture data used to determine the relative distance between the robotic mower 105 and the object. For example, the predetermined distance may be preprogrammed to be 60%, 70%, 80%, or the like of the maximum detection range/viewing distance of the millimeter wave radar device, the camera 250, 330, or the another device to attempt to move the robotic mower 105 to ensure that the object is always within the maximum detection range/viewing distance. In some instances, in response to the relative distance being greater than or equal to the predetermined threshold, the first electronic processor 205 controls the robotic mower 105 to move in a direction toward the object based on captured data that indicates the direction of the object with respect to the robotic mower 105 (e.g., using an image analytics technique, a millimeter wave radar analysis technique, and/or the like).

In some instances, the first electronic processor 205 is configured to control operation of the at least one wheel motor 235 to control movement of the robotic mower 105 such that the robotic mower 105 moves toward the object as the object moves in the operating area 155 by receiving a command from the object, for example, when the object is a device carried by the user 605. The command may include instructions for how to control the robotic mower 105 to move the robotic mower 105 toward the object. Control of the robotic mower 105 in this manner is explained previously herein with respect to FIG. 5.

At block 710, the first electronic processor 205 determines one or more locations of the robotic garden tool 105 as the object moves in the operating area 155 (and as data that allows for the determination of the plurality of relatives distances is being captured). In some instances (e.g., when the camera 250 of the robotic mower 105 is a 360-degree camera and the operating area 155 is relatively small), the robotic mower 105 may not move during execution of blocks 705 and 710. In other words, the robotic mower 105 may not execute the "following" action because the robotic mower 105 may be able to capture data about the object that is used for determining the plurality of relative distances without moving (e.g., the object remains within a field of view and within a maximum detection range/viewing distance for accurate analytics to be performed on the captured data). In such instances, the one or more locations may include a single location of the robotic mower 105 during execution of the blocks 705 and 710 while the object moves around the boundary. On the other hand, in many instances, the robotic mower 105 executes the "following action" as the object moves around the boundary to ensure that useful data is captured to allow the plurality of relative distances to be determined based on the captured data. In such instances, the one or more locations include multiple locations of the robotic mower 105 during execution of the blocks 705 and 710 while the object moves around the boundary.

In some instances, the first electronic processor 205 is configured to determine the one or more locations of the robotic mower 105 (at block 710) in a similar manner as described above with respect to block 505 of FIG. 5. For example, the robotic mower 105 uses a location signal received by its RTK GNSS receiver from one or more satellites 150 and calibration information received from the stationary base station device 145 regarding the location signal received by its RTK GNSS receiver to determine a current location of the robotic mower 105. As another example, the robotic mower 105 may determine its location based solely on the location signal received from the one or more satellites 150.

As explained above with respect to block 505 of FIG. 5, in some embodiments, the first electronic processor 205 may determine/keep track of one or more locations of the robotic mower 105 as the robotic mower 105 moves in the operating area 155 during the creation of the virtual boundary 810. In some embodiments, the first electronic processor 205 may continuously or periodically (at predetermined time intervals such as every 100 milliseconds, every 500 milliseconds, every one second, or the like) determine the current location of the robotic mower 105 and time stamp each location of the one or more locations of the robotic mower 105 with a respective time corresponding to when the location was determined. The one or more locations of the robotic mower 105 and corresponding time stamps may be saved by the first electronic processor 205 in the first memory 210 and/or may be transmitted to another device (e.g., the server 152, the external device 115, etc.) for storage and/or use.

In some instances, the first electronic processor 205 may be configured to determine the current location of the robotic mower 105 at approximately the same time as respective data is captured that allows the relative distance to the object to be determined. In other words, data related to the relative distance between the robotic mower 105 and the object may be captured at approximately the same time as respective current locations of the robotic mower 105 are determined (e.g., according to the same periodic time interval and starting at the same time).

In some instances where the external device 115 is secured to the robotic mower 105 and configured to capture images that are used to determine the plurality of relative distances, at block 710, the robotic mower 105 may nevertheless determine its own one or more current locations because the GPS receiver (e.g., an RTK GNSS receiver) may be more accurate than the GPS receiver of the external device 115.

As indicated by the dashed line in FIG. 7 from block 710 back to block 705, blocks 705 and 710 may be repeated until the user 605 has completed capturing data around the boundary of the operating area 155 as desired. In some embodiments, the first electronic processor 205 receives a user input from the user 605 via a first input device 220 that indicates that all data desired to be captured has been captured (e.g., indicating that the user 605 has moved around the entire enclosed boundary). Such a user input may additionally or alternatively received by the second input device 320 of the external device 115 and transmitted to the robotic mower 105. In some embodiments, the first electronic processor 205 may be configured to determine a starting point of the user 605 based on a respective location of the robotic mower 105 and a respective relative distance between the robotic mower 105 and the object when the user 605 began moving along the boundary. In some instances, the first electronic processor 205 may determine that all desired data has been captured in response to determining that the object has moved back to approximately the starting point after moving approximately 360 degrees around the robotic mower 105 (e.g., detecting of a closing of a boundary loop).

Once all desired data has been captured (or while data is being captured), at block 715, the first electronic processor 205 determines a respective location of the one or more locations of the robotic garden tool 105 at a respective time at which data was captured that allowed for the determining of each relative distance of the plurality of relative distances. For example, using a respective time stamp of each piece of captured data and of each determined location of the robotic mower 105, the first electronic processor 205 may correlate each relative distance with a respective location of the robotic mower 105 based on these two pieces of information being determined using data that was captured/received at the same time.

At block 720, the first electronic processor 205 generates a virtual boundary 810 using each relative distance of the plurality of relative distances in combination with the respective location of the robotic garden tool 105 at the respective time at which the data was captured that allowed for the determining of each relative distance of the plurality of relative distances. For example, the first electronic processor 205 may be configured to determine a plurality of waypoints. Each waypoint of the plurality of waypoints may correspond to a respective location of the object as it was moved around the boundary. The first electronic processor 205 may determine a location of each waypoint using (i) a respective relative distance of the plurality of relative distances and (ii) the respective location of the robotic garden tool 105 at the respective time at which the data was captured that allowed for the determination of the respective relative distance of the plurality of relative distances. For example, using the determined location of the robotic mower 105 at a given time and the relative distance between the robotic mower 105 and the object as determined based on captured data corresponding to the given time, an absolute location (e.g., a waypoint) of the object at the given time may be determined. In some instances, the first electronic processor 205 is configured to generate the virtual boundary 810 using the waypoints in the same or a similar manner as described previously herein with respect to block 525 of FIG. 5.

At block 725, the first electronic processor 205 may control the robotic garden tool 105 to be confined by the virtual boundary 810 to remain in the operating area 155 during operation of the robotic garden tool 105 as explained previously herein.

While blocks 705, 710, 715, and 720 are primarily described above as being performed by the first electronic processor 205, in some instances, the server 152, the electronic processor 205, 305, 405 of any device, or a combination thereof may perform one or a combination of blocks 705, 710, 715, and 720. In some instances and in a similar manner as described previously herein with respect to FIG. 5, information may be shared between devices of the communication system 100 to allow different devices to perform steps of the method 700 such as determining one or more locations of a plurality of absolute locations of the object as the object moves around the boundary during a virtual boundary creation process. For example, the robotic mower 105 may be configured to transmit the plurality of relative distances (or the raw data that was captured that allows for the determination of the plurality of relative distances), the one or more locations of the robotic mower 105 at a respective time at which each relative distance of the plurality of relative distances was determined, and respective time stamps for each of the plurality of relative distances and the one or more locations of the robotic mower 105 to a remote device (e.g., the external device 115, the server 152, etc.). The remote device may be configured to generate the virtual boundary 810 (at block 720) using the plurality of relative distances, the one or more locations of the robotic mower 105, and the respective time stamps for each of the plurality of relatives distances and the one or more locations of the robotic mower 105 in the same or a similar manner as described previously herein with respect to block 525 of FIG. 5. The robotic mower 105 may be configured to receive the virtual boundary 810 from the remote device in the same or a similar manner as described previously herein with respect to block 525 of FIG. 5.

In some instances, the base station device 145 may perform at least some of blocks 705, 710, 715, and 720 instead of the robotic mower 105. For example, the base station device 145 may be placed near the center of the operating area 155 and may include a 360-degree camera to capture data indicating the relative distance to the object as the object moves around the boundary. In such embodiments, the robotic mower 105 may be used as a stationary base station to provide location calibration information to the base station device 145. Additionally or alternatively, a second base station device 145 may be used to as the stationary base station to provide location calibration information to the base station device 145 that is near the center of the operating area 155. In instances in which two base station devices 145 are provided, one of the base station devices 145 may be secured to the robotic mower 105 using the securing device 905 and may perform similar functions as the secured external device 115 (e.g., capturing data indicating the relative distance to the object as the object moves around the boundary using a data capture device such as a camera or millimeter wave radar device). As explained previously herein with respect to similar instances, the robotic mower 105 may execute a "following" action when the base station device 145 is secured to the robotic mower 105 to allow a data capture device of the base station device 145 to continue to capture data about the object that is useful to determine the plurality of relative distances s the object moves around the boundary.

In any of the above-described embodiments with respect to FIG. 7, the absolute location of the object as the object moves around the boundary during the virtual boundary creation process may be determined by the robotic mower 105 or a device secured to the robotic mower 105 (e.g., the external device 115) rather than being determined by a device that is being carried around the boundary by the user 605. In embodiments where the external device 115 is secured to the robotic mower 105, the second electronic processor 305 of the external device 115 may perform at least some of the determinations that were described above as being performed by the first electronic processor 205. Data gathered by each device 105, 115 and calculations made by each electronic processor 205, 305 may be shared between the two devices 105, 115 in order to facilitate the generation of the virtual boundary 810.

In the same or a similar manner as described previously herein with respect to FIG. 5, in some embodiments, the method 700 may be repeated to generate more than one virtual boundary and/or to modify an existing virtual boundary.

Although the above description of FIGS. 7 and 8 primarily refers to the robotic mower 105 (and/or the external device 115 secured to the robotic mower 105) being used to capture data that is used to determine waypoints that are used to generate a virtual boundary by tracking movement of an object of interest (e.g., the user 605) as the object of interest moves around the perimeter of the operating area 155, in some instances, another device in the system 100 (i) captures data of the object of interest to allow for the determination of the waypoints and/or (ii) holds the external device 115 to allow the external device 115 to capture data of the object of interest. For example, the docking station 110 may include a camera or may include a securing device (e.g., similar to the securing device 1205) to hold the external device 115. In such instances, the docking station 110 may be placed at a corner of the operating area 155, and the camera may be a wide angle camera or a 360-degree camera configured to capture images in a wide field of view to be able to capture the object of interest (e.g., the user 605) as it moves around the perimeter of the operating area 155. In some instances, the external device 115 may instead be mounted to a stake in the ground or other object configured to hold the external device 115. In some instances, the external device 115 may be held by a first user at a stationary location and panned/turned to face toward a second user that acts as the object of interest and moves around the perimeter of the operating area 155. The absolute location of the external device 115 may be determined by the external device 115 itself in instances in which the external device 115 includes a RTK GNSS receiver. In instances where the external device does not include a RTK GNSS receiver, the absolute location of the external device 115 may be determined by placing (at least temporarily) a device with a RTK GNSS receiver (e.g., the robotic mower 105, the base station device 145, etc.) at the location of the external device 115 (e.g., at the docking station 110, at the location where the external device 115 is mounted or being held by the first user, etc.). As indicated by the above examples, in some instances of the method of FIG. 7, the robotic mower 105 may not capture data of the object of interest to allow for the determination of the waypoints. Rather, the external device 115 may not be attached to the robotic mower 105 and may capture such data at, for example, a stationary location. In the alternative instances described immediately above, with the exception of the differences described above, the method 700 may otherwise be executed similarly to the manners described previously herein.

In some instances, the external device 115 is configured to be used to generate data that can be used to generate the virtual boundary without capturing data regarding an object of interest as the object moves around a perimeter of the operating area 155. For example, the user 605 may use the external device 115 to capture data of a perimeter of the operating area 155 (e.g., a video, images, etc.). For example, the user 605 may stand in a corner of the operating area 155 and pan/turn the external device 115 to capture image/video data corresponding to a desired virtual boundary. The external device 115 may then display the captured image/video data to allow the user 605 to select waypoints and/or draw boundary lines on the displayed image/video. Using image/video analytics, the external device 115 (or another device that receives the image/video data and the user input data from the external device 115) may determine a location of the user inputs (e.g., selected waypoints and/or drawn boundary lines) relative to the field of view/perspective of the external device 115 that captured the image/video data. Then, based on the absolute location of the external device 115, the external device 115 (or another device that receives the image/video data and the user input data from the external device 115) may determine the location/coordinates of the virtual boundary in a similar manner as described previously herein. As indicated with respect to other examples explained herein, the absolute location of the external device 115 may be determined by the external device 115 itself in instances in which the external device 115 includes a RTK GNSS receiver. In instances where the external device 115 does not include a RTK GNSS receiver, the absolute location of the external device 115 may be determined by placing (at least temporarily) a device with a RTK GNSS receiver (e.g., the robotic mower 105, the base station device 145, etc.) at the location of the external device 115 (e.g., at the location where the external device 115 is being held and panned/turned by the user 605).

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

We claim:
1. A communication system comprising:
a robotic garden tool including
a housing;
a set of wheels coupled to the housing and configured to rotate to propel the robotic garden tool on an operating surface in an operating area;
at least one wheel motor coupled to one or more wheels of the set of wheels, the at least one wheel motor configured to drive rotation of the one or more wheels; and
an electronic processor configured to
determine a plurality of relative distances between the robotic garden tool and an object as the object moves in the operating area,
determine one or more locations of the robotic garden tool as the object moves in the operating area,
time stamp each relative distance of the plurality of relative distances with a respective time corresponding to when data was captured that allowed for the determination of the relative distance,
time stamp each location of the one or more locations with a second respective time corresponding to when the location was determined,
correlate each relative distance of the plurality of relative distances with each location of the one or more locations based on matching time stamps of each relative distance and of each location,
determine a respective location of the one or more locations of the robotic garden tool at the respective time at which the data was captured that allowed for the determination of each relative distance of the plurality of relative distances, wherein a virtual boundary is generated using the plurality of relative distances, the one or more locations, and respective time stamps for each of the plurality of relative distances and the one or more locations by using each relative distance of the plurality of relative distances in combination with the respective location of the robotic garden tool at the respective time at which the data was captured that allowed for the determination of each relative distance of the plurality of relative distances, wherein, as the object moves in the operating area, the robotic garden tool is configured to pivot in place to face in a direction of the object or is configured to refrain from moving, and
control the robotic garden tool to be confined by the virtual boundary to remain in the operating area during operation of the robotic garden tool.

2. The communication system of claim 1, wherein the electronic processor is configured to determine a plurality of waypoints, wherein each waypoint of the plurality of waypoints is based on a respective relative distance of the plurality of relative distances and the respective location of the robotic garden tool at the respective time at which the data was captured that allowed for the determination of the respective relative distance of the plurality of relative distances;
wherein the electronic processor is configured to generate the virtual boundary using the waypoints; and
wherein each waypoint corresponds to an absolute location of the object at the respective time at which the data was captured that allowed for the determination of the respective relative distance of the plurality of relative distances.

3. The communication system of claim 1, further comprising a first network interface of the robotic garden tool configured to allow the electronic processor to communicate with a base station device, wherein the base station device is configured to receive, via a second network interface of the base station device, a location signal from a satellite and transmit calibration information regarding the location signal to the robotic garden tool; and wherein the electronic processor is configured to
receive the location signal from the satellite,
receive the calibration information from the base station device, and
determine the one or more locations of the robotic garden tool based on (i) the location signal and (ii) the calibration information.

4. The communication system of claim 3, wherein the electronic processor is configured to receive the location signal via a first real-time kinematic global navigating satellite systems (RTK GNSS) receiver of the robotic garden tool;
wherein the electronic processor is configured to receive the calibration information via a first radio frequency transceiver of the robotic garden tool;
wherein the base station device is configured to receive the location signal via a second RTK GNSS receiver of the base station device; and
wherein the base station device is configured to transmit the calibration information via a second radio frequency transceiver of the base station device.

5. The communication system of claim 1, wherein the electronic processor is configured to control operation of the at least one wheel motor to control movement of the robotic garden tool such that the robotic garden tool moves toward the object as the object moves in the operating area.

6. The communication system of claim 5, wherein the electronic processor is configured to control the operation of the at least one wheel motor to control the movement of the robotic garden tool such that the robotic garden tool moves toward the object as the object moves in the operating area by at least one of:
determining a received signal strength indication (RSSI) of a signal output by the object, and controlling the movement of the robotic garden tool such that the RSSI of the signal output by the object is at or above a predetermined RSSI threshold;
determining that a relative distance of the plurality of relative distances is greater than or equal to a predetermined threshold, and controlling the movement of the robotic garden tool to move toward the object until the relative distance between the robotic garden tool and the object decreases below the predetermined threshold; and
receiving a command from the object, wherein the command includes instructions for how to control the robotic garden tool to move the robotic garden tool toward the object.

7. The communication system of claim 1, wherein the electronic processor is configured to:
transmit the plurality of relative distances, the one or more locations, and the respective time stamps for each of the plurality of relative distances and the one or more locations to a remote device, wherein a second electronic processor of the remote device is configured to generate the virtual boundary using the plurality of relative distances, the one or more locations, and the respective time stamps for each of the plurality of relative distances and the one or more locations; and
receive the virtual boundary from the remote device.

8. The communication system of claim 1, wherein the electronic processor is configured to:
receive a plurality of images captured by a camera as the object moves in the operating area, wherein each image of the plurality of images includes the object; and
determine each relative distance of the plurality of relative distances based on a location and orientation of the object in a respective image of the plurality of images.

9. The communication system of claim 8, wherein the camera is integrated into the housing of the robotic garden tool.

10. The communication system of claim 8, wherein the camera is integrated into an external device, and wherein the robotic garden tool includes a securing device to secure the external device to the robotic garden tool; and
wherein the robotic garden tool is configured to receive the plurality of images from the external device.

11. The communication system of claim 8, wherein the object includes a human user, and wherein the electronic processor is configured to recognize the object within each image of the plurality of images using an image analytics technique based on an expected shape of the human user.

12. The communication system of claim 8, wherein the object includes a fiducial marker, and wherein the electronic processor is configured to recognize the object within each image of the plurality of images using an image analytics technique based on an expected design of the fiducial marker.

13. The communication system of claim 1, further comprising a millimeter wave radar device, wherein the electronic processor is configured to:
receive a plurality of data samples captured by the millimeter wave radar device as the object moves in the operating area, wherein each data sample of the plurality of data samples includes data indicating a respective location of the object; and
determine each relative distance of the plurality of relative distances based on the respective location of the object in each data sample of the plurality of data samples.

14. The communication system of claim 13, wherein the object includes a human user, and wherein the electronic processor, the millimeter wave radar device, or both the electronic processor and the millimeter wave radar device is configured to recognize the object within each data sample of the plurality of data samples based on an expected shape of the human user.

15. The communication system of claim 1, further comprising a server device configured to receive, via a network interface of the server device, the plurality of relative distances and the respective location of the robotic garden tool at the respective time at which the data was captured that allowed for the determination of each relative distance of the plurality of relative distances;
wherein the server device is configured to generate the virtual boundary using each relative distance of the plurality of relative distances in combination with the respective location of the robotic garden tool at the respective time at which the data was captured that allowed for the determination of each relative distance of the plurality of relative distances.

16. A method of creating a virtual boundary, the method comprising:
determining, with an electronic processor of a robotic garden tool, a plurality of relative distances between the robotic garden tool and an object as the object moves in an operating area, the robotic garden tool including
a housing,
a set of wheels coupled to the housing and configured to rotate to propel the robotic garden tool on an operating surface in the operating area, and
at least one wheel motor coupled to one or more wheels of the set of wheels, the at least one wheel motor configured to drive rotation of the one or more wheels;
determining, with the electronic processor, one or more locations of the robotic garden tool as the object moves in the operating area;
time stamping, with the electronic processor, each relative distance of the plurality of relative distances with a respective time corresponding to when data was captured that allowed for the determination of the relative distance,
time stamping, with the electronic processor, each location of the one or more locations with a second respective time corresponding to when the location was determined,
correlating each relative distance of the plurality of relative distances with each location of the one or more locations based on matching time stamps of each relative distance and of each location,
determining a respective location of the one or more locations of the robotic garden tool at the respective time at which the data was captured that allowed for the determining of each relative distance of the plurality of relative distances,
generating the virtual boundary using the plurality of relative distances, the one or more locations, and respective time stamps for each of the plurality of relative distances and the one or more locations by determining a plurality of waypoints, wherein each waypoint of the plurality of waypoints is based on a respective relative distance of the plurality of relative distances and the respective location of the robotic garden tool at the respective time at which the data was captured that allowed for the determination of the respective relative distance of the plurality of relative distances, and wherein each waypoint corresponds to an absolute location of the object at the respective time at which the data was captured that allowed for the determination of the respective relative distance of the plurality of relative distances; and
controlling, with the electronic processor, the robotic garden tool to be confined by the virtual boundary to remain in the operating area during operation of the robotic garden tool.

17. The method of claim 16, further comprising:
receiving, with the electronic processor, a plurality of images captured by a camera as the object moves in the operating area, wherein each image of the plurality of images includes the object; and
determining, with the electronic processor, each relative distance of the plurality of relative distances based on (i) a location of the object in a respective image of the plurality of images and (ii) the respective location of the robotic garden tool at the respective time at which the respective image was captured.

18. The method of claim 17, wherein the object includes a fiducial marker, and further comprising recognizing, with the electronic processor, the object within each image of the plurality of images using an image analytics technique based on an expected design of the fiducial marker.

19. The method of claim 16, further comprising:
receiving, with the electronic processor, a plurality of data samples captured by a millimeter wave radar device as the object moves in the operating area, wherein each data sample of the plurality of data samples includes data indicating a respective location of the object; and
determining, with the electronic processor, each relative distance of the plurality of relative distances based on (i) the respective location of the object in each data sample of the plurality of data samples and (ii) the respective location of the robotic garden tool at the respective time at which each data sample was captured, wherein the object includes a human user; and
recognizing, with the electronic processor, the millimeter wave radar device, or both the electronic processor, the millimeter wave radar device, the object within each data sample of the plurality of data samples based on an expected shape of the human user.

20. The method of claim 16, wherein the generating the virtual boundary includes generating, with a server device located remotely from the robotic garden tool, the virtual boundary.

* * * * *